(12) United States Patent
Lange et al.

(10) Patent No.: US 11,685,641 B2
(45) Date of Patent: Jun. 27, 2023

(54) MODULAR AUTOMATED FOOD PREPARATION SYSTEM

(71) Applicant: LAB2FAB, LLC, Fremont, CA (US)

(72) Inventors: Shawn Lange, Walnut Creek, CA (US); Hogan Hempy, Pleasanton, CA (US); Peter Ishiguro, San Jose, CA (US)

(73) Assignee: Lab2Fab, LLC, Fremont, CA (US)

( * ) Notice: Subject to any disclaimer, the term of this patent is extended or adjusted under 35 U.S.C. 154(b) by 0 days.

(21) Appl. No.: 17/885,093

(22) Filed: Aug. 10, 2022

(65) Prior Publication Data

US 2022/0380196 A1 Dec. 1, 2022

Related U.S. Application Data

(63) Continuation of application No. 16/780,797, filed on Feb. 3, 2020.

(60) Provisional application No. 62/891,239, filed on Aug. 23, 2019, provisional application No. 62/819,326, (Continued)

(51) Int. Cl.
| | |
|---|---|
| G05B 19/418 | (2006.01) |
| B67D 1/08 | (2006.01) |
| G05B 13/02 | (2006.01) |
| G05B 19/042 | (2006.01) |
| G06Q 20/20 | (2012.01) |
| A23L 5/10 | (2016.01) |
| G06Q 50/12 | (2012.01) |

(52) U.S. Cl.
CPC ............. *B67D 1/0888* (2013.01); *A23L 5/10* (2016.08); *G05B 13/0265* (2013.01); *G05B 19/0428* (2013.01); *G05B 19/4183* (2013.01); *G05B 19/4188* (2013.01); *G05B 19/41865* (2013.01); *G05B 19/41875* (2013.01); *G06Q 20/20* (2013.01); *G06Q 50/12* (2013.01); *G05B 2219/24015* (2013.01); *G05B 2219/2645* (2013.01)

(58) Field of Classification Search
CPC ................... G05B 19/41865; G05B 19/41875
USPC ............................................................. 700/9
See application file for complete search history.

(56) References Cited

U.S. PATENT DOCUMENTS

| | | |
|---|---|---|
| 5,921,170 A | 7/1999 | Khatchadourian et al. |
| 6,526,874 B1 | 3/2003 | Khatchadourian et al. |
| 8,710,408 B2 | 4/2014 | Khatchadourian et al. |
| | (Continued) | |

FOREIGN PATENT DOCUMENTS

| | | |
|---|---|---|
| EP | 2134183 A1 | 12/2009 |
| JP | 3712450 B2 * | 11/2005 |
| | (Continued) | |

OTHER PUBLICATIONS

SEVideo Primary, Automatic-Pizzeria (video). Accessible at https://www.automatic-pizzeria.com/, accessed Sep. 14, 2020 (screenshot of initial video noting URL is attached).

(Continued)

*Primary Examiner* — Hien D Khuu

(74) *Attorney, Agent, or Firm* — Van Hoven PC; Joshua Van Hoven

(57) ABSTRACT

An integrated front-of-house and back-of-house restaurant operations system integrates automated and manual restaurant operations into an order-based system. The system interfaces with disparate devices and systems to provide order-based monitoring and control of operations within an establishment.

24 Claims, 57 Drawing Sheets

Related U.S. Application Data filed on Mar. 15, 2019, provisional application No. 62/800,380, filed on Feb. 1, 2019.

(56) References Cited

U.S. PATENT DOCUMENTS

| | | |
|---|---|---|
| 10,709,142 B2* | 7/2020 | Gallon .................. A23L 5/10 |
| 2008/0178749 A1 | 7/2008 | Stutman |
| 2011/0059209 A1 | 3/2011 | Puzant |
| 2011/0309103 A1 | 12/2011 | Heatherly et al. |
| 2012/0185086 A1 | 7/2012 | Khatchadourian et al. |
| 2012/0308702 A1 | 12/2012 | Khatchadourian et al. |
| 2014/0164153 A1 | 6/2014 | Koether et al. |
| 2014/0272816 A1 | 9/2014 | Callahan |
| 2014/0324607 A1 | 10/2014 | Frehn et al. |
| 2014/0351068 A1 | 11/2014 | Renfroe |
| 2015/0053097 A1* | 2/2015 | Vardakostas ............ A23P 20/20 99/450.4 |
| 2015/0164131 A1 | 6/2015 | Vardakostas et al. |
| 2015/0227888 A1 | 8/2015 | Levanon et al. |
| 2017/0024789 A1 | 1/2017 | Frehn et al. |
| 2017/0221296 A1 | 8/2017 | Jain et al. |
| 2017/0290345 A1 | 10/2017 | Garden et al. |
| 2017/0290454 A1 | 10/2017 | Hall et al. |
| 2018/0317690 A1 | 11/2018 | Staton et al. |
| 2019/0125126 A1 | 5/2019 | Cohen |
| 2019/0216266 A1 | 7/2019 | Ganninger |
| 2020/0189837 A1 | 6/2020 | Keating et al. |
| 2020/0249660 A1 | 8/2020 | Rao et al. |
| 2021/0094188 A1* | 4/2021 | Rodionov ............... A21C 9/04 |

FOREIGN PATENT DOCUMENTS

| | | | |
|---|---|---|---|
| TW | 201740340 A * | 11/2017 | ............ A21B 1/48 |
| WO | 2008/103907 A1 | 8/2008 | |
| WO | 2012/099969 A1 | 7/2012 | |
| WO | 2018/165105 A1 | 9/2018 | |

OTHER PUBLICATIONS

The Editors of Encyclopedia Britannica, "Data structure", Britannica Jan. 2, 2018 https://web.archive.org/web/20180102152326/https://www.britannica.com/technology/data-structure (Year: 2018).

Understanding APIs, Red Hat, Published Jun. 29, 2018 https://www.redhat.com/en/topics/api#:~:text=APIs%20are%20about%20integration%E2%80%94the,one%20another%20or%20anyone%20else's. (Year: 2018).

* cited by examiner

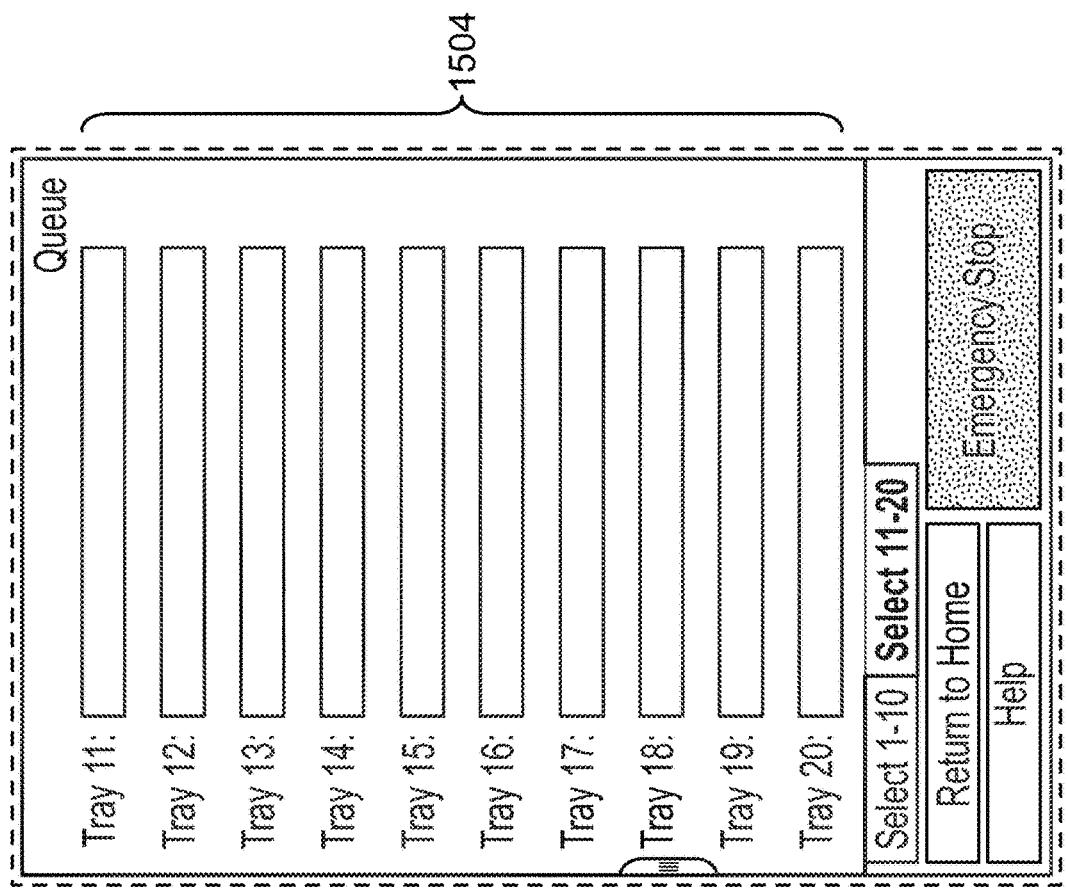
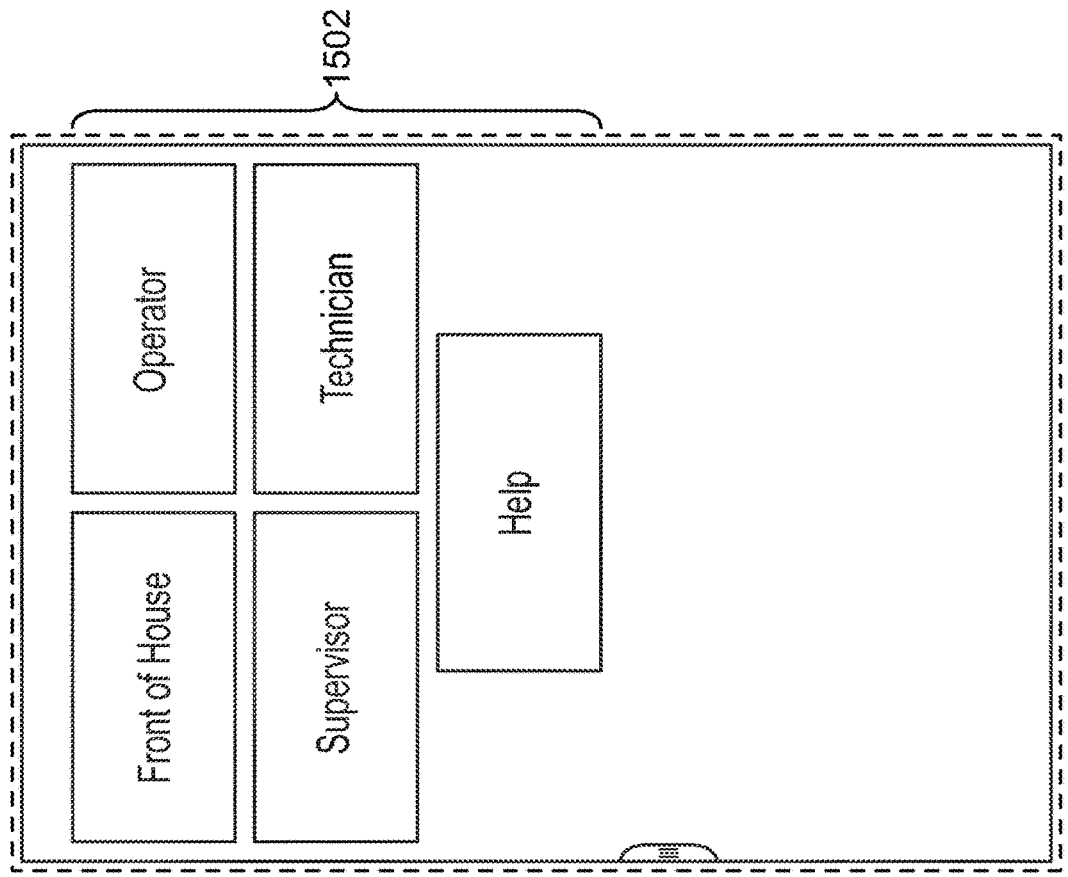
FIG. 15B
FIG. 15A

```
2019-08-08 09:41:56,191 INFO Response: 1;2;9;30;9;32;9;30;9;30;9;30;9;30;30;31;30;32;30;33;9;0;a
2019-08-08 09:41:56,191 INFO Executing Command: 1;2;9;30;9;32;9;30;9;32;9;34;9;41;64;20;6c;65;74;74;75;63;65;20;74;74;74;61;74;20;62;75;
72;67;65;72;9;6c;65;74;74;75;63;65;2e;70;6e;67;9;0;a
2019-08-08 09:41:56,191 INFO Command 2 Run, Show Text/Image
Station 4:    Current Step:   1
       Input Data:            0       2       4       Add lettuce to burger    lettuce.png
       Output Data:           0       2       0       00010203
       Command Time:   1565282516,1911414
```

2804

```
2019-08-08 09:41:56,391 INFO Response: 1;2;9;30;9;32;9;30;9;30;9;30;9;30;30;31;30;32;30;33;9;0;a
2019-08-08 09:41:56,407 INFO Executing Command: 1;2;9;30;9;32;9;30;9;32;9;35;9;41;72;72;61;6e;67;65;20;72;69;62;73;9;72;69;62;73;2;
e;70;6e;67;9;0;a
2019-08-08 09:41:56,407 INFO Command 2 Run, Show Text/Image
Station 5:    Current Step:   1
       Input Data:            0       2       5       Arrange ribs    ribs.png
       Output Data:           0       2       0       00010203
       Command Time:   1565282516,4070334
```

2806

```
2019-08-08 09:41:56,645 INFO Response: 1;2;9;30;9;32;9;30;9;30;9;30;9;30;30;31;30;32;30;33;9;0;a
2019-08-08 09:41:56,707 INFO Executing Command: 1;2;9;30;9;32;9;30;9;32;9;36;9;41;64;64;20;74;6f;6d;61;74;6f;20;74;6f;20;62;75;72;67;65;72;9;74;6f;6d;61;74;6f;2e;70;6e;67;9;0;a
2019-08-08 09:41:56,707 INFO Command 2 Run, Show Text/Image
Station 6:    Current Step:   1
       Input Data:            0       2       6       Add tomato to burger    tomato.png
       Output Data:           0       2       0       00010203
       Command Time:   1565282516,7076766
```

2808

```
2019-08-08 09:41:56,961 INFO Response: 1;2;9;30;9;32;9;30;9;30;9;30;9;30;30;31;30;32;30;33;9;0;a
```

FIG. 28 (Cont.)

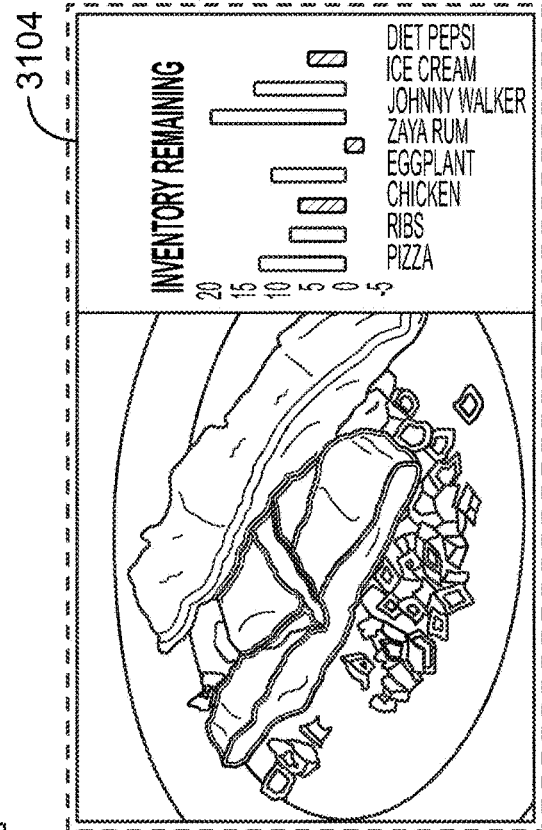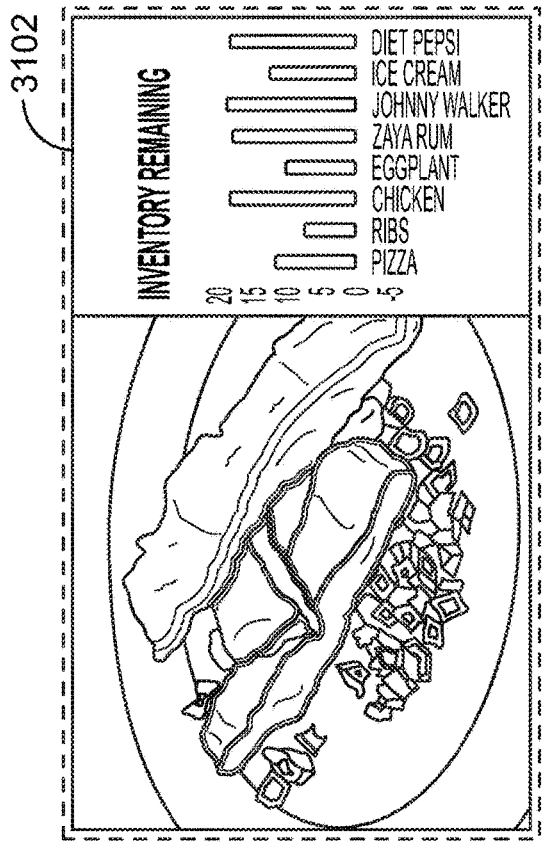
FIG. 31

Machine Inputs and Cloud Outputs

| | | Input to Gateway | | Output to AWS Dynamo DB table | |
|---|---|---|---|---|---|
| | Stations - Machines | Data bit (Decimal) | Machine ID Binary | Manu Item | Day of Serve |
| Coffee Station | NA | 0 | 0000 | | |
| | Concordia regular coffee | 1 | 0001 | Concordia regular coffee | 10/29/218 |
| | Joe Tapp Nitro Cold Brew With Cream | 2 | 0010 | Joe Tapp Nitro Cold Brew | 10/29/218 |
| Liquor Station | Ice; Soda, Bacardi | 0 | 0000 | Bacardi | 10/29/218 |
| | Ice; Soda, Ketel One | 1 | 0001 | Ketel One | 10/29/218 |
| | Ice; Soda, Grey Goose | 2 | 0010 | Grey Goose | 10/29/218 |
| | Ice; Soda, Beefeater | 3 | 0011 | Beefeater | 10/29/218 |
| | Ice; Soda, Patron Silver | 4 | 0100 | Patron Silver | 10/29/218 |
| | Ice; Soda, Tanqueray | 5 | 0101 | Tanqueray | 10/29/218 |
| | Ice; Soda, Tito's | 6 | 0110 | Tito's Vodka | 10/29/218 |
| | Ice; Soda, Absolut | 7 | 0111 | Absolut | 10/29/218 |
| | Ice; Soda, Jim Bean | 8 | 1000 | Jim Bean | 10/29/218 |
| | Ice; Soda, Dewars | 9 | 1001 | Dewars | 10/29/218 |
| | Ice; Soda, Svedka | 10 | 1010 | Svedka | 10/29/218 |
| | Ice; Soda, Captain Morgan | 11 | 1011 | Captain Morgan | 10/29/218 |
| | Ice, Soda, Ameretto Dekuyper | 12 | 1100 | Ameretto Dekuyper | 10/29/218 |
| | No Ice, Seagrams 7 | 13 | 1101 | Seagrams 7 | 10/29/218 |
| | No Ice, Crown Royal | 14 | 1110 | Crown Royal | 10/29/218 |
| | No Ice, Jack Daniels | 15 | 1111 | Jack Daniels | 10/29/218 |
| Shakes Station | NA | 0 | 0000 | | |
| | Chocolate Shake | 1 | 0001 | Chocolate Shake | 10/29/218 |
| | Strawberry Shake | 2 | 0010 | Strawberry Shake | 10/29/218 |
| | Vanilla Shake | 3 | 0011 | Vanilla Shake | 10/29/218 |
| Food Station | Oatmeal | 0 | 0000 | Oatmeal | 10/29/218 |
| | Egg McMuffin | 1 | 0001 | Egg McMuffin | 10/29/218 |
| | Sandwich | 2 | 0010 | Sandwich | 10/29/218 |
| | CheeseBurger | 3 | 0011 | CheeseBurger | 10/29/218 |
| | Pizza | 4 | 0100 | Pizza | 10/29/218 |
| Bar Counter | Pinot Noir | Skyflo Spout Data | 0000 | Pinot Noir | 10/29/218 |
| | Cabernet | Skyflo Spout Data | 0001 | Cabernet | 10/29/218 |
| | Chardonnay | Skyflo Spout Data | 0010 | Chardonnay | 10/29/218 |
| | Sauvignon Blanc | Skyflo Spout Data | 0011 | Sauvignon Blanc | 10/29/218 |

FIG. 33

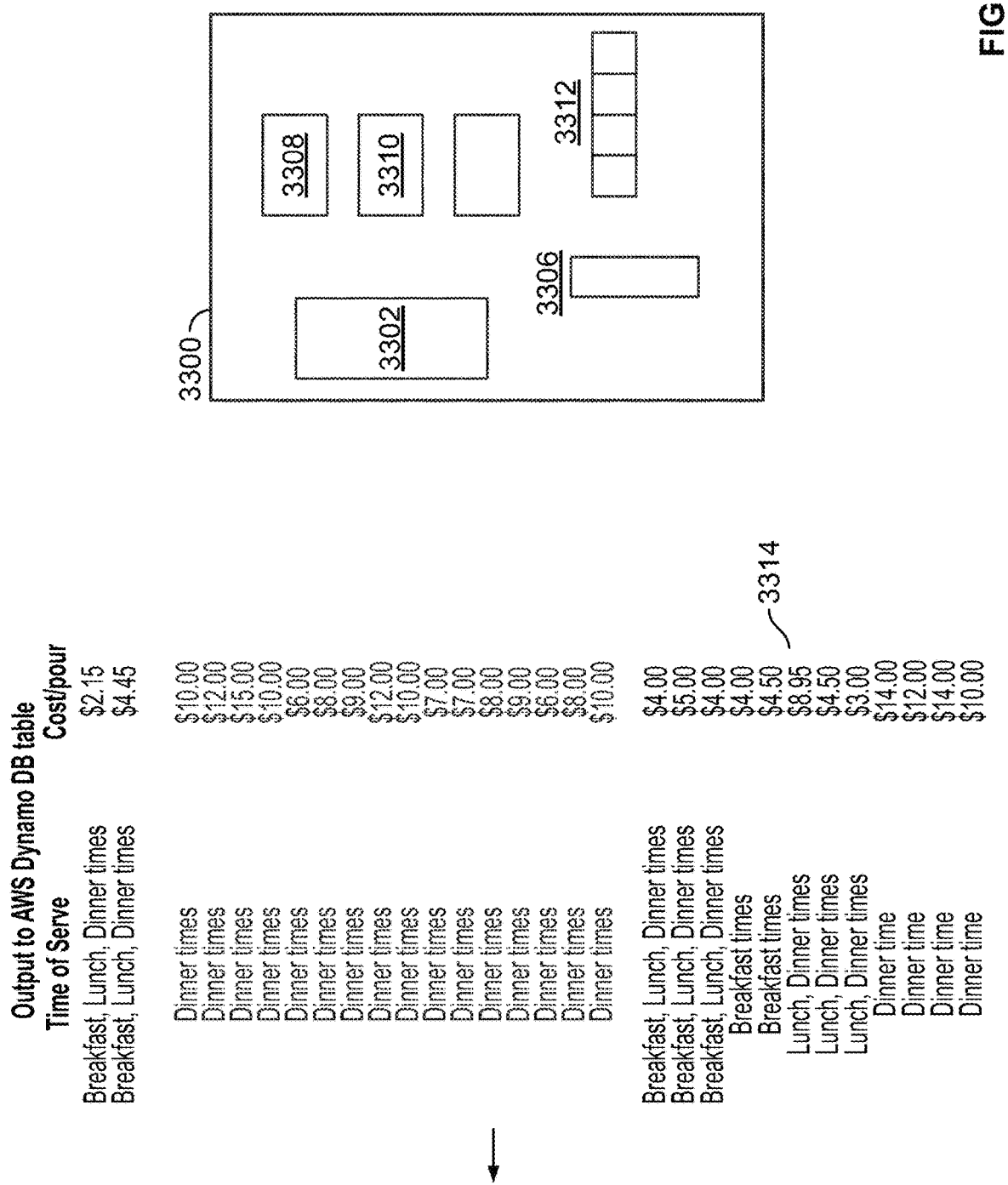

Output to AWS Dynamo DB table

| Time of Serve | Cost/pour |
|---|---|
| Breakfast, Lunch, Dinner times | $2.15 |
| Breakfast, Lunch, Dinner times | $4.45 |
| Dinner times | $10.00 |
| Dinner times | $12.00 |
| Dinner times | $15.00 |
| Dinner times | $10.00 |
| Dinner times | $6.00 |
| Dinner times | $8.00 |
| Dinner times | $9.00 |
| Dinner times | $12.00 |
| Dinner times | $10.00 |
| Dinner times | $7.00 |
| Dinner times | $7.00 |
| Dinner times | $8.00 |
| Dinner times | $9.00 |
| Dinner times | $6.00 |
| Dinner times | $8.00 |
| Dinner times | $10.00 |
| Breakfast, Lunch, Dinner times | $4.00 |
| Breakfast, Lunch, Dinner times | $5.00 |
| Breakfast, Lunch, Dinner times | $4.00 |
| Breakfast times | $4.00 |
| Breakfast times | $4.50 |
| Lunch, Dinner times | $8.95 |
| Lunch, Dinner times | $4.50 |
| Lunch, Dinner times | $3.00 |
| Dinner time | $14.00 |
| Dinner time | $12.00 |
| Dinner time | $14.00 |
| Dinner time | $10.00 |

3402 — Robotic Data Table  Close
Overview | Items | Metrics | Alarms | Capacity | Indexes | Global Tables | Backups | Triggers | Access Control | Tags Create Item | Actions ▼

Scan: [Table] RoboticDataTable: id, userId ⌃

3404 — Scan ▼ | [Table] RoboticDataTable: id, userId ▼ ⌃
⊕ Add Filter
Start Search | Cancel Changes

3406:

| id | userId | data | date | deviceId |
|---|---|---|---|---|
| f98cdf90-0042-4e9c-8571-7862fdcfe4d2 | Krishna | 1 | 2019-01-23T11:19:49.770-08:00 | Coffee Station |
| a19f12ee-557b-4844-8098-6a2a1b2da097 | Krishna | 2 | 2019-01-23T11:19:40.139-08:00 | Coffee Station |
| a3adaa5b-23f6-421b-aa38-9cf0448e5192 | Krishna | 2 | 2019-01-22T16:42:40.649-08:00 | Coffee Station |
| f22cce70-961e-48c3-885a-c9e21b20e7bc | Krishna | 1 | 2018-12-18T14:01:42.240-8:00 | Coffee Station |
| 0b69e7b4-97e4-4212-92b2-b4d4d598eed2 | Krishna | 1 | 2018-12-17T16:37:41.929-8:00 | Coffee Station |
| df932ebb-78c0-4e89-adad-38a485c69f3f | Krishna | 2 | 2018-12-17T16:29:55.286-8:00 | Coffee Station |
| dcf17a11-0ecf-42a6-a56c-9a1196d9086d | Krishna | 2 | 2018-12-17T15:33:01.016-8:00 | Coffee Station |
| 61271fdf-067f-4377-8939-5d47e2d99e34 | Krishna | 1 | 2018-12-13T17:07:09.810-8:00 | Coffee Station |
| 855bf3c3-12f9-42a9-b4c7-4e4caa6a4a30 | Krishna | 2 | 2018-12-12T13:39:25.517-8:00 | Coffee Station |
| 48e2862e-d109-4eec-b2db-12e3c1a240f8 | Krishna | 1 | 2018-11-30T11:42:55.945-8:00 | Coffee Station |
| 0d34ff68-d0c6-4cf4-90e6-1406981b051f | Krishna | 2 | 2018-11-15T09:05:17.297-8:00 | Coffee Station |
| 29c63bb2-9509-42dc-b685-9d238b3c2fa2 | Krishna | 1 | 2018-11-14T16:06:19.526-8:00 | Coffee Station |
| f12014d9-9ec1-4aa2-a719-29eb20bbaaf0 | Krishna | 2 | 2018-11-14T16:05:52.256-8:00 | Coffee Station |
| bb32096a-35e9-4129-9645-fab3c363be30 | Krishna | 2 | 2018-11-14T16:05:48.716-08:00 | Coffee Station |
| 37b0ed12-9dd1-4ff5-95a7-c74bb0a8d471 | Krishna | 2 | 2018-11-05T09:08:07.562-08:00 | Coffee Station |
| 6c142668-016e-4da4-8a8d-5ff11aa85332 | Krishna | 1 | 2018-11-05T09:07:34.921-8:00 | Coffee Station |
| d2c1f80a-23bb-4071-98ac-407736818451 | Krishna | 4 | 2019-01-22T16:46:11.554-08:00 | Coffee Station |
| dcb63317-32ca-4794-9f8b-c05132d3471a | Krishna | 3 | 2019-01-22T16:03:46.636-08:00 | Coffee Station |
| 25ab563c-e224-449b-970f-d6a35d7fb3cc | Krishna | 2 | 2019-01-18T11:35:48.228-08:00 | Coffee Station |
| 726f8bb7-e453-4498-85ed-861839bd56df | Krishna | 4 | 2019-01-17T15:07:27.132-08:00 | Coffee Station |

FIG. 34

Pizza Sold by Month

| Restaurant: Pizza type | January | February | March | April | May | June | July (2018) | August | September | October | November | December | January (2019) | February |
|---|---|---|---|---|---|---|---|---|---|---|---|---|---|---|
| Restaurant 1 Cheese | ○ | ○ | ○ | ○ | ○ | ○ | ○ | ○ | ○ | ○ | ○ | ○ | ○ | ○ |
| Combo | ○ | ○ | ○ | ○ | ○ | ○ | ○ | ○ | ○ | ○ | ○ | ○ | ○ | ○ |
| Pepperoni | ○ | ○ | ○ | ○ | ○ | ○ | ○ | ○ | ○ | ○ | ○ | ○ | ○ | ○ |
| Restaurant 2 ExtravaganZZa | ○ | ○ | ○ | ○ | ○ | ○ | ○ | ○ | ○ | ○ | ○ | ○ | ○ | ○ |
| Hawaiian | ○ | ○ | ○ | ○ | ○ | ○ | ○ | ○ | ○ | ○ | ○ | ○ | ○ | ○ |
| Pacific Veggie | ○ | ○ | ○ | ○ | ○ | ○ | ○ | ○ | ○ | ○ | ○ | ○ | ○ | ○ |
| Philly Cheese Steak | ○ | ○ | ○ | ○ | ○ | ○ | ○ | ○ | ○ | ○ | ○ | ○ | ○ | ○ |
| Restaurant 3 Cheese | ○ | ○ | ○ | ○ | ○ | ○ | ○ | ○ | ○ | ○ | ○ | ○ | ○ | ○ |
| Meat Lover | ○ | ○ | ○ | ○ | ○ | ○ | ○ | ○ | ○ | ○ | ○ | ○ | ○ | ○ |
| Pepperoni | ○ | ○ | ○ | ○ | ○ | ○ | ○ | ○ | ○ | ○ | ○ | ○ | ○ | ○ |
| Supreme | ○ | ○ | ○ | ○ | ○ | ○ | ○ | ○ | ○ | ○ | ○ | ○ | ○ | ○ |
| Restaurant 4 Gourmet Veggie | ○ | ○ | ○ | ○ | ○ | ○ | ○ | ○ | ○ | ○ | ○ | ○ | ○ | ○ |
| Guinever's Garden Delight | ○ | ○ | ○ | ○ | ○ | ○ | ○ | ○ | ○ | ○ | ○ | ○ | ○ | ○ |
| King Arthur | ○ | ○ | ○ | ○ | ○ | ○ | ○ | ○ | ○ | ○ | ○ | ○ | ○ | ○ |
| Maui Zaui | ○ | ○ | ○ | ○ | ○ | ○ | ○ | ○ | ○ | ○ | ○ | ○ | ○ | ○ |
| Montague All Meat | ○ | ○ | ○ | ○ | ○ | ○ | ○ | ○ | ○ | ○ | ○ | ○ | ○ | ○ |

Restaurant Name:
⊠ Restaurant 1
▨ Restaurant 2
▦ Restaurant 3
▧ Restaurant 4

FIG. 44

MODULAR AUTOMATED FOOD PREPARATION SYSTEM

CROSS-REFERENCE TO RELATED APPLICATIONS

The present application is a continuation of U.S. patent application Ser. No. 16/780,797, filed Feb. 3, 2020, which claims priority to U.S. Provisional Patent Application No. 62/800,380, entitled "Beverage Dispensing and Monitoring System" and filed on Feb. 1, 2019, U.S. Provisional Patent Application No. 62/819,326, entitled "Integrated Real-Time and Predictive Front-of-House and Back-of-House Food Service Control System" and filed on Mar. 15, 2019, and U.S. Provisional Patent Application No. 62/891,239, entitled "System and Method for Integrating Automated Electromechanical Functions in a Food Production Environment" and filed on Aug. 23, 2019, each of which is hereby incorporated by reference herein in its entirety.

BACKGROUND

The restaurant and hospitality industries are high-risk business propositions. There is a very high level of competition and extensive details to perfect to ensure that food and beverage service establishments become successful. In addition, the business is stressful, noisy, involves perishable items that are easily damaged, and depends on numerous variables such as high-turnover employees, supply chains, competitive conditions, industry trends, fickle consumer tastes, and the like. Many restaurant businesses are unable to balance both the numerous external variables that impact the business and the strict requirements for in-house operational excellence. As a result, most restaurants either fail within the first year of operation or have a minimal period of profitability before they quickly face obsolescence as a result of new entrants.

With rising employee and operations costs, restaurants are increasingly employing software suites and automation in order to streamline and improve operations. Such systems gather information about orders, coordinate with available inventory, and provide guidance to front-end employees that interact with customers and back-end employees that manage inventory and prepare food. Restaurants are also increasingly automating processes of ordering and food preparation, for example, with touchscreen and application interfaces for ordering and robotics and automated kitchen equipment taking over repeatable or dangerous tasks. A typical restaurant has numerous pieces of capital equipment that are placed into service over an extended useful life at different times, such that different types and brands of restaurant automation equipment are operating within a single facility. For example, even a single order may involve engagement with disparate ordering systems, inventory systems, employees, robots, and automated kitchen equipment. Although automated operations may improve certain aspects of restaurant operations in isolation, other aspects of operations may be negatively affected by the automated operations, resulting in degradations in service and quality, equipment breakdowns, increases in customer complaints, and increased employee turnover.

Restaurants may employ a variety of automated and partially automated equipment to prepare food for consumers, such as automated inventory intake and control systems, automated guided vehicles (AGVs), smart racks, augmented reality systems, projected work instructions, automated and customizable ovens/fryers/warmers/etc., robotic food preparation equipment, machine vision systems, transfer equipment and devices, point-of-sale systems, robotic transfer equipment, and a variety of other equipment and systems that provide automation of at least a portion of the food preparation environment. In most instances, establishments have a variety of legacy equipment and equipment from a variety of different suppliers. Even new establishments with recently purchased and automated equipment may purchase equipment from multiple suppliers having different communication and operational protocols and functions, and will likely purchase new automated equipment as kitchen environments continue to automate.

SUMMARY OF THE INVENTION

In an embodiment of the present disclosure, a method for automated production of a consumable item comprises receiving, via a network, an order for the consumable item and identifying, based on the order, a plurality of consumable components. The method further comprises identifying, based on the plurality of consumable components and the order, a plurality of electromechanical operations to process one or more of the consumable components, and generating an order data structure based on the electromechanical operations and consumable components. The method further comprises providing instructions based on the order data structure to each of a plurality of electromechanical components to perform the electromechanical operations, wherein the electromechanical components automatically prepare the consumable item from the consumable components in response to the instructions.

In an embodiment of the present disclosure, a restaurant operations system comprises at least one communication interface, a memory comprising instructions stored thereon, and a processor coupled to the communication interface and the memory. The processor is configured to execute the instructions to receive, via the at least one communication interface, an order for the consumable item and identify, based on the order, a plurality of consumable components. The processor is further configured to identify, based on the plurality of consumable components and the order, a plurality of electromechanical operations to process one or more of the consumable components and generate an order data structure based on the electromechanical operations and consumable components. The processor is further configured to provide, via the at least on communication interface, instructions based on the order data structure to each of a plurality of electromechanical components to perform the electromechanical operations, wherein the electromechanical components automatically prepare the consumable item from the consumable components in response to the instructions.

In an embodiment of the present disclosure, a non-transitory computer-readable medium has instructions stored thereon, that when executed by a processor of a restaurant operations system cause the processor to perform operations comprising receiving, via a network, an order for the consumable item and identifying, based on the order, a plurality of consumable components. The instructions further cause the processor to perform operations comprising identifying, based on the plurality of consumable components and the order, a plurality of electromechanical operations to process one or more of the consumable components and generating an order data structure based on the electromechanical operations and consumable component. The instructions further cause the processor to perform operations comprising directing operations based on the order data structure for each of a plurality of electromechanical components to perform the electromechanical operations, wherein the electromechanical components automatically prepare the consumable item from the consumable components in response to the directed operations.

BRIEF DESCRIPTION OF THE FIGURES

The above and other features of the present disclosure, its nature and various advantages will be more apparent upon consideration of the following detailed description, taken in conjunction with the accompanying drawings in which:

FIGS. 15A-15D depict exemplary top level user interfaces in accordance with some embodiments of the present disclosure;

FIG. 31 shows an exemplary user interface for inventory control and in accordance with some embodiments of the present disclosure;

FIG. 33 depicts an exemplary kitchen layout and associated data structures in accordance with some embodiments of the present disclosure;

FIG. 34 depicts exemplary top-level order data structures in accordance with some embodiments of the present disclosure;

FIG. 44 depicts exemplary aggregated order information by location in accordance with some embodiments of the present disclosure;

DESCRIPTION

Figure 1:
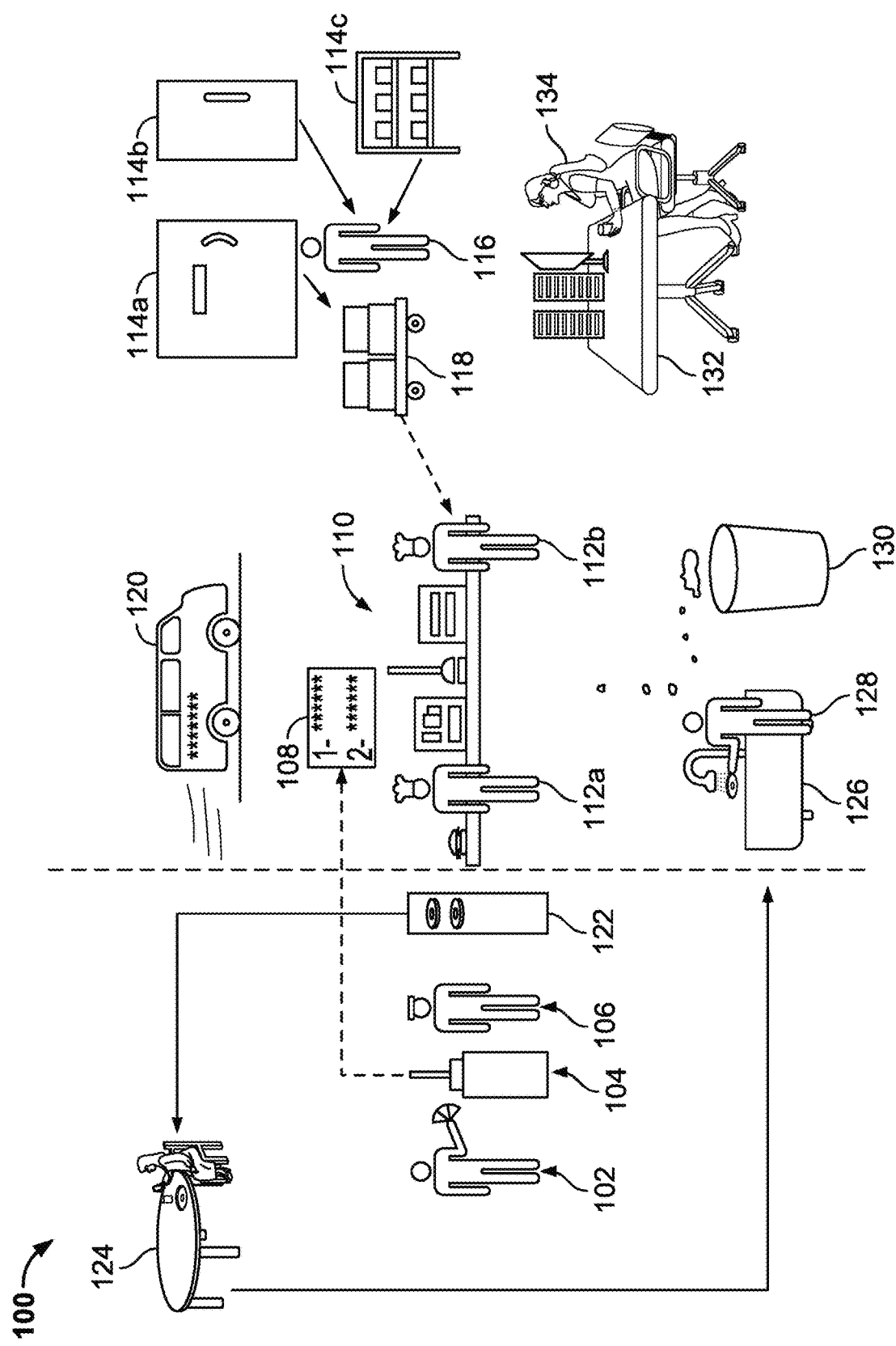
FIG. 1 depicts an exemplary conventional restaurant environment in accordance with some embodiments of the present disclosure.

Food preparation tends to be a very manual and labor-intensive process. There have been efforts to bring automation to food preparation, but it has been limited to systems that do a single task such as dispensing sauce or condiments to the food for example with pizza or automated burger-flippers. Efforts to bring customizable and personalized automation to food preparation are either non-existent or have very limited capabilities. In fact, looking at automation for food processing, the efforts are spread out and disparate wherein one finds efforts to procure and bring in a variety of different equipment including automated ovens, cutting and forming machines, sorting equipment, mixers and blending machines, filling equipment, wrapping equipment, and other forms of automation and robotics. This variety of automated equipment from different sources, as well as legacy equipment, operates largely independently from each other requiring significant intervention between the disparate pieces of equipment in order to do the food processing. The result may be an inefficient and sometimes disorderly food processing and assembly line that fails to meet standards for automation that are seen in other industries such as manufacturing or assembly.

One of the biggest areas for automation, particularly as it relates to personalized and customizable automation, is and continues to be the ability to customize the entire food processing line during automation from start to finish. In addition to customizing particular aspects of food and beverage operations, data analytics and related automation are applied to the entire food preparation process to personalize the marketing, advertising, sales, order receipt, order fulfillment, food preparation, food delivery, and customer feedback to drive a fully integrated and automated system that is also customized and personalized. Such a system achieves high levels of customer satisfaction and meets continually changing customer demands while also maintaining high levels of quality control, production speed, and overall profitability. Leveraging automation that includes both customization and personalization, and that incorporates both feed-forward and feedback analysis from various sub-parts that go to make the whole system, results in a synergy of automation and customization that individualizes the entire food service process while also maintaining a compact and manageable footprint, reducing cost, increasing efficiencies, and improving yields (e.g., by reducing errors and optimizing each step in the process to allow for customization of recipes and food offerings to customers).

The present disclosure relates to an integrated and modular system to allow establishments and enterprises to automate some or all of the food preparation process, integrate disparate equipment from different suppliers, communicate with multiple devices and related computing systems, and enhance manual operations and human-machine interactions. In exemplary embodiments, the system may include a software abstraction layer (e.g., operating on a local computer, gateway computer, fog device, PoS system, cloud system, or any suitable combination of these or similar computing systems), for example, that is operating as a software component of an integrated restaurant management system such as is described in commonly owned U.S. Provisional Patent Application No. 62/819,326, filed Mar. 15, 2019, and entitled INTEGRATED REAL-TIME AND PREDICTIVE FRONT-OF-HOUSE AND BACK-OF-HOUSE FOOD SERVICE CONTROL SYSTEM, U.S. Provisional Patent Application No. 62/800,380, filed Feb. 1, 2019, and entitled BEVERAGE DISPENSING AND MONITORING SYSTEM, and U.S. Provisional Patent Application No. 62/891,239, entitled "SYSTEM AND METHOD FOR INTEGRATING AUTOMATED ELECTROMECHANICAL FUNCTIONS IN A FOOD PRODUCTION ENVIRONMENT" and filed on Aug. 23, 2019, all of which are hereby incorporated by reference in their entireties.

Although the present disclosure may use the term "restaurant," in the context of this specification this term should be understood to include any establishment that engages in the preparation and/or service of food and/or drink items to third parties such as customers for consumption. In an exemplary embodiment of a restaurant, data is acquired and/or converted into primitive formats from multiple portions of the restaurant operation, such as ordering, inventory, food preparation, food staging, food delivery, equipment maintenance, and cleaning. An order data structure may be generated for each order that associates that order with the integrated restaurant operations, e.g., by associating an order with source ingredients from inventory, equipment used for food operations, quality measurements, user feedback, interfaces used for ordering, employees that assist in preparation, customer information, customer wait times, profitability, and other related information. The order-level information may be aggregated and analyzed to inform and control all aspects of restaurant operations, including customer ordering and service, inventory control and ordering, pricing, menu selection, coupons, incentives, scheduling of orders, employee assignments, equipment maintenance, etc., as further described herein.

Preparation of a consumable item such as a meal or portion of a meal may involve a variety of consumable components (e.g., ingredients) and automated and/or manual operations. Exemplary automated operations may be performed by electromechanical equipment that utilizes electrical energy and/or controls to perform operations on the consumable items, such as heating, cooling, dispensing, cutting, slicing, shredding, spreading, placing, searing, flipping, transferring, folding, etc. Manual operations may include interaction of a person such as a cook and/or customer and in some embodiments may be integrated with the automated electromechanical operations, for example, by performing preliminary, intermediate, or finishing steps in the preparation of the consumable item. In some embodiments, the manual operations may be guided equipment such as an augmented reality system or smart prep table that provides sequential visual and/or audio instructions to the user. In some embodiments, each operation and consumable component may be associated with a portion of data (e.g., a data primitive) and may have a range of acceptable modifications and customization operations. Exemplary customization may modify any controllable aspect of the preparation process for the consumable item that is being prepared, such as amounts of consumable components that are added to a consumable item under preparation, cooking temperatures and routines, modification of item size, etc.

Electromechanical operations may be associated with electromechanical equipment such as automated inventory intake and control systems, automated guided vehicles (AGVs), smart racks, augmented reality systems, projected work instructions, automated and customizable ovens/fryers/warmers/etc., robotic food preparation equipment, machine vision systems, transfer equipment and devices, point-of-sale systems, robotic transfer equipment, and a variety of other equipment and systems that provide automation of at least a portion of the food preparation environment. In an exemplary embodiment, a data structure for each electromechanical operation (e.g., a data primitive) may provide a simple association with a particular operation, such as heating for a particular duration at a particular temperature, dispensing a particular quantity of a consumable component, providing a desired amount or proportion of a consumable component, transferring between electromechanical operations and/or to staging areas, etc. Any modification with respect to the particular electromechanical operation may be performed by modifying a value associated with the electromechanical operation. Alternative automated or manual operations may be provided for each electromechanical operation. The actual execution of any modifications or customizations to electromechanical operation may be modified by accessing a library of operations (e.g., at an application programming interface ("API") of the restaurant management software) that seamlessly translate between the data structure of the ordering system to provide commands to the respective electromechanical equipment via native languages and/or protocols such as SOAP (Simple Object Access Protocol), REST (Representational State Transfer Protocol), GraphQL (data query language), and JSON (java script object notation).

Consumable components may include any consumables used in the preparation of a consumable item such as a meal or dish, and data relating to the consumable items (e.g., ingredient primitives) may provide information about the available consumable items such as quantity, location, source, inventory, weight, color, dimensions, availability, quality, alternatives, etc. Data may also associate the consumable components with particular electromechanical operations, for example, by listing electromechanical operations that are compatible with the consumable components and available options and/or restrictions for using particular consumable components with a particular electromechanical operations. For example, although certain consumable components may be substituted for other similar consumable components, they may respond to processing by electromechanical operations differently. Associations between the consumable components and electromechanical operations can automatically adjust to changes in the consumable components and/or the available electromechanical operations.

In some embodiments, one or more sensing devices may be integrated into the system. Sensing devices may be integrated with electromechanical components, manual workstations (e.g., smart prep tables), inspection stations (e.g., integrated within transfer equipment or speed racks) and/or may be separately located in a manner suitable to monitor the operations of the electromechanical components, consumable components, electromechanical operations, and/or consumable items. For example, exemplary sensors may include a vision system, scales, inertial sensors, temperature sensors, lasers, time-of-flight sensors, humidity sensors, pressure sensors, airflow sensors, force sensing probes, viscosity sensors, electrical sensors (e.g., voltage, current, resistance, capacitance, inductance) digital machine outputs (e.g., from PLCs, robots, and other automated devices), counters, timers, infrared sensors, radio frequency (RF) sensors, other sensors, and suitable combinations thereof. Outputs of the sensors may be used to provide feedback and/or feed-forward information, for example, to make corrections or modifications to an existing order or to facilitate analytics such as inventory control, customer pricing, preventative maintenance, etc. In an embodiment, sensor outputs may be associated with order data structures, electromechanical component data structures, consumable component data structures, consumable item data structures, and other relevant information related to the establishment operations. The sensor information and associations therewith may be aggregated on an establishment level, enterprise level, and/or industry level to provide diagnostics and predictive analytics, for example, to select suppliers, modify operations of electromechanical components, identify and/or price menu items, and the like.

In some embodiments, portions of the integrated system may be modular and may be dynamically reconfigured. For example, one or more of the electromechanical components may be located in a modular device that performs a subset of operations relating to preparation of a particular order. In an exemplary embodiment of a system for preparing a pizza, the application and distribution of common consumable components such as sauce, cheese, and meat may be performed within one modular device while other operations are performed on other devices and/or at manual workstations. A particular modular workstation may operate for a period of time necessary to prepare an inventory of prepared or partially prepared items, and tools within the modular workstation may be updated to perform another operation (e.g., preparation of vegan pizzas) and/or the modular workstation may be moved (e.g., by an AGV or other automated system) and replaced by another modular workstation (e.g., a station for preparing chicken tenders). In an exemplary embodiment one or more central transfer devices such as AGVs, robots, conveyors, and transfer tables may sequence the movement of consumable components (e.g., ingredients from inventory) and consumable items (e.g., ordered items) through the system between automated and manual workstations, speed racks, and other related equipment as described herein to optimize efficiency of preparation.

The order, electromechanical component, consumable component, and module-level information may be analyzed at multiple levels of abstraction, including an establishment level, enterprise level, or industry level. At an establishment level, this information may be collected at a common gateway point, enabling local actions to be implemented based on this monitored information. For example, suitable persons (e.g. a manager, owner and/or selected staff) may be provided a variety of information in the form of live data, alerts, reports and trends which will significantly alleviate the losses that restaurants and other venues face today. Such systems may further provide for automated control of other systems, such as inventory and ordering systems, automated equipment, storage and staging locations, delivery systems, ordering (e.g., point-of-sale) systems, premises access and alarm systems, automated kitchen systems, advertising systems, media control systems, menu items, menu displays, and other related systems that collectively facilitate the operations of the establishment.

In some embodiments of the present disclosure, the variety of information available on the premises described herein may be aggregated at a gateway device that captures the data collected at the establishment, stores it either locally in a local network device (e.g., a fog device that is located at the establishment or close to the premises, providing a physical and logical layer between a particular establishment and the internet) and/or in cloud storage. Each of the gateway device, fog device, or other devices executing restaurant operations programs and applications as described herein may include suitable processors, memory, and communications interfaces as is known in the art. In some embodiments, the gateway may be an application or program providing operations through a local connected device or devices, e.g., may be primarily cloud based for the collection and processing of data with operations and user interfaces provided or instantiated via the cloud. In some embodiments, the gateway may manage the movement and storage of raw data and locally processed data analysis at the fog location and further to a server at a remote location (e.g., in the cloud), which may apply additional mathematical, statistical, and probabilistic approaches to the raw data and fog-transformed data while aggregating and anonymizing additional data from similar and different locations in order to deliver insights and actionable results graphically, through real-time alerts or reports, and/or through control actions.

For example, the system may represent and relay the information over a period of time or instantaneously in the form of a live data stream to a mobile device or desktop through a browser or through a specially designed app in order to enable the establishment to obtain an understanding of details including, but not limited to: the changing dynamics of the establishment, the region in which the establishment and other similar or different establishments are located, the macro and micro environment in which the establishment operates, and the demographics of the establishment patrons. In this way, the establishment may significantly drive and improve sales, curtail losses, manage inventory, efficiently operate and maintain equipment, and manage the business.

FIG. 1 depicts an exemplary conventional restaurant environment 100 in accordance with some embodiments of the present disclosure. As depicted by a vertical dashed line in FIG. 1, restaurant operations are generally divided into front-of-house operations (to the left of the dashed line) and back-of-house operations (to the right of the dashed line). Front-of-house operations generally include the entry and waiting areas for customers 102, ordering queues, employee stations, point of sale (PoS) systems 104, front-of-house employees 106 (e.g., taking orders, delivering food, cleaning), staging areas 122 for completed orders, dining areas 124, and other related customer-facing facilities and operations based on particular restaurant design and operations. Back-of-house operations generally include a number of stages and types of food storage (e.g., frozen items 114b, refrigerated items 114a, bulk ingredients 114c, liquid storage), numerous racks for temporary storage of inventory to be used in food preparation, various types of food preparation equipment and preparation stations 110 for preparing and combining prepared food items, racks for storage of partially prepared and prepared food items, and numerous employees 112a, 112b, to handle food items and equipment from inventory 118. Back-of-house also include numerous employees and operations that do not directly involve the preparation of food, such as loading areas for receiving inventory 116, dishwashing and sanitizing stations 126/128, storage areas, and offices 132 for administrative employees 134 such as management, accountants, etc.

Portions of the conventional restaurant environment may be automated. For example, a PoS system 104 manned by an employee 106 or as an unmanned touch screen may communicate with back-of-house food preparation systems 108 in order to provide back-of-house employees 112a and 112b with real-time order information. Sales, pricing, and timing information may be processed and presented for display or download for administrative employees 134 use in assessing profitability, menu item popularity, effectiveness of promotions, etc. Particular pieces of food preparation equipment 110 such as ovens, slicers, fryers, etc. may be partially automated such that food placed in an appropriate location (e.g., a fryer basket, a conveyor of an oven, etc.) may be processed according to pre-determined routines that may be selected by the back-of-house employee 112a/b. Conveyors may move food through a food preparation process and specialized devices or robots may assist employees in the preparation process, e.g., by assembling portions of entrees or assisting with labor intensive tasks such as cutting produce or dispensing viscous sauces. Individual pieces of food preparation equipment 110 may measure and display information about cooking processes, and in some instances, may be connected to a network to provide such data. Typically, the on-board processing abilities of food processing equipment 110 is limited to high-level information and is processed individually, e.g., without association with other data or information that can be observed or measured in the restaurant. Inventory 118 may be managed by scanning items as they are used which may be processed by software that indicates when inventory is running low and assists with ordering. Administrative employees 134 may utilize such software and analyze patterns over time to limit space used for inventory, waste due to underutilization, or shortages due to overutilization. Additionally, back-of-house cleaning employees 128 may dispose of food and other waste 130 (e.g., in appropriate compost, recycling, and trash areas) and may clean and sanitize dishes and utensils. Management 134 may be generally aware of scrap based on volumes of waste collected and other overhead costs (water, electricity, gas, etc.) based on periodic billings or local smart meters that provide more detailed snapshots of utility usage patterns.

Figure 2:
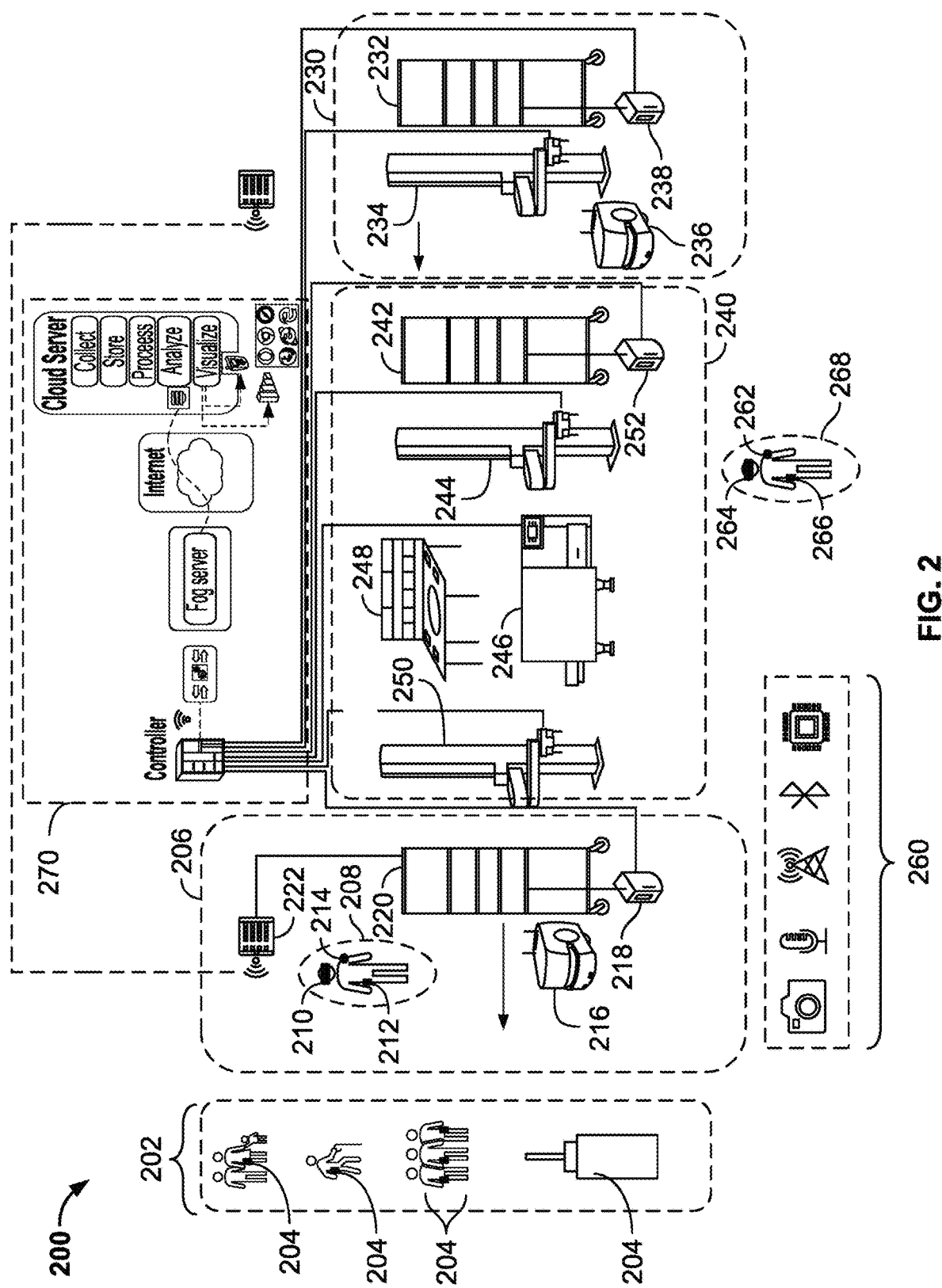
FIG. 2 depicts an exemplary front-of-house to back-of-house integrated restaurant environment in accordance with some embodiments of the present disclosure.

FIG. 2 depicts an exemplary establishment including food preparation equipment and other supporting hardware and software of an integrated restaurant environment in accordance with some embodiments of the present disclosure. Although the integrated restaurant environment 200 may generally be described in the context of a location including complete front-of-house and back-of-house operations (e.g., including tables, ordering areas, food preparation areas, inventories, cleanup, offices, etc.), the functions described herein can be distributed in a variety of suitable arrangements. For example, a multiplicity of operations may be shared or distributed as appropriate, such as in a large facility like an arena, food court, convention center, or pop-up restaurant. Food may be ordered from multiple restaurants through kiosks or applications, back-of-house prep may be performed on different equipment, and distributed food delivery areas may receive completed items, with a centralized cleanup facility handling those tasks for multiple restaurants. The order-level data collection and analysis of the system described herein may facilitate accurate allocations of costs for shared facilities, increase opportunities for cost savings and utilization. Some or all of the operations may be mobile, e.g., on trucks, semi beds, or modules such as ghost kitchens.

The integrated restaurant environment 200 may provide restaurants with the capability to handle the changing environment and dynamics of restaurant operations while also providing them with the capability to manage their restaurant business, provide menus that cater to changing tastes and trends, develop unique selling points, hire and train staff, improve staff morale and safety, meet customers' ever-changing preferences and expectations, and do all of this in a way that helps them achieve profitability quickly and effectively while simultaneously managing their growth.

Although it will be understood that components described herein with respect to FIG. 2 may be added, removed, or replaced, in an exemplary embodiment the integrated restaurant environment of the establishment includes customers 202, connected employees 208 and 268, ordering interfaces 204, delivery equipment 216, inventory storage 232 (e.g., freezers, refrigerators, food storage, etc.), AGVs 216 and 236, a cloud-connected control system 270, food preparation equipment 246/248 (e.g., depicted as automated prep equipment 246 and smart prep table 248, but including suitable equipment such module workstations, smart preparation tables, etc., as described herein), food staging equipment 242 and 220 (e.g., depicted as racks), automated food handling and processing equipment (e.g., depicted as robots 234, 244, and 250), local networking 222 (e.g., WiFi, mesh, Bluetooth, etc.), and local sensors 260 (e.g., video cameras, temperature sensors, ToF cameras, microphones, laser range sensors, RFID, and other suitable sensors).

Each component of the system may include monitoring of its functionality (e.g., for oven parameters such as feed rate, utilization, current draw, programmed temperature, measured temperature, air flow, etc.). Employees may have tags or devices (e.g., augmented reality headsets 210 and 264, employee tags 214 and 262, and/or mobile devices 212 and 268) that may communicate with the other equipment in the integrated system (e.g., to open or lockout equipment, initiate delivery or other operations, provide access, associate the employee with particular tasks, authorize modifications to settings, communicate with a smart prep table, etc.). Customers 202 may opt-in (e.g., via an application of a mobile device) to share information (e.g., according to user-selected settings) with the system while inside and/or outside of the integrated restaurant environment (e.g., according to user preferences). Third party systems such as suppliers, butchers, bakeries, farmers, and other related portions of the food and beverage supply network may also communicate directly with the system, and the system may monitor external data such as informational data (e.g., weather, real-time pricing, auctions, prices, traffic, etc.) and social/media data (e.g., social media postings, articles, blog posts, etc.).

All of this information may be processed by the control system 270 locally (e.g., at a local controller such as a gateway and/or fog device, or by a cloud portion of the system. Employee and customer devices may permit access to certain functionality, for example, via an application associated with the establishment, enterprise, or industry for an establishment hosting the integrated restaurant environment. The devices may communicate with the control system 270, providing information such as preferences, user orders, coupons, demographic information, age, etc. Other sensors 260 may include a variety of suitable sensors, such as a camera (e.g., video or time-of-flight) that captures images and/or identifies locations of employees (e.g., via a beacon of an employee tag), customers, and food inventory and orders (e.g., via beacons or other identifiers associated with the trays, preparation stations, etc.), and communicates the other sensor 260 data to control system 270. A point-of-sale device 204 (e.g., integrated into customer and/or employee devices and equipment, and/or associated with display locations of the restaurant) may also communicate with the control system 270, and may provide order, pricing, customer, payment and other PoS information to the control system 270. Additionally, PoS systems 204 may also communicate with remote food and cooking equipment such as in other establishments of an enterprise through a connected cloud API (application protocol interface) that sends data to the cloud from sensors embedded in each establishment's equipment. This control system 270 may provide an aggregated database for all of the orders from the different same-store establishments of a single enterprise, allowing for a single enterprise-level view of the entire operation at multiple levels of abstraction.

Numerous aspects of the system may be automated, for example, including automated fulfillment of inventory 230, preparation of food 240, and serving of food items 206. This automation may in some embodiments include robots and other automation (e.g., robots 234/244/250 and AGVs 236/216) that perform some functions typically performed by food service employees, such as taking orders, accessing inventory, preparing food, serving food, etc. Equipment within the establishment such as food preparation and delivery equipment and inventory systems may be equipped with processing and communication equipment that allows exchange of information with the control system 270. Information may be monitored and requests (e.g., build and cook a hamburger with particular ingredients, prepare a cup of coffee with cream, deliver a bottle of wine from inventory) may be transmitted from the control system 270 to any such automated equipment. For example, an order received from a PoS system may activate preparation as soon as the order is placed by a customer at the establishment or remotely from a customer placing an order to pick up from the establishment or for delivery from the establishment. In some embodiments, aspects of the system may be automated (e.g., partial preparation of in-demand items) based on predictive analytics based on trends observed during certain hours of the day, days of the week, historical data from customer orders, and from events and other information as described herein.

In some embodiments, the operations of the establishment are monitored by authorized users (e.g., a manager) with a local device or devices (e.g., tablets, mobile devices, PoS system, personal computer, A/R device, etc.). The local device is communicatively linked to the control system 270 to store and analyze data. This communication system may further allow the manager to monitor and analyze data collected at other establishments that are linked to this network via the remote server. In some embodiments, the control system 270 may access other information as described herein, such as crowd information, promotions, inventory, supplier data, weather, events, satellite data, geo-location data, social media data, etc. The data collected at any of the devices may be structured or unstructured data including text, images, audio, video, social media postings etc.

In some embodiments, data can be shared with complementary food service establishments so as to give the customer an enhanced food experience that may not be available in only one type of establishment. Customer preferences (as approved by the customers) may be stored and selectably accessed by a wide variety of food service establishments based on menus and raw materials available at a multitude of such establishments and delivered to a chosen location.

Databases (e.g., local or remote databases) of the control system 270 can have multiple data structures, each of which can concentrate on one type of enterprise with detailed attributes for that enterprise. For example, order data structures based on order primitives may associate the entire front-of-house and back-of-house experience with particular orders, linking to inventory information, consumable component data, electromechanical operation data, electromechanical component data, and module workstation data, tracking each step of the food preparation process from different inventory locations to a completed dish (e.g., time to prepare, quality measurements, wait time at different stages, etc.), recording delivery time/path and anonymized customer interaction information (e.g., quality of interactions, requests for additional items/condiments, etc.), tracking the order through to measure scrap associated with the order, linking to cost and profitability information, and recording associations with relevant external data (e.g., events, weather, social media posts, advertisements, etc.). New data entities and associations can be added when new information, features, types, etc. become available.

As the control system 270 receives data from the integrated restaurant environment, the data may be at least partially stored and processed locally (e.g., at a gateway or fog device). An exemplary fog device may be a desktop computer or local server located at an office within the restaurant. The fog device may be able to perform more intensive analysis with the data collected due to its larger storage space or higher processing speed. For example, the fog device may receive instructions from the gateway device to perform analysis upon a specific subset of data it has stored as described herein. The fog device may also communicate with a cloud server to store data or to process data remotely. When the data has been processed to achieve the desired analysis, the fog device may send the results back to the gateway device for display.

In some embodiments, the operations of electronic devices in the integrated restaurant environment 200 may be controlled by the control system 270 (e.g., via a local gateway device). In some embodiments, the control system 270 may perform analytics that facilitate control of the operation of the integrated restaurant environment 270. For example, parameters such as selection of particular inventory, preparation methods and routines, employee assignments, customer specials, menu selection, dynamic pricing, menu substitutions, and other related parameters may be determined based on information acquired by the system, as described herein. For example, the control system 270 may identify that a particular item in inventory may run out prior to the next delivery, and may temporarily enact measures to limit consumption of related food items, such as suggesting substitutes at discounts. The analytics system may also provide information to facilitate the relative consumption of particular inventory, for example, based on bulk purchase incentives or promotions for the enterprise, such as providing specials necessary to achieve attainment of the incentive or promotions, or to exhaust excessive inventory. Similarly, analytics can provide for selective enabling or disabling of access to certain menu items based on events or known situations (e.g., time of day, consumption patterns for an event, equipment availability, etc.) that are determined to drive certain types of traffic or certain consumption patterns (e.g., soup on a rainy day, etc.).

In an exemplary embodiment, the control system 270 (e.g., via a gateway device) may provide a centralized system for controlling the entire integrated restaurant environment 270. For example, patterns can be monitored based on employee, menu item type, food sources, equipment used to produce the item, and (if permission is given) customer information. Analysis with historical data and other current data (e.g., from other establishments, other data sources, promotional information, inventory and delivery data, etc.) can be used to determine food item prices, specials, recipes, and the like. In some embodiments, entry into the PoS system (e.g., one or more central PoS systems, customer PoS interfaces, and/or employee PoS devices) may initiate access of particular food items from staging areas or inventory. The stocking of staging areas may be predictive based on typical patterns with dynamic modifications based on current consumption patterns. In this manner, both inventory and use of staging areas may be limited, resulting in a just-in-time system for stocking food items. Particularized user requests may result in specials or offers for other food items being provided to the user.

Once a particular order is selected by the PoS system, AGVs, robots, food preparation equipment, and employee A/R systems may be activated for the particular order. In some embodiments, indicators and displays may be provided throughout the order assembly process, e.g., with lights and/or icons and other stimuli indicating the current progress of each food item or set of food items through the process. In this manner, food items can be assembled with automated equipment and employee assistance in a predictable pattern, resulting in consistent delivery of food items. In some embodiments such information may be relayed to the employee by other means, such as on an augmented reality device (e.g., overlying the employee's view of the restaurant with visual indicators, which may be associated with food preparation equipment such as by beacons) or auxiliary displays located at strategic locations.

A dynamic, flexible, cloud-connected, sensor driven, intelligent, responsive front and back-of-house restaurant management system may integrate a variety of previously disconnected and disparate operations through a combination of specialized equipment, supplementary monitoring devices, item-level tracking customer, data interfaces, plug-ins, data structures, primitives, and other related equipment and methods as described herein. In this manner, virtually all of the functions of the restaurant from the order at the front-of-house to receiving and preparing the order at the back-of-house for delivery back to the front-of-house and eventually to cleanup are processed within an integrated operational framework. For example, an inventory and storage management system 230 may deliver food prep items and ingredients from inventory and storage 232 (e.g., monitored by laser range sensor 238) using robotics and guided delivery vehicles (e.g., loading robots 234 and AGV 236), these raw ingredients may be managed in queues (e.g., of food preparation racks 242), loaded into processing stations 248 and various food processing equipment 246, unloaded for final prep or as completed food items to a staging area (e.g., to speed rack 220 by loading robot 250), and then delivered to a customer (e.g., by AGV 216 from speed rack 220, as monitored by laser range sensor 218). After delivery to the customer, food scrap can be measured. As described herein, these operations may be performed in whole or in part by automated equipment, robotics, and employees utilizing human machine interfaces and augmented reality displays.

In an exemplary embodiment of a food preparation workflow as depicted in FIG. 2, food is transported initially from cold storage 232 (refrigerators, freezers, portable cold boxes etc.) with different types of specialized cold storage used to preserve or keep frozen the different kinds of foods meant to be kept at different temperatures to prevent spoilage. The food is accessed by a loading robot 234 and loaded to be transported on automated devices such as AGVs 236. The AGVs 236 may utilize sensors, wireless connectivity, and/or vision cameras in order to navigate the back-of-house environment. The AGV also identifies component food items as they are acquired from storage, for example, based on RFID scanning, bar scanning, item recognition (e.g., vision systems), customized trays (e.g., associated with particular items), or the like. This information may be associated with existing inventory information, for example, based on information tracked or recorded at the time of receipt from a supplier. The identified component food item may be associated with one or more staging locations within the back-of-house operations, for example, proximate to respective food preparation equipment and may be delivered to the staging location (e.g., speed rack 242) by the AGV 236. In some embodiments, the acquisition of the component food items from inventory by a particular AGV 236 may be based on predicted orders, a particular current order, a set of orders, or a combination thereof.

In an embodiment of food preparation workflow as depicted in FIG. 2, food is transported directly from cold storage to preparation equipment (e.g., an oven 246 as depicted in FIG. 2) using an AGV 236 or similar automated robotic delivery mechanism or conveyor system utilizing sensors, wireless connectivity, augmented reality and/or vision cameras 260 in order to fulfill the order information to the food preparation and processing environment 246 and 248. After the food item is prepared, similar equipment (e.g., loading robot 250, speed rack 220, and AGV 216) may deliver the food item directly to the customer. After delivery to the customer, the order information can be updated at the control system 270 as fulfilled. In an embodiment of food preparation workflow as depicted in FIG. 2, several of the sub-systems can be combined such as combining the speed rack with the AGV and/or the food loading robot to simplify operations, reduce equipment costs, combine training requirements, reduce parts inventory etc.

Inventory may be identified and retain an association throughout the preparation process, such that each food item used to create a menu item can be tracked from a particular source in inventory. When accessed from inventory an identifier associated with the item or items (e.g., a barcode, serial number, UPC, label, RFID, shape, or other unique information) may be identified by an employee or AGV, for example, using scanners, cameras, probes or other hardware that is present on the employee's person and/or integral to the AGV. Depending on whether particular ingredients for orders are obtained directly from inventory or from a staging area (e.g., speed rack), the identifier of the inventory may be associated with the order immediately upon access from inventory or later when the food item associated with the inventory identifier is accessed from a speed rack. In some instances, the identifier may also be used to access information about the growth, preparation, and distribution of the food items in inventory. For example, records (e.g., blockchain records) may track the inventory items from delivery to the restaurant back to distributors, processors, packagers, individual farms, groups of livestock, particular livestock, and sub-locations where produce is grown. As described herein, creating these associations with particular orders (e.g., farm to table) using the unique food preparation equipment and methods and described herein, results in a massive increase in available information (e.g., in-line quality measurements, customer self-reported reviews, amounts of scrapped food, errors or faults in food preparation equipment operation, etc.) to better optimize purchasing, logistics, and inventory management.

When an AGV or an employee acquires inventory, the inventory may be placed on or in pans or containers with identifiers to facilitate continued tracking of the inventory throughout the food preparation process, e.g., based on barcodes, RFID, camera-readable markings, shape, etc. Item-level tracking and combining with order information may permit a variety of critical operations as described herein, such as identifying when recalled food items are served and warning particular customers who ordered those items. Depending on the type of food item and level of staging within the integrated restaurant back-of-house environment, a particular food item may be individually identifiable (e.g., an individual hamburger patty) or may be identifiable by reference to a portion of bulk inventory (e.g., four pounds of hamburger). In some embodiments, AGVs may perform some or all of the functions of speed racks by having sets of stackable racks and mating containers. For example, the identifiable containers may have physical notches, slots, magnets, etc. for temporarily fixedly interlocking with stackable racks that are stacked over the AGV. If not needed for picking additional inventory or performing other operations, the AGV may move to a location and remain stationary while food is accessed from the stackable racks. If needed for other operations, the AGV may temporarily leave the stackable racks at an appropriate location, returning to move some or all of the racks as inventory is depleted. In this manner (and when combined with modular and/or movable food preparation stations and preparation equipment as described herein), the configuration and footprint of the back-of-house operations may be modified or updated based on particular temporary needs (e.g., changes in configuration for a-la carte ordering during busy times and for bulk preparation for delivery or sale during non-busy times) or longer-term changes in strategy. In some embodiments the stackable racks may include components for partial food preparation, such as defrosting, mixing, cooling, adding seasoning, etc. The stackable racks may include contact areas and vias for distributing electrical power to the pre-prep racks from the AGV, a battery, or an outlet. AGVs and stackable racks may also include storage and distribution methods (e.g., mating and interlocking piping) for distributing other resources such as gas or water.

In some embodiments, the acquired component food items may be transported to a staging area (e.g., a stackable speed rack) and unloaded from the AGV using the pre-loaded pans/trays. In some embodiments the speed rack may be a smart rack including the ability to distribute power and other utilities and perform pre-processing and item tracking operations, while in other embodiments the racks may be standard racks with external sensors and equipment performing tracking of items, trays, etc. An ordering and relative location of the particular items within the staging area may be based on factors such as the current ordering queue, proximity to food preparation equipment, needs for employee access, etc. In an embodiment, the speed rack has shelf locations associated with each pre-loaded pan based, e.g., on contact sensors (e.g., communicating a unique identifier), RFID, a laser range sensor identifying barcodes and/or relative locations, image processing/vision systems or the like. Determination of where a particular food pan needs to be loaded, e.g., top, middle, bottom, front, back, etc., may be decided by a scheduling/queueing software that takes into account current and/or predicted orders from the "front of the house" (e.g., received from a mobile device and/or a PoS system), food processing equipment workloads and queues, employee availability, speed of the respective orders, whether the food is first-use, ease of access by workers, and the types of food or grouping of food products in similar categories such as meats with meats or vegetables with vegetables (e.g., to prevent potential contamination of sensitive food items).

In some embodiments, an inventory system may be integrated with AGV and staging areas as a single or combined piece of equipment, for example, as a series of modular and stackable refrigeration, freezer, and heating units that capable of independent movement within the back-of-house or accessible for selective "picking" by robotic or employee-assisted equipment, such that items may be scanned when received from a supplier and stored in associated (and individually addressable and identifiable) units to be selectively transported directly to the food preparation area.

Individually-identifiable food containers and modular workstations may be utilized to track food items throughout the order process. In some cooking scenarios such as pre-prepped items a single pan may be utilized throughout multiple preparation steps. In other scenarios with multiple types of source food items (e.g., combination of items including meat, dairy, bakery, produce, condiments, etc.) records may be maintained as the food item progresses between different containers. For example, each of a bun, hamburger patty, cheese, lettuce, tomatoes, and Heinz 57 may originate from a portion of bulk inventory and be located in respective identifiable containers in a rack with other like items. The progress of each item is tracked as it is moved from the identifiable container to a piece of equipment, preparation station, or new identifiable container, until the final menu item (i.e., a cheeseburger with French fried potatoes) is located on a plate, which itself may have identifiable information for tracking through the front-of-house operations and back to the back-of-house for monitoring of delivery times, quality, scrap, and other information as described herein. In this manner, a source of the component food items used to prepare a particular item may be known, at least based on the associated food pan and related inventory source, or in some embodiments, based on individually identifiable characteristics of the food item (e.g., location within the food pan, appearance, markings, etc.). In some embodiments the food pans may provide perishable items such as meats, vegetables, dairy, etc., while non-perishable items may be accessible from areas which are replenished less regularly.

As described herein, a variety of component food items may need to be accessed for a particular order and may need to be processed with food preparation equipment in a particular sequence. For example, an initial subset of meat and vegetable items may be chopped and seasoned, a second subset of items may be added, the combined subsets may be cooked, and additional preparation (e.g., sauces, fresh items) may be added after cooking. As described herein, each of the consumable food items and each of the tasks performed by cooking and preparation equipment, robots, cooks, etc., may be associated with a particular primitive item, such that any suitable variety of operations may be monitored and combined and performed (e.g., to modify preparation procedures, change menu items, recommend supply chain changes, etc., as described herein).

Once the food items are in the preparation areas as described herein, a combination of automated food preparation equipment (e.g., ovens, searing stations, dispensers, fryers, ranges, etc.), robots, AGVs, employees, conveyors, food preparation areas, identifiable containers, drones, quality check stations, and other related equipment may be used to prepare the food. Each of these items may include unique identifiers such that the path of the food through the preparation process as well as each operation and measurement related to the food item may be tracked and recorded.

The inventions described in the present disclosure increase employee safety and job satisfaction while reducing training time, by utilizing automated equipment and order-level data tracking along with employee devices. For example, employees may be provided with AR headsets that provide useful information for interacting with the front-of-house or back-of-house operations. The integrated restaurant system may be aware of the employee's location (e.g., by a known location of the employee device, an employee tag, camera systems, etc.) and may populate display systems (e.g., of an AR device or devices embedded into equipment, racks, and other stations of the automated kitchen) to assist the employee in performing tasks. For example, in interactions with AGVs and robotic systems, no go zones may be indicated (e.g., by superimposed displays of an AR device, LEDs or other indicators in the floor or at stations, changes in artificial lighting, etc.) to prevent employees from being injured and automated systems from being damaged. In an exemplary embodiment of a food preparation station, initial processing (e.g., cooking of hamburger, bun, cheese, and slicing of lettuce and tomatoes) may be performed and the partially prepared food items may be delivered to a final assembly station for the employee. An employee may receive an indication of a particular order to be prepared (e.g., a customized current order being prepared by the specific employee, as opposed to generalized displays used by multiple employees) and indicators (e.g., superimposed graphics, LEDs, etc.) may guide the employ on the location of items and order of preparation. Such systems may similarly assist back-of-house employees with myriad additional operations, such as accessing inventory (e.g., portions of inventory that need to be used), transferring items between stations, interacting with robotic working surfaces, etc.

As described herein, in addition to AR displays for employees, the preparation equipment may include user interface features to provide information to users, for example, via lights, LEDs, displays, haptic interfaces, embedded speakers, local communication interfaces (e.g., Bluetooth Low Energy, NFC, etc.), etc. The user interface may provide a variety of information such as equipment status, temperature(s), cooking or preparation routines, associations with order numbers, quality information, and other suitable information relating to the food preparation equipment or order as described herein. The food preparation equipment may include user interface features to receive information from local users, such as by buttons, touchscreens, time-of-flight data, voice, or motion (e.g., particular motion profiles sensed by accelerometers and/or gyroscopes), local communication interfaces (e.g., Bluetooth Low Energy, mesh, NFC, etc.), etc. Users such as employees or managers may provide information such as food selection, modifications to cooking routines, user identification, settings modification, overrides, food item selection, etc. The user interface features may also facilitate associating the food preparation equipment with a particular type of food item (e.g., setting and training the equipment to cook new items). In some embodiments this association may be performed automatically, for example, based on scanning of barcodes or other identifying information associated with a food item (e.g., from a rack or packaging) or a device in communication with the food preparation equipment (e.g., from a rack or packaging).

For example, for a bulk-prepared item such as medium-well burgers, a food pan of burgers may be located into cooking equipment (e.g., a broiler oven) using a loading robot. The robot controller communicates with the master controller of the control system which is constantly aware of which food pans have been loaded into the food processing equipment and which shelves on the speed rack are empty and need to be refilled. This information is collected, processed and sent onwards to the front-of-the house processing device identified earlier as a mobile device or a Point of Sale system. At each stage the restaurant management system is aware of the state of the system whether it be which trays are loaded on to the rack, which food items originated from which trays, what the robot status is at any given time, whether the robot is in the process of loading or unloading the food tray, whether information is being exchanged between devices and system, whether interactions are occurring with front-of-house devices and systems, or other related physical or communications interactions.

Some or all of the back-of-house operations may be modular and/or movable to facilitate on-the-fly modifications to kitchen operations. For example, some or all of the robots, preparation equipment, preparation tables, ingredient stores, speed racks, and the like may be movable and adjustable, such that location, height, dimensions, and combinations of equipment can be modified for different circumstances. The back-of-house equipment may include fixturing and attachments to selectively fix equipment to floors, walls, ceiling, posts, columns, as well as to attach pieces of equipment to each other. In some embodiments, equipment dimensions, attachment points, utility requirements and other related information may be stored and accessible by the integrated restaurant management to guide employees and/or AGVs in modifying and assembling back-of-house configurations. In this manner, back-of-house equipment may be repurposed and reconfigured in order to change restaurant concepts and operations, thus extending the useful life of equipment. In some embodiments, configurations may be changed during normal operations, for example, between breakfast and lunch and between lunch and dinner. Employees may be guided in the attachment and configuration of modular equipment via indicator lights, instructions delivered to devices, AR displays, etc. In some embodiments, equipment such as ovens, fryers, robotic assembly stations, speed racks, etc., may have docks or locking attachments for interfacing with AGVs that reposition the equipment according to instructions from the system. For example, once a reconfiguration routine is initiated an employee or robot may be guided to disconnect utility connections (e.g., aided by visual aids, LEDs, etc.), an AGV may dock or attach to the equipment to be move, and wheels or rails of the equipment may be instructed to unlock, allowing the AGV to guide the equipment to a new location. Once all of the relevant equipment is properly configured, attached, and properly locked in, an employee or robot may reattach utilities.

At multiple stages within the back-of-house area, QC and quality checking may be performed using computer vision system, temperature probes, employee-assisted visual inspection, robot-assisted inspection, and the like. In the case of employee inspection, the system can alert the employee that an item is available for inspection and provide guidance for the inspection (e.g., via AR interfaces). QC may be performed at a variety of portions of the food inspection system, including within speed racks and AGVs.

As soon as the food item is prepared, the food preparation equipment sends a done status to the controller which is then communicated to the front-of-house and control system. The food items are then unloaded from the final preparation station (e.g., by an employee, conveyor, or unloading robot). The instructions for the unloading and next steps describe what additional processing needs to be performed (e.g., delivery to other food preparation stations, delivery to a chef prep station, delivery to a storage rack, etc.) based on the order and other status information, and can be modified during preparation of any one item (e.g., temporarily placing items on a heating rack while processing a rush order). For example, the finalized meal may be placed onto a trackable plate for delivery to the customers in the front-of-house.

The master controller may communicate with robot and equipment controllers such that the system is constantly aware of which food items have been loaded from the food processing equipment and which unload locations (e.g., speed rack shelves, chef stations, additional processing equipment, AGVs, etc.) are empty and can be filled. At each stage, the restaurant management system is aware of the state of the system, whether it be which trays are loaded on to the rack, what the robot status is at any given time, whether the robot is in the process of loading or unloading the food tray or is sending information to the fog computing device or acknowledging delivery of order to the front-of-house HMI.

The food item may continue to be monitored in this manner at each location (e.g., chef station, food preparation equipment, speed racks, etc.) until the ordered item is complete, at which time it may be provided to the front-of-house, e.g., by AGVs, conveyors, robotic arms, human-aided systems, or the like. In some embodiments, at appropriate stages of the food preparation process (e.g., after the completion of heating and cooking stages), the food items and eventual order may be associated with a vessel (e.g., plate, bowl, etc.), including visual indicators (e.g., patterns, barcodes, etc.) or wireless transponders (e.g., RFID, beacons, etc.) to continue to track the food items and orders through all stages of preparation through delivery and disposal.

For example, once a finalized menu item is plated or packaged (e.g., for take-out) the path of the item from the food preparation item to delivery to the customer may be determined and tracked. A queuing routine may analyze other available data (e.g., from cameras, sensors, etc. in the front-of-house) to coordinate delivery of the menu items to the customer with customer wait times, customer location, congestion within the restaurant, ideal item cooling times before service, and other similar information to schedule. Delivery may be completed by employees, robots, AGVs, conveyors, or a combination thereof, and may be directed by the integrated restaurant system, e.g., by providing AR guides to employees, displaying pathways for robot or HGV movement to customers with lighting, LEDs, etc. While the meal is being consumed information may be gathered about the dining experience and quality of the menu item. An exemplary smart table may identify the presence of menu items (e.g., based on retrieving unique identifiers from plates), and sense consumption, for example based on weight or volume. Cameras may also gather information about which items are consumed by image analysis, obscuring any customer identities or other sensitive information.

Scrap may also be measured by the smart table, camera, by an AGV or employee that picks up the dishes, at an inspection station in the back-of-house cleaning operations, or by suitable combinations thereof. In this way, it can be determined whether customers like certain menu items, portion sizes may be analyzed, and other similar information may be analyzed. In this manner, the integrated restaurant management system may provide comprehensive measurement and analysis of the entire restaurant operation from receiving inventory to disposal of scrap food. Scrap may also be measured during preparation within the back-of-house food preparation environment, for example, by QC vision systems or scales. This end-to-end information combined with other data such as financial data may provide heretofore unavailable information, insights, and predictive analytics to a restaurant, restaurant chain, and to the industry as a whole.

In accordance with the present disclosure, "End of Arm Tooling" (EoAT) may be provided for robots and AGVs in order to access different types of sourced food items and to facilitate proper operations and limit ordering and preparation errors. For example, particular inventory items may be associated with particular tooling interfaces or particular tooling interfaces may be associated with particular operations (e.g., cooking, searing, cutting, boiling, etc.). In this manner, EoAT interfaces may provide a further failsafe to limit wasted food items and damage to equipment.

Throughout the cooking process, information may be accessed from sensors and data interfaces on cooking equipment, storage equipment, racks, AGVs, robots, etc. In addition, supplementary sensors and monitoring equipment may be added to any portions of the system, such as a vision system, a scale, an inertial sensor, a temperature sensor, a laser, a time-of-flight sensor, a humidity sensor, a pressure sensor, an airflow sensor, a force sensing probe, a viscosity sensor, a voltage, a current, a resistance, a digital machine output, a counter, a timer, an infrared sensor, or a radio frequency (RF) sensor, etc., all of which track characteristics of the food items and the front-of-house and back-of-house environment to dynamically optimize food preparation procedures based on the current operational conditions and order queue.

The various equipment types (e.g., racks, robots, food preparation equipment, user devices, AGVs, PoS systems, etc.) may include communication interfaces for exchanging data with other electronic devices. Suitable wireless interfaces may include Bluetooth, Bluetooth Low Energy, NFC, RFID, mesh networking protocols (e.g., ZigBee), cellular, 5G, unlicensed spectrum protocols, or any other suitable protocols for exchanging information wirelessly. In some embodiments, the food preparation equipment may include a wired interface, e.g., that detachably connects to a base unit or data reader for selectively exchanging information or providing bulk data downloads. In instances of multiple types of connections (e.g., wired and wireless, multiple types of wireless connections), high-bandwidth connections (e.g., with higher energy usage and possibly intermittent connectivity) may be used for bulk data download, software updates, and non-urgent or periodic communications, while lower-bandwidth connections may be used for alerts, food item information, lock/unlock/change requests, pour requests, and other similar time-sensitive information that relates to the ongoing operation of the establishment.

Equipment may include a variety of sleep and wakeup features to conserve power usage and battery life and/or initiate communications, for example, based on sensed movement of the device (e.g., by an accelerometer and/or gyroscope), approved users entering the area (e.g., an authorized user having a tag or device emitting a beacon signal such as a signal that activates a RFID or NFC component), receiving food items (e.g., in a staging area for a chef station, food preparation equipment, or QC equipment), periodic network polling, or other suitable methodologies for periodically activating the kitchen equipment or particular circuitry or functionality thereof. In some embodiments, some of the kitchen equipment may have enhanced functionality, for example, to collect data from other locally located equipment to a gateway, relay control information from a gateway, and receive local inputs (e.g., from an authorized user accessing an enhanced user interface functionality). In this manner, most of the other kitchen equipment can be relatively "dumb" programmable devices with a series of predetermined actions based on available control, monitoring, and user interface components and programmed functionality, limiting cost and power usage for the non-enhanced devices.

Figure 3:
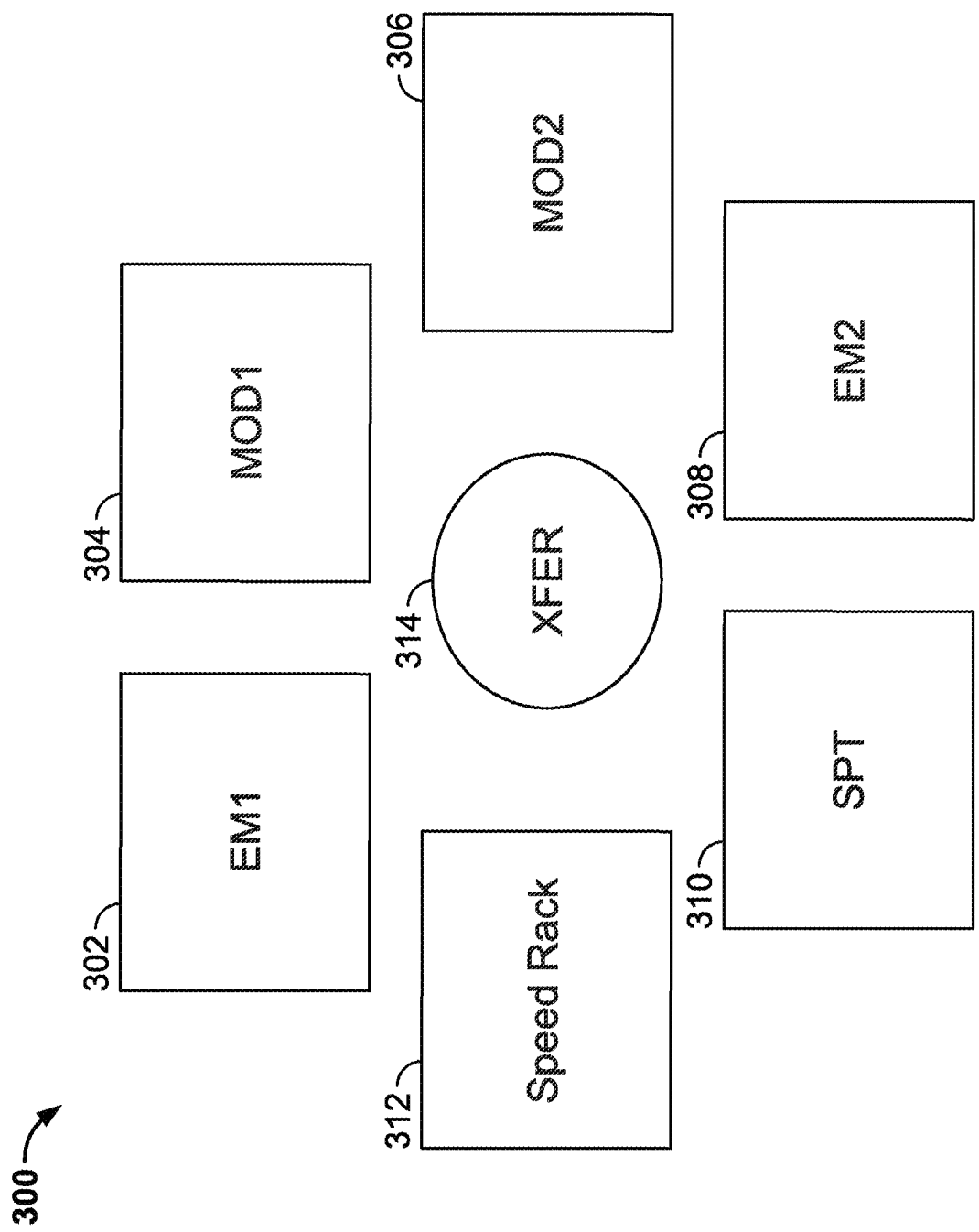
FIG. 3 depicts an exemplary modular food preparation environment in accordance with some embodiments of the present disclosure.

FIG. 3 depicts an exemplary modular food preparation environment 300 in accordance with some embodiments of the present disclosure. In an exemplary embodiment, in a "cluster-type" food processing system, various modules are arranged in a cluster and a transfer station (e.g., a robot) is in the center of the cluster. The flexibility in this type of configuration is evident from the fact that each of the modules can swap places to accommodate the layout of the food preparation environment or to better optimize the food prep process.

In the exemplary embodiment of FIG. 3, a plurality of types of equipment include a plurality of electromechanical components (e.g., EM1 302 and EM2 308), a plurality of modules that each integrate multiple electromechanical components (e.g., MOD1 304 and MOD2 306), a smart preparation station 310 for performing A/R assisted manual operations, a speed rack 312, and a transfer system 314. The system may process incoming orders to coordinate operations between the different types of equipment. For example one of the modules (e.g., MOD1 304) may be capable of performing an initial subset of operations for a plurality of food types that utilize a single piece of consistent base matter and that have multiple toppings applied thereto (e.g., applying sauce, cheese, and meat to a base pizza crust or applying beans, and meat to a base tortilla) while another modular station (e.g., MOD2 306) may be capable of performing operations for items that are on a bun such as hamburgers, chicken sandwiches, cheese, and vegetables. Electromechanical components (e.g., EM1 302 and EM2 308) may perform respective operations such as cooking (e.g., in an oven) and cutting (e.g., with automated slicing or cutting equipment). A smart preparation table (e.g., SPT 310) may include a station for an employee to apply additional toppings to any of the food items, such as condiments or rarely used and/or oddly sized items (e.g., anchovies). A speed rack 312 may provide storage for consumable items in the process of being prepared and may provide temperature control (e.g., heating or cooling) as appropriate. A transfer station (e.g., a robot labeled XFER 314) may manage the movement and progress of consumable items through the system. The system may stage and sequence operation to optimize module utilization and throughput based on existing orders and known ordering patterns as described herein.

In an exemplary embodiment of FIG. 3, during an initial stage a first modular workstation (e.g., MOD1 304) may prepare a number of partially completed pizzas (e.g., including dough, sauce, cheese, and meat), a second modular workstation (e.g., MOD2 308) may prepare a number of partially completed cheeseburgers using previously-cooked patties that are maintained at temperature on a speed rack, an oven (e.g., EM1 302) can be cooking chicken patties for storage on the speed rack and later preparation at MOD2 306, and a slicer (e.g., EM2 308) may be slicing previously prepared vegan pizzas, while at the SPT 310 an employee is putting final toppings on a burrito and folding the burrito for final distribution to a customer. Operations may continue in this manner to obtain maximum utilization of the equipment while consuming minimal space.

In some embodiments, one or more of the components of the modular food preparation may be swapped out for other components. For example, different oven types may be suitable for preparation of different items, or a griddle station may need to be substituted. Through efficient use of the modules and speed racks, modular workstations and other equipment of the modular food preparation system may be swapped out frequently, and may continue their operations (e.g., cooking a quantity of pizzas) at an adjacent location. Because the modules require only limited human intervention, this movement can occur without endangering employees or damaging the equipment.

By combining automated systems with detailed control of electromechanical operations and selective utilization of equipment and modules, a high degree of customizability and personalization can be achieved for each individual order for each customer, while maintaining a high degree of efficiency for the business establishment. The establishment may maintain high yields for the food processing while allowing for significantly reduced costs of operation. This level of customization and personalization can be extended thereby to the entire restaurant or establishment ecosystem taking into account the dynamics of the external environment as described herein.

Figure 4:
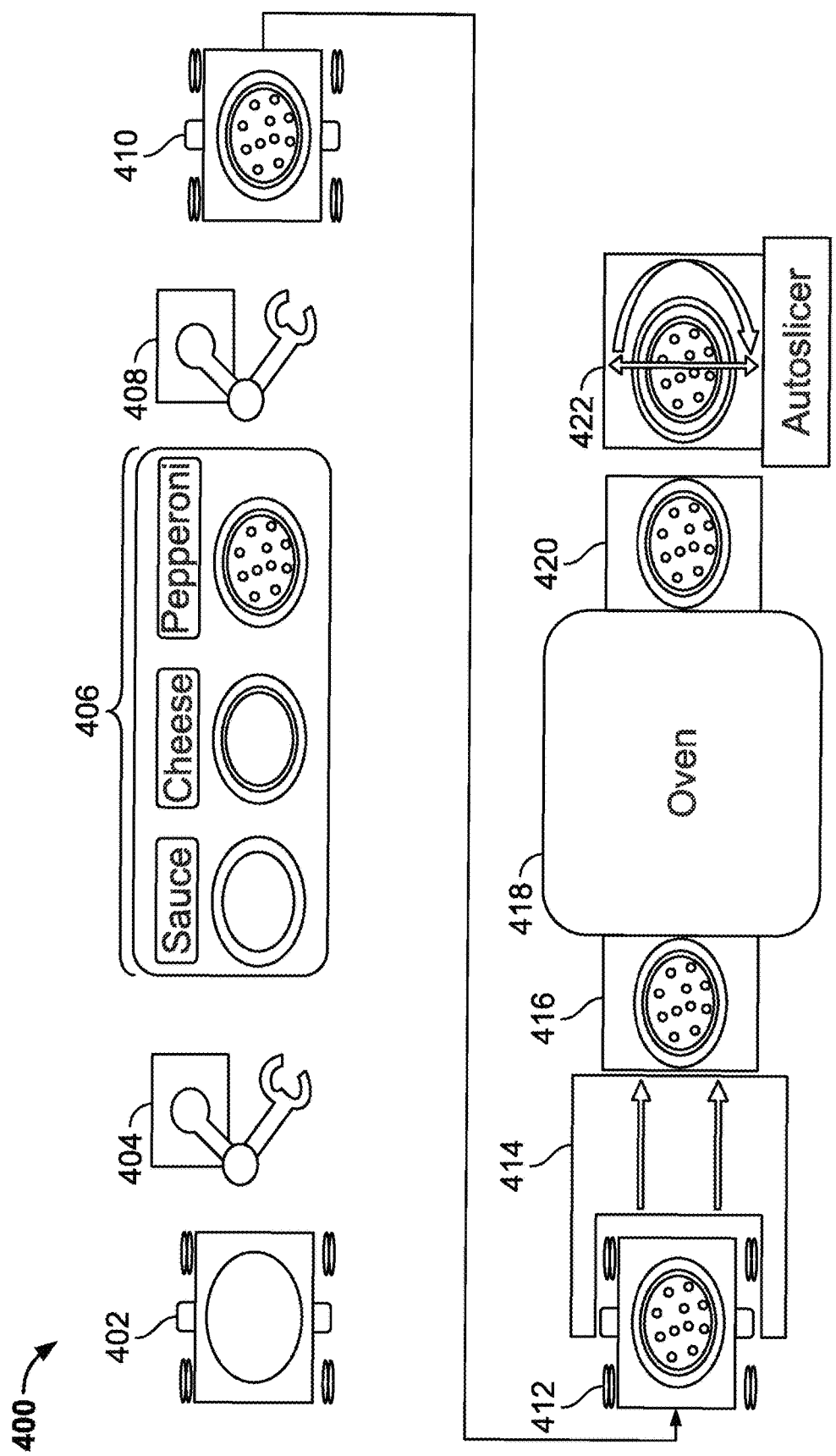
FIG. 4 depicts an exemplary modular food preparation environment for preparing pizza in accordance with some embodiments of the present disclosure.

FIG. 4 depicts an exemplary modular food preparation environment for preparing pizza in accordance with some embodiments of the present disclosure. In the exemplary embodiment of FIG. 4, each of the modular food preparation workstation (e.g., depicted as dispensing sauce, cheese, and toppings for a pizza 406) and the electromechanical component (e.g., depicted as an oven 418 cooking the pizza) may be part of a modular system, such that modular food preparation workstation can be repurposed by replacing consumable components and/or electromechanical components (e.g., to prepare burritos or quesadillas) and the oven can be repurposed to perform other cooking functions (e.g., searing or broiling versus baking). Furthermore, each electromechanical operation performed by the electromechanical components of the modular food preparation workstation 406 and the oven 418 may be individually controlled for particular orders or users as described herein (e.g., based on modifications to consumable component and electromechanical operation data structures, and translation of those modifications to instructions to instructions that modify processing as described herein).

In the exemplary embodiment of FIG. 4, flattened dough may be provided and may be accessible (e.g., on a tray via robotic access to a speed rack 402) to the modular food preparation workstation 406. The tray may include interfaces for interfacing with transfer equipment (e.g., a robot 404 having a mating interface) as well as the modular food preparation workstation 406 (e.g., to be situated at a correct position on a linear stage and rotary table). An order may be received specifying information such as types and quantities of sauces, cheese, and toppings. The specified information may be converted into instructions for operating the electromechanical components of the workstation 406 (e.g., sauce dispenser, cheese de-clumper and dispenser, topping cutter and dispenser, and movements of the linear stage and rotary table) to selectively control the amount, size, pattern, and other characteristics of the application of the consumable components, as described herein. Once the food preparation workstation 406 completes the preparation of the consumable item, the consumable item may be removed from the module by a transfer component such as a robot 408 for immediate processing (e.g., direct transfer to a prep table, oven, or other system of subsequent processing), or as depicted in FIG. 4, to a speed rack 410 for temporary storage.

In an embodiment, transfer equipment such as an AGV 412 transporting the tray of the consumable items may transfer the consumable items to the electromechanical component (e.g., an oven 418) via an auto loader 414 that receives the tray and/or speed rack and transfers items (e.g., to a conveyor 416) for cooking by the electromechanical component. The particular temperature and conveyor speed through the oven may be controlled based on user selections such as to pizza type and preferences. Once the pizza has been cooked at the oven, transfer equipment (e.g., a conveyor 420 or robot) may transfer the pizza for post-cooking processing, for example, placing additional toppings on the pizza at automated electromechanical equipment or an aided manual workstation such as a smart prep table, or as depicted in the exemplary embodiment of FIG. 4, to an autoslicer 422 that slices the completed pizza according to default or user-selected slicing sizes and patterns.

Figure 5:
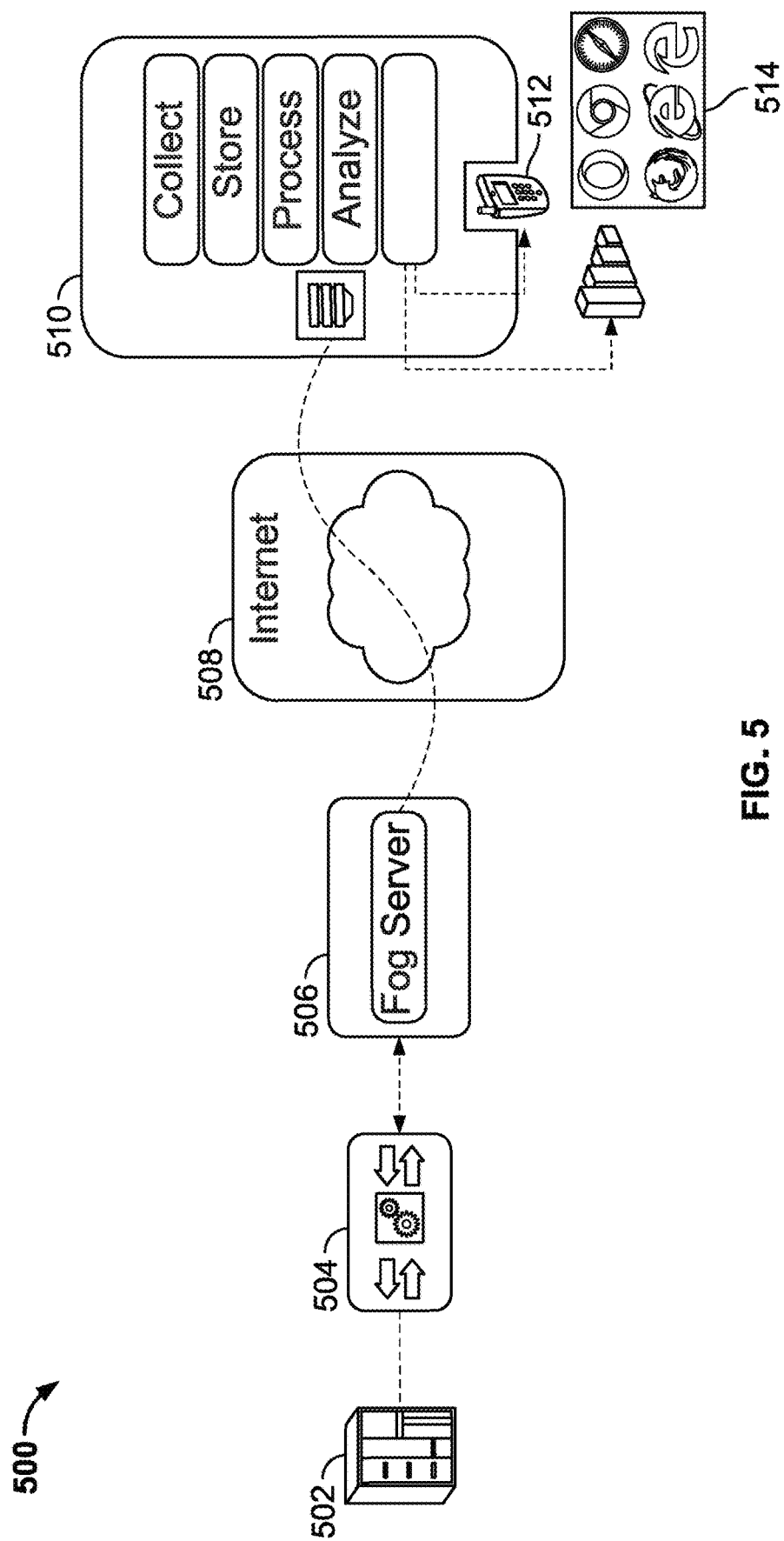
FIG. 5 depicts exemplary data collection, aggregation, analysis, and control systems in accordance with some embodiments of the present disclosure.

FIG. 5 depicts exemplary data collection, aggregation, analysis, and control systems in accordance with some embodiments of the present disclosure. As the food is accessed, processed, and prepared in the back-of-house environment, continuous status updates of the cooking process are provided to the local controller (e.g., associated with particular orders and how they are processed), for immediate or timed relay to the gateway device and/or fog computing device or server where additional processing can be performed.

In some embodiments, processors resident on equipment or sensors may perform first-level data analysis and fault detection, i.e., prior to data being provided to the processing system and components depicted in FIG. 5. The local components 502 may be networked to each other (e.g., via a mesh network) such that data may be shared and processed prior to being provided to the controller. For example, food preparation equipment such as an oven may measure numerous parameters such as input current, programmed heat, output heat, heat zones, utilization (e.g., density of coverage of food within the oven), conveyor speed, etc. Quality control devices such as temperature probes, scales, camera vision systems, etc., may perform quality control measurements on an output from the oven. Additional sensors may measure other information such as environmental information (temperature, humidity, etc.). This information may be communicated between the local devices (e.g., via direct network addressing or via communications between nodes of a mesh) such that processors within the local network can make immediate process changes based on immediate feedback of related data (e.g., modifying cooking temperatures and conveyor speeds based on measured environmental and quality data). This same data and any computed results may also be provided to the controller/gateway/fog/cloud, etc. for further processing as described herein.

An embodiment of a data streaming chain from the controller to the gateway device 504, then onward to the fog computing device 506, the internet 508 and to the cloud 510 is depicted in FIG. 5. For example, local computation for integrating front-of-house and back-of-house operations may be performed at any suitable level of the system. In some embodiments, and depending on network implementations, some or all of the local components (e.g., controller, gateway, fog, etc.) can be combined into a single device or distributed over multiple devices.

In an exemplary embodiment, the food preparation equipment may be implemented in a restaurant management environment, which may operate at the level of a single establishment, an enterprise having multiple establishments, or across an entire industry. Enterprise-level and industry-level operations may be supported by connecting local monitoring and control information for an establishment to the cloud, e.g., via the internet. As described herein, the establishment may collect data from numerous other sources in addition to food preparation equipment, robots, and AGVs, such as local sensors (e.g., video, audio, time-of flight, inventory monitoring, etc.) and from other connected devices (e.g., of employees and customers). This information may be collected locally at the establishment and portions of the analysis and operational controls may be handled at the establishment by a gateway and/or fog device.

Enterprise-level information may be gathered from multiple establishments associated with the enterprise while industry-level information may be gathered from multiple entities within a shared industry (e.g., pop-ups, food trucks, restaurants, concert venues, sports venues, nightclubs, pubs, casual eateries, etc.). Enterprise-level and industry-level information may also be gathered from data sources other than the establishments, for example, based on restaurant data (e.g., food item inventory, prices, time-to-delivery, supply auctions, etc.), third party data suppliers (e.g., trade organizations, proprietary data sources), and other information that may be relevant to food usage, consumption, theft, and operations (e.g., promotions, events, venue information, performer information, human movement and commute patterns, social media data, etc.).

Different information sources at different levels of the analysis stack may selectively transmit, encrypt, anonymize, obscure, delete, monitor, analyze, and/or control information in different circumstances. For example, only some monitored data (e.g., analysis, reports, removal of PII, etc.) may be provided from the establishment to the enterprise, and similarly, the enterprise may limit the types of information that is provided to the industry-level system. Communications may similarly be limited or modified within the establishment, for example, to prevent association with employees or customers. Information transmitted to and from the food preparation equipment may be encrypted or otherwise modified to limit the possibility that personal information or other information such as financially valuable information is intercepted (e.g., encrypting food item recipe transmissions within the network, or preventing third-party snooping on consumption of particular foods).

In some embodiments, the food preparation equipment and supporting hardware and software can be provided as a service, e.g., such that the establishment or enterprise is not required to make a significant capital investment to employ the integrated restaurant environment. In such a system, fees and/or credits may be based on a flat fee or may be selected based on amount prepared, functionality utilized, analytics provided, promotions, etc. In some embodiments, pricing may be dynamic based on these factors, for example, to facilitate reduced pricing if a volume of certain foods is prepared, breakdown rate, quality of care and preventative maintenance, identified incidents of theft or fraud, etc.

Figure 6:
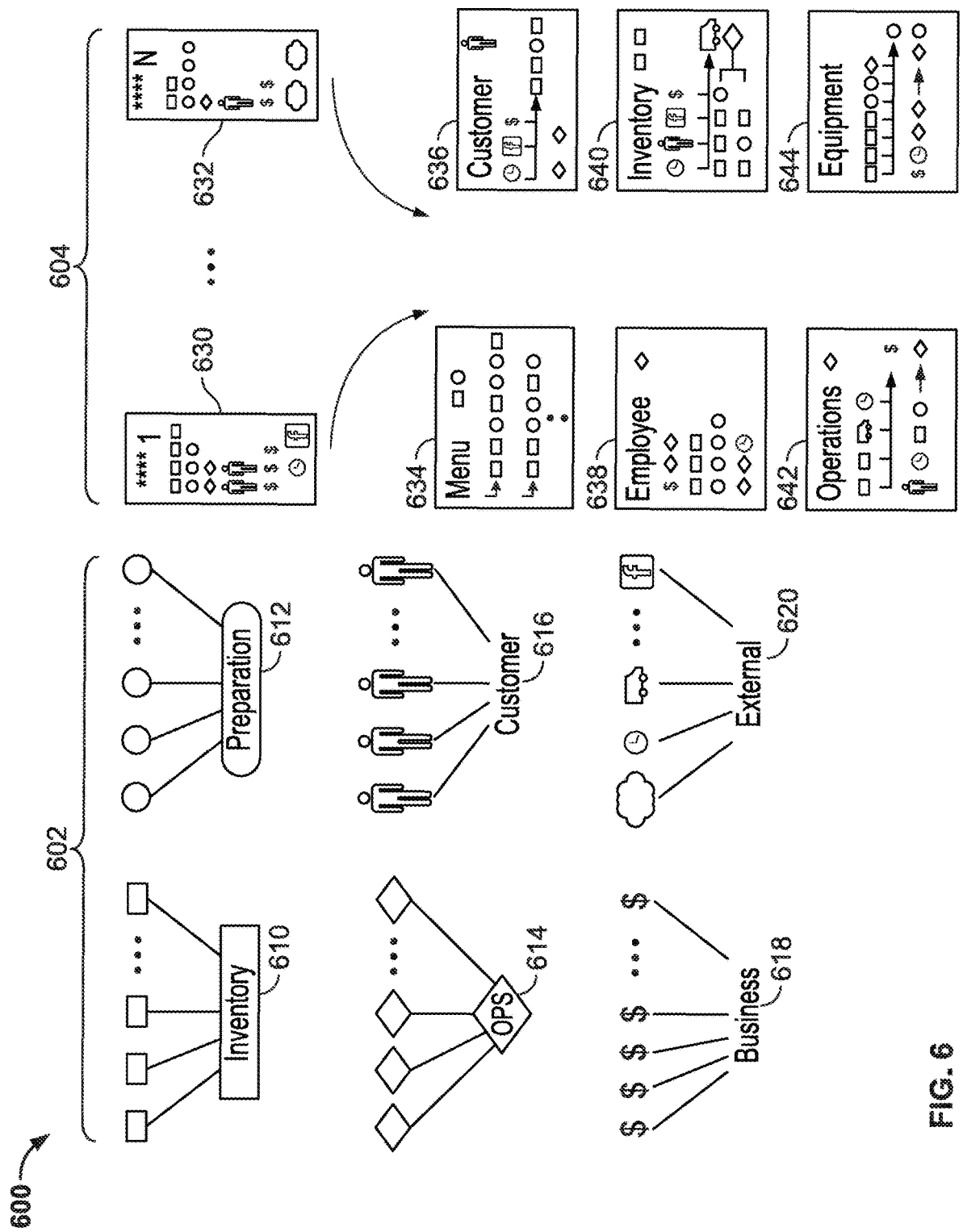
FIG. 6 depicts exemplary data primitives, order-level primitive collections, and primitive-based analytics in accordance with some embodiments of the present disclosure.

FIG. 6 depicts exemplary data primitives, order-level primitive collections, and primitive-based analytics in accordance with some embodiments of the present disclosure. In accordance with the present disclosure, data structures and data primitives may enable real-time establishment-level controls, data analytics, and predictive management of restaurant operations. In this manner, the systems and methods of the present disclosure enable real-time integration of front-of-house information (e.g., menu items, drinks that are ordered by the customer, charge for the order, PoS information, time of order, type of food and drinks being ordered, employee ID, employee information, wait time, items consumed, customer reviews, etc.) with back-of-house information (e.g., inventory, supplier availability, storage capacity, state of the cold storage, location and state of the automated devices or employees for transporting food items and prepared food accessories, location of the robots or employees, location of food storage, status of modular preparation equipment, quality checks, electromechanical components, etc.) to perform real-time process controls (e.g., accessing food and ingredients from inventory, providing AR-guided instructions to employees, queueing orders, reassigning employees, adjusting menu items, providing specials and promos, performing preventative maintenance, reconfiguring modular workstations, modifying electromechanical operations, etc.) and analytics and predictive modeling (e.g., managing inventory and suppliers, modifying menu items, changing recipes, adjusting prices, integrating seasonal items and menus, modifying food preparation equipment, changing food preparation procedures, performing preventative maintenance, etc.). Other external information such as event information, weather, location, demographics, social media, customer location data, etc. may also be integrated with the system as described herein.

Although a variety of primitive data types and categories may be utilized in accordance with the present disclosure, exemplary primitive data types include inventory data 610 related to consumable components (e.g., items in inventory, time of receipt, location, supplier, expiration date, ideal usage date, time accessed, quantity, etc.), preparation data 612 (e.g., recipes, time of preparation, employees involved in different preparation operations, time at each station or stage in the food preparation process, QC data, parameters and measurements of each station, associations with automated vehicles and robots, available electromechanical operations and parameters, compatible consumable components, utility requirements, maintenance data, libraries or APIs for communicating with electromechanical components, equipment status and utility usage, associated sensors, module integrations, available modifications, other compatible modules, etc.), operations data 614 (e.g., utility usage, alerts and warnings from equipment, PM schedules, PM checklists, locations and inventory of replacement parts, supply sources, available non-food raw materials, utensils, trays, containers of different types, glasses, scrap, kitchen layouts, etc.), customer data 616 (e.g., for customers who opt in, location data, order history, survey results, item rankings, custom menus, preferred menu items, birthday, event calendar, and other customer-related information and preference, etc.), business data 618 (e.g., cost of inventory, menu prices, menu items, utility costs, food suppliers, equipment and consumable suppliers, employee information, employee costs, overhead costs, etc.), and external data 620 (e.g., weather information, date/calendar/event information, links to third party data sources such as real-time delivery information, social media, third-party analytics and pricing info, etc.).

Although data primitives can be grouped in other fashions than by orders (e.g., time of day, customers, employees, menu item, etc.), in an exemplary embodiment a variety of data primitives representing the integrated front-of-house and back-of-house operations can be added to an order throughout the preparation and service process to build an order-based data structure 604, as depicted by associations of each of the categories of primitive data with particular orders 630 and 632 in FIG. 6. In this manner, an order can be established with the PoS system and all aspects of the order may be tracked from inventory source to scrap. For example, a single completed order data structure may include transaction ID, customer ID, establishment ID, container IDs, equipment IDs, employee IDs, elapsed time at each step, ingredient and inventory data, equipment status, electromechanical operations, monitoring of electromechanical operations, QC results, equipment faults, customer ratings, delivery time, virtual restaurant settings, scrap, related orders, robot and AVG status and movement records, utility and resource usage records, energy management information (e.g., bang-bang controls, energy cycling), coupons and promotions used, current advertisements being run, location of ordered item on the menu, weather conditions, event data, relevant social media posts, suppliers for inventory, data from equipment (e.g., for fridges, freezer burn, relative locations, humidity) and other related information. In some embodiments only core order information such as inventory, employee data, equipment data, and time for each operation may be stored with the order data structure while other data structures may store other information (e.g., utilities, supplier info, equipment faults) in a manner that may be associated with particular orders at a later time (e.g., based on timestamps).

The order-level data may be aggregated and analyzed to perform a variety of analyses, e.g., based on associations with data primitives from the orders. For example, menu items 634 may be associated with inventory, preparation, and operations primitives. Such a data structure may be used to automate restaurant operations, effectively providing a structured guide for the preparation of food items. Other example analyses data sets based on analysis of order-level data are depicted in FIG. 6 and include customer data structures 636, employee data structures 638, inventory data structures 640, operations data structures 642, and equipment data structures 644.

Figure 7:
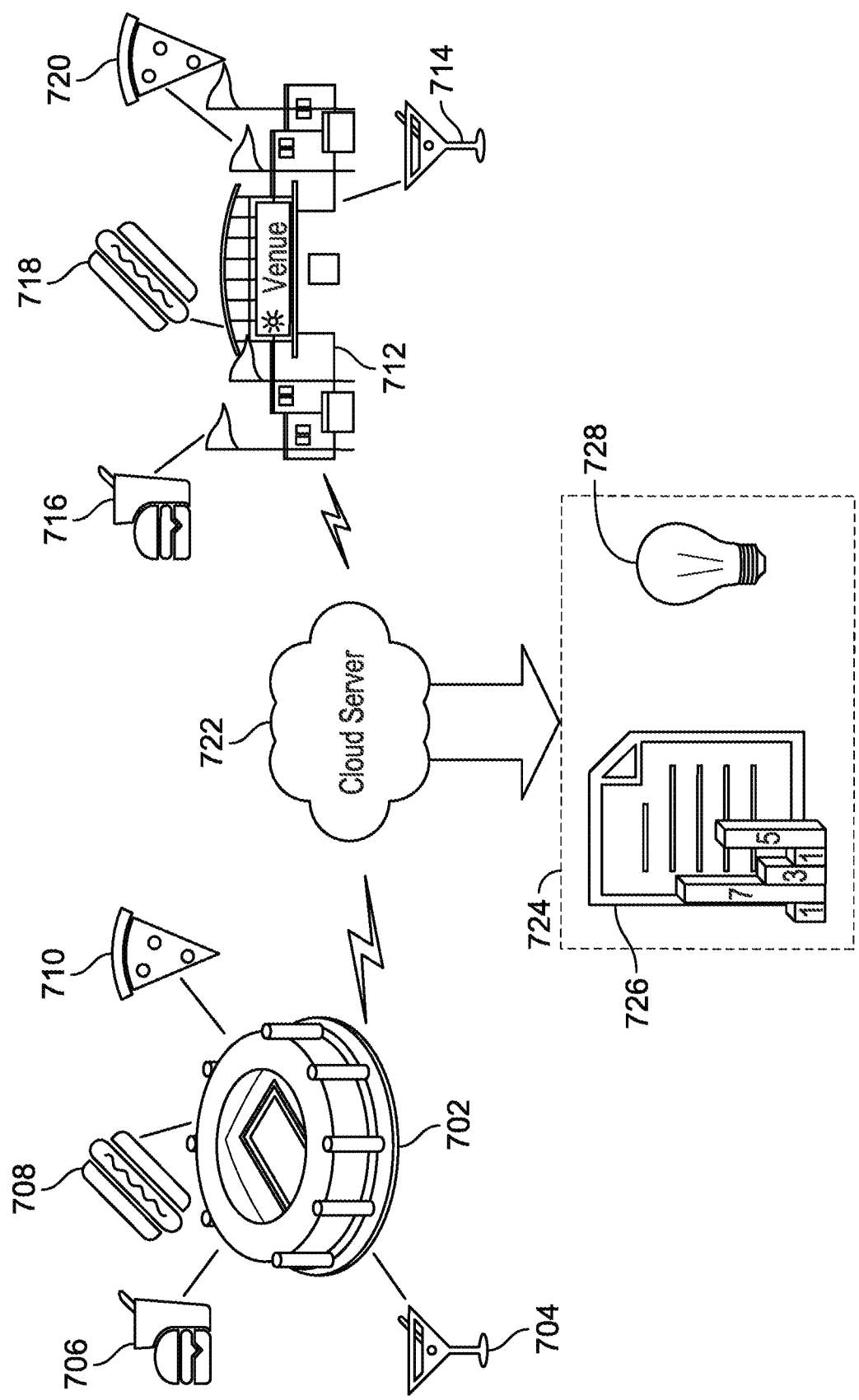
FIG. 7 depicts a network of communication systems integrated with the integrated food preparation system in accordance with some embodiments of the present disclosure.

FIG. 7 depicts a network of communication systems integrated with the integrated food preparation system in accordance with some embodiments of the present disclosure. In some embodiments, a cloud server 722 aggregates data collected at multiple venues to produce summary reports and predictive analytic reports. For example, a sporting venue 702 within a metropolitan area may be hosting an event and may include multiple establishments serving food drinks (e.g., restaurants 706, 708, and 710, and bar 704) while a concert venue 712 in close proximity to the sporting venue 702 may also have multiple establishments serving food and drinks (e.g., restaurants 716, 718, and 720, and bar 714). The individual establishments and venues may provide information to cloud server 722, which may aggregate information based on a variety of parameters (e.g., establishments owned or franchised from a common enterprise in both of venues 702 and 712, all establishments within a respective venue, information for other adjacent businesses, etc.). The information may be processed by the analytics system 724 to provide predictive analytics 728 (e.g., predicting traffic, drinks that will be in demand, employee needs and deployment, etc.) and reports 730 (e.g., identifying patterns, profitability, etc.).

In an embodiment, the analytics system 724 may aggregate and indicate establishment data by event occurring during the time of service, as well as combining this information with user, inventory, supplier, environmental, and other data sources as described herein. For example, an establishment located near a sports arena may register an increased number of customer orders due to the occurrence of a football game that evening. The data can be collected and associated with context such as time, location, and/or nearby events to be used to forecast service information as described herein. This forecasted information may then be used to plan future business operations such as staffing, inventory, etc.

Figure 8:
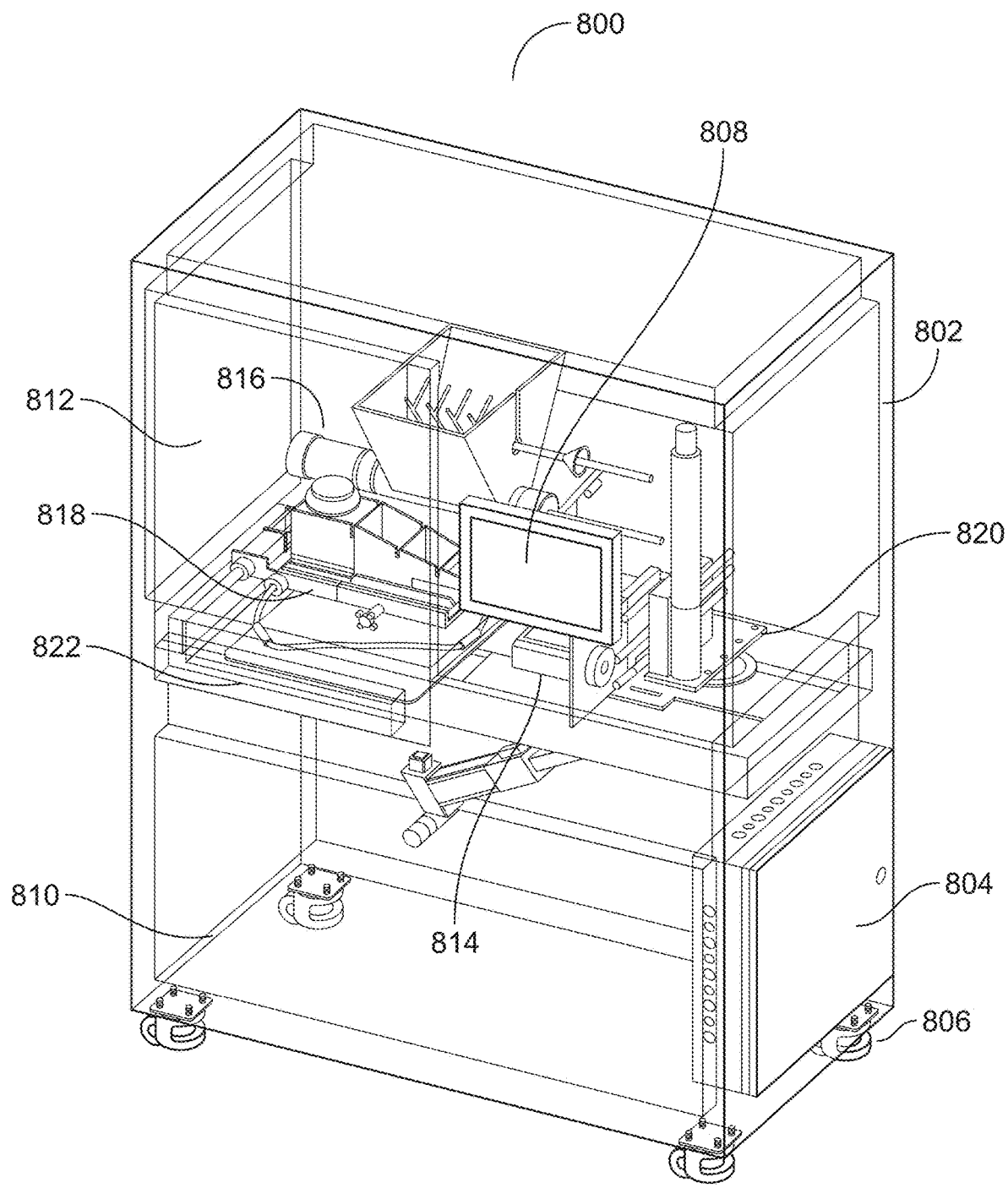
FIG. 8 depicts an exemplary food preparation module in accordance with some embodiments of the present disclosure.

FIG. 8 depicts an exemplary food preparation module 800 in accordance with some embodiments of the present disclosure. The exemplary food preparation module of FIG. 8 is depicted as including an enclosure 802 and may be movable as depicted by casters 806. Although not depicted in the images of FIG. 8, slots, latches, and/or other interfaces may allow the food preparation module of FIG. 8 to interface with an AGV or other equipment capable of automatically moving the food preparation module as described herein. Utility connections (not depicted) to utility box 804 can include quick-connect (e.g., Twist lock connectors, NEMA rated twist lock connectors, Push to connect connectors, and Quick clamp connectors) or may be capable of continuous routing such as via a floor or ceiling integrated utility supply system.

In the exemplary embodiment of FIG. 8, the food preparation module may be described as performing a set of preliminary operations for preparation of a pizza, although it will be understood that the food preparation module may be used to prepare other similar items that require uniform and consistent application of consumable components, such as burritos, sandwiches, salads, pitas, etc. As depicted in FIG. 8, in an exemplary embodiment all of the electromechanical components that perform electromechanical operations on the consumable components to create the consumable (i.e., customer ordered) item may be located within the enclosure 802, such that an employee or other user's only interface with the food preparation module is via a predefined graphical user interface and protected physical interfaces (e.g., for maintenance or assisting in swapping out of electromechanical components).

A feed slot 822 provides a location for the base of the consumable item (e.g., pizza dough on a suitable tray) to be inserted to and removed from the food preparation module 800, either manually or by robotic or automated systems as described herein. A human-machine interface ("HMI") 808 such as a touch screen provides an interface for monitoring, control, and customization of the operations of food preparation module 800, although other interfaces (e.g., keyboard, mouse, voice control, remote applications executing on other devices, etc.) may be used for interfacing with the food preparation module 800. A utility cabinet portion 810 may include routing for utilities, storage of consumables, and other supporting equipment and services for the food preparation module. A preparation cabinet portion 812 may include interfaces for the preparation of the consumable item. In an exemplary embodiment of a food preparation module 800 for pizza, a linear stage and rotary table 814 may move the consumable items to different stations such as a sauce dispenser (not visible in FIG. 8), cheese dispenser 818 (e.g., fed by cheese feed 816), and pepperoni slicer 820. At each station the linear stage and rotary table may translate and rotate the dough with respect to the stations (e.g., primarily fixed in some embodiments) to apply the toppings in a desired manner (e.g., uniformly, over only a portion of the dough, or with different consistencies/thicknesses over different portions of the dough).

Figure 9:
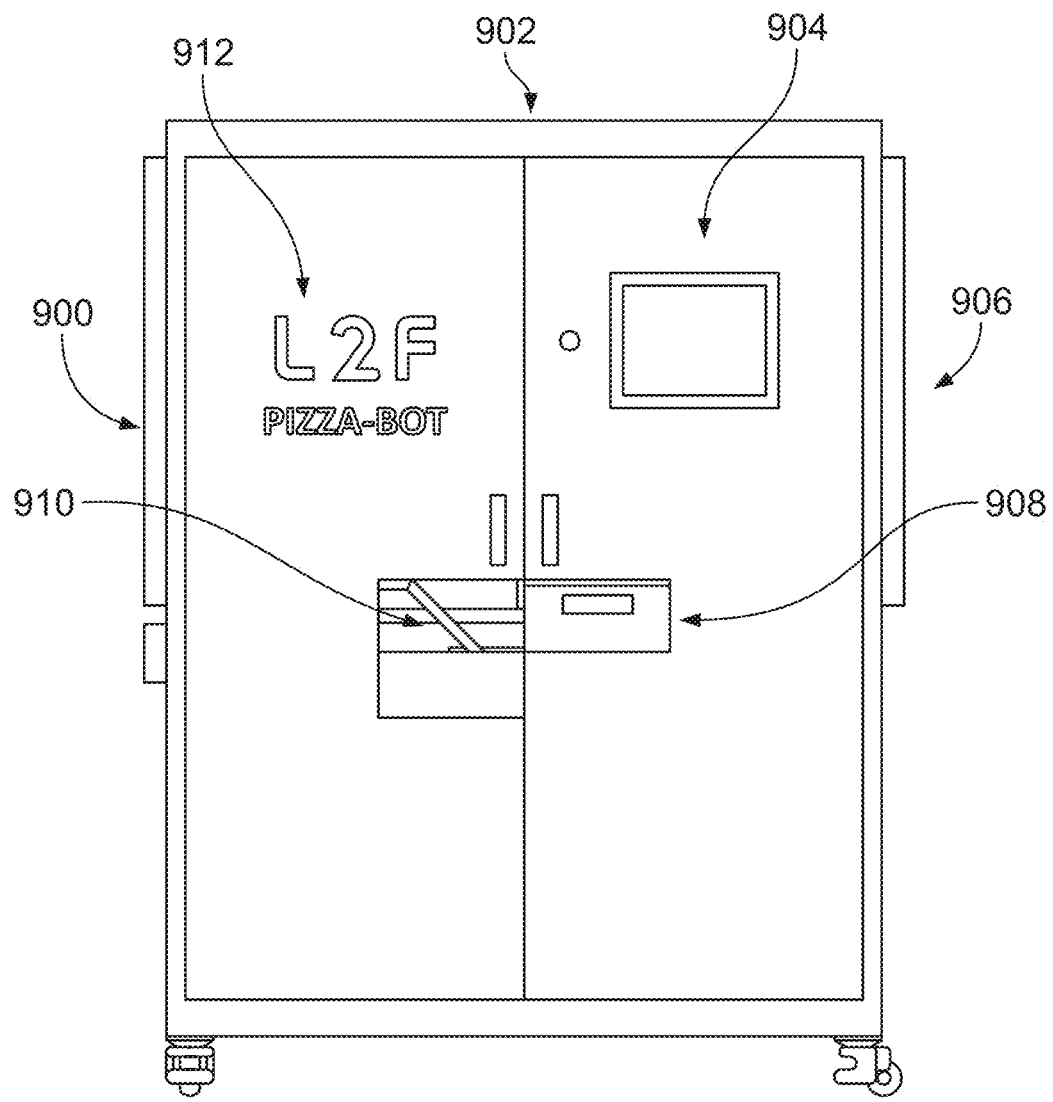
FIG. 9 depicts an external view of an exemplary food preparation module in accordance with some embodiments of the present disclosure.

FIG. 9 depicts an external view of an exemplary food preparation module 900 in accordance with some embodiments of the present disclosure. In an exemplary embodiment an HMI display 904 may be provided as a graphical user interface, although other interface types (e.g., voice, remote, etc.) may be provided in other embodiments. In the exemplary embodiment depicted in FIG. 9, inputs provided via a graphical user interface of the HMI provide guidance and instructions to a control layer of software allowing for the automated electromechanical equipment of the modular workstation 900 to customize and personalize the food preparation steps allowing for the execution of a food process that is also tailored to an individual customer request. The process automation utilizes the UI to capture inputs and manipulate the various aspects of the system via the individual automated components to customize the food preparation in order to provide the end-user or requestor the exact item that they requested, for example, by selecting among available options for electromechanical operations that are available on the electromechanical equipment of the modular workstation. The process automation is designed to interpret the input commands from a simplified GUI command structure to instructions that can be directly processed by the individual electromechanical components, trigger responses, and communicate with other portions of the system (e.g., sensors) in order to customize and prepare the particular consumable item.

In the exemplary embodiment of FIG. 9, the module may be climate controlled (e.g., a refrigerated cabinet 902) to maintain an appropriate temperature for consumable components (e.g., dough, sauce, cheese, pepperoni) during storage and while the consumable item is being prepared. Further, a variety of interfaces may be provided for interfacing with users or transfer equipment. For example, a number of doors 912 and access locations 906 and 908 may be provided to permit access for a user or automated equipment to replace consumable components and/or electromechanical components within the module, for example, to enable different operations or to change a type of consumable item (e.g., pizza versus burritos) that is prepared by the module. An access location 910 may also be provided for interfacing with transfer equipment (e.g., a robotic arm) that may provide trays and retrieve partially-completed consumable items from the module.

Figure 10:
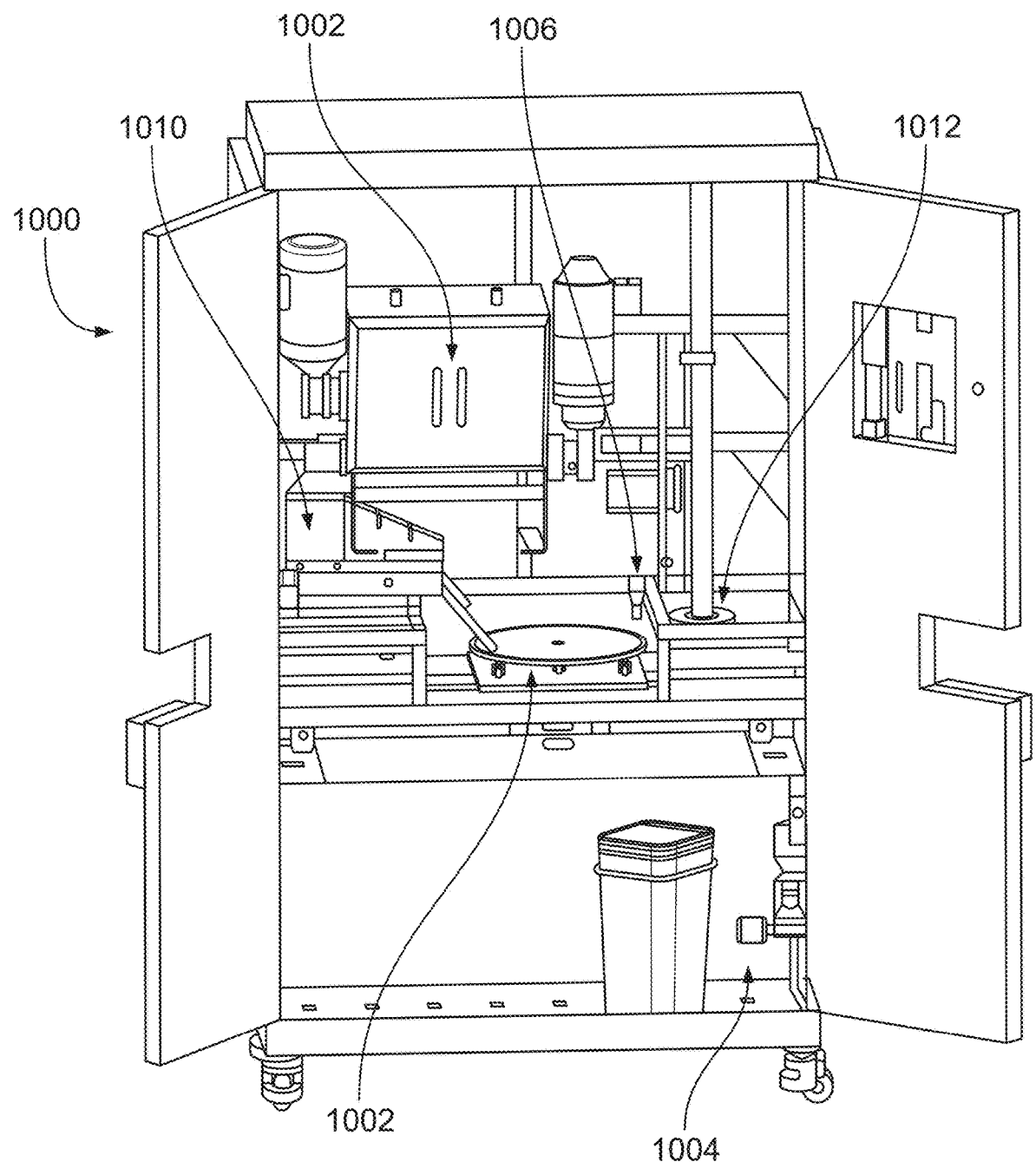
FIG. 10 depicts an internal view of an exemplary food preparation module in accordance with some embodiments of the present disclosure.

FIG. 10 depicts an internal view of an exemplary food preparation module 1000 in accordance with some embodiments of the present disclosure. In the exemplary embodiment of FIG. 10, the module has been provided with consumable components and electromechanical components to apply sauce, cheese, and pepperoni to pizza dough, although it will be understood that consumables and operations may be added, substituted, and/or removed based on user selections, as described herein. In the exemplary embodiment of FIG. 10, the consumable items may include pizza dough, pizza sauce, cheese, and pepperoni. The exemplary electromechanical equipment may include a linear stage and rotary table 1002 for selectively moving the pizza dough with respect to other equipment, utility feeds 1004, a sauce pump and dispenser 1006 for dispensing sauce, a cheese hopper 1002 with auger feeder and conveyor gate box assembly 1010 for distribution and spreading of cheese, and a slicer 1012 for providing and locating pepperoni.

Figure 11:
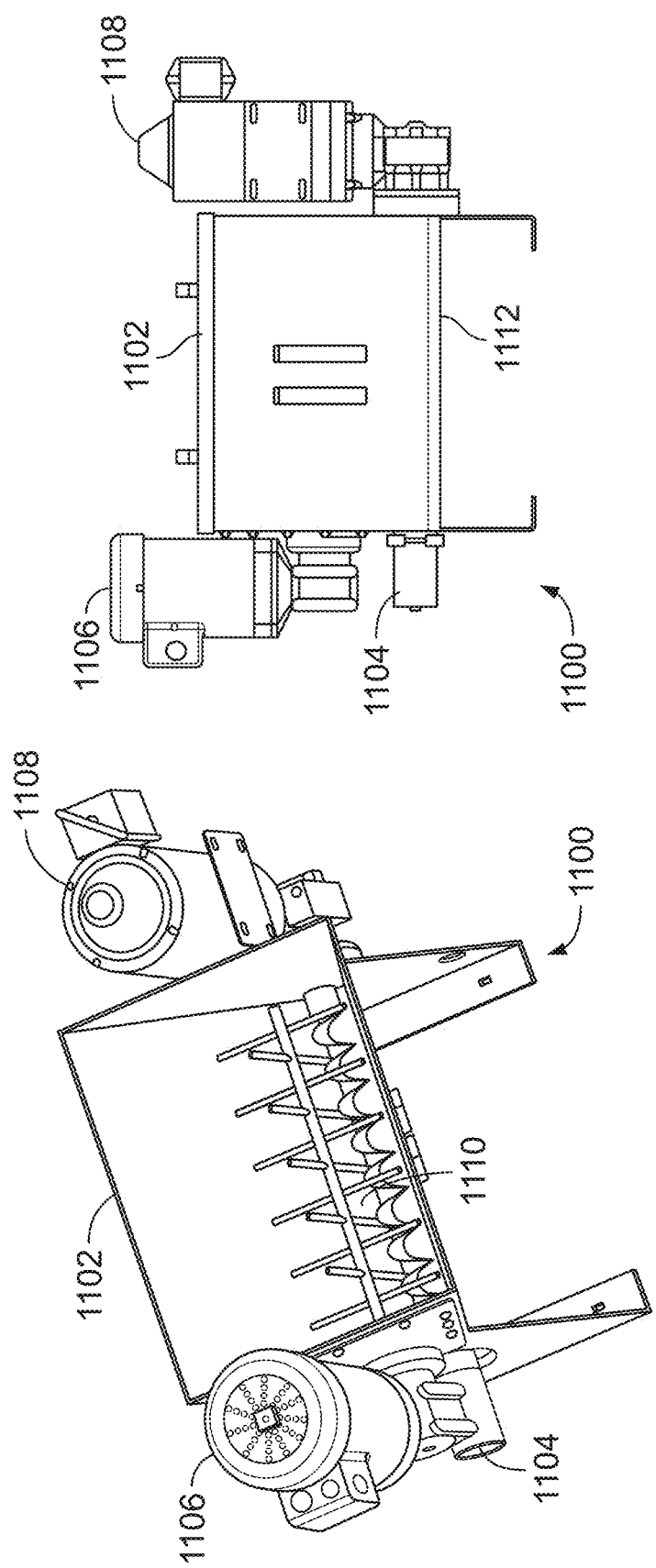
FIG. 11 depicts an exemplary electromechanical component for cheese distribution in accordance with some embodiments of the present disclosure.

FIG. 11 depicts an exemplary electromechanical component 1100 for cheese distribution in accordance with some embodiments of the present disclosure. In the exemplary embodiment of FIG. 11, a volumetric feeder 1102 may provide a quantity of cheese at a particular rate (e.g., based on a customized user selection for an amount and/or type of cheese, and associated data primitives for the consumable component for cheese and the available electromechanical operations for the electromechanical cheese distribution equipment) which may be regularly broken up and dispersed to prevent clumping and uneven distribution. The feeder shown is a volumetric feeder with an internal material conditioning apparatus 1110 to facilitate cheese de-clumping and breakup which allows for accurate distribution in any pattern, field, area, quadrant that is desired. The internal rake is independently driven from the feed auger 1106 to intermittently breakup the cheese. A proper amount of the correct type of cheese may be provided to additional electromechanical equipment such as the cheese distributor of FIG. 12, for example, via feed 1112 and feed control 1108.

Figure 12:
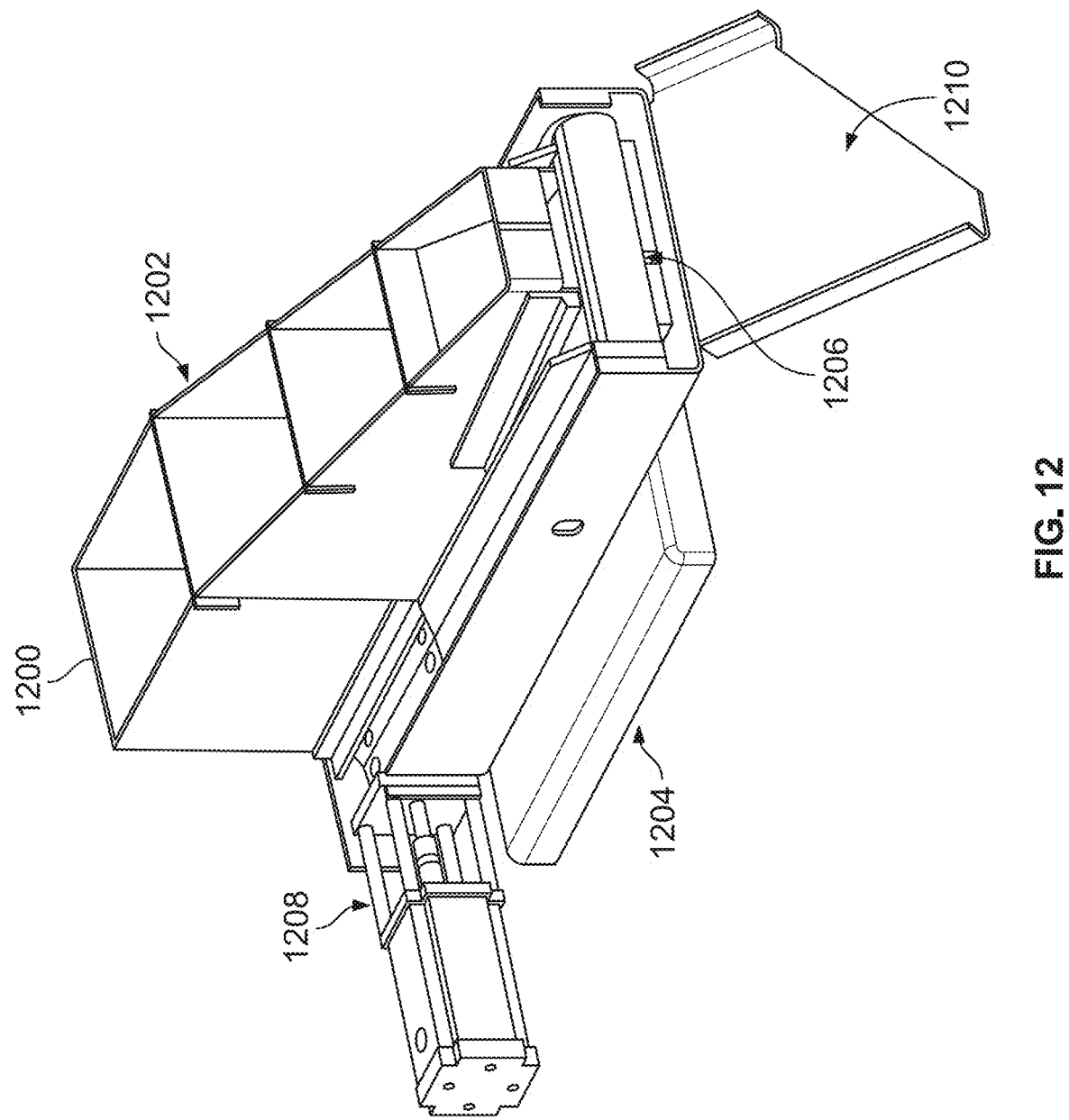
FIG. 12 depicts an exemplary electromechanical component 1200 for cheese distribution in accordance with some embodiments of the present disclosure.

FIG. 12 depicts an exemplary electromechanical component 1200 for cheese distribution in accordance with some embodiments of the present disclosure. Cheese received from other electromechanical components (e.g., the volumetric feeder of FIG. 11) may be provided to components such as a tapered gate box 1202 that holds a quantity of cheese to be distributed. When the preparation of the pizza reaches an appropriate stage (e.g., the dough is flattened and the sauce has been distributed on the dough), the linear stage and rotary table may locate the pizza below the dispense chute 1210, which in an exemplary embodiment may be sized to correspond applying a particular width (e.g., 1"-2") of cheese to the pizza while the linear stage and rotary table move and rotate the pizza with respect to the chute to apply the cheese to the pizza.

When the process of applying the cheese is to begin, a stepper motor 1208 may be actuated to cause a conveyor 1206 to distribute cheese to the dispensing chute at an appropriate rate to dispense a uniform and desired amount of cheese to the pizza. In an exemplary embodiment, the conveyer may be cleated to facilitate the movement of the cheese through the system and to keep cheese from flowing out of the gate box at a constant rate. In an embodiment, a load cell 1204 may measure a weight of cheese on the conveyor to provide feedback regarding respective quantities of cheese received from the volumetric feeder and dispensed onto the pizza. Although not depicted in FIGS. 11 and 12, additional sensors as described herein can monitor relevant parameters such as temperature humidity, size, shape, and appearance of the cheese and information related to associated equipment such as voltage, current, or other information that is indicative or loading or other conditions of the electromechanical equipment.

Figure 13:
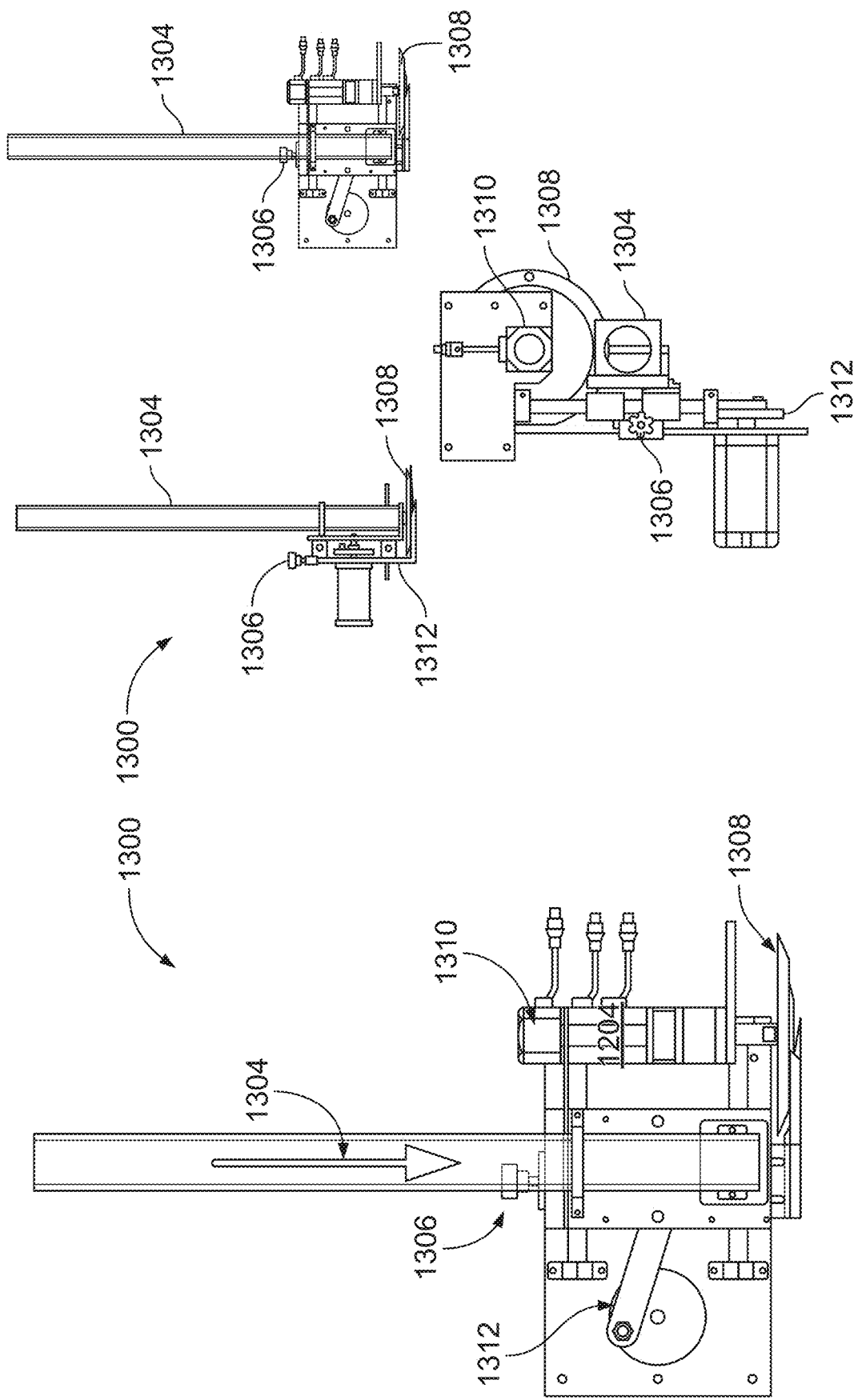
FIG. 13 depicts an exemplary electromechanical component for pepperoni slicing in accordance with some embodiments of the present disclosure.

FIG. 13 depicts an exemplary electromechanical component for pepperoni slicing 1300 in accordance with some embodiments of the present disclosure. In the exemplary embodiment of FIG. 13, a quantity of the consumable component (e.g., pepperoni) may be provided to an electromechanical component (e.g., pepperoni slicer) to perform an electromechanical operation (e.g., slicing and distributing the pepperoni to the pizza) based on the particular selections of a customer order (e.g., thickness and quantity of pepperoni for an ordered pizza) as applied to the available options (e.g., based on data structures and options for the consumable component, electromechanical component, and electromechanical operation). In the exemplary embodiment of FIG. 13, a stationary pepperoni slicer and dispenser may distribute pepperoni at a timing and rate while the linear stage and rotary table moves the pizza with respect to the dispensed pepperoni.

An exemplary guide tube 1304 may direct the consumable component (e.g., pepperoni) towards the slicing and dispensing machine. A slice thickness may be programmable and/or may be manually adjusted via a slice thickness adjustment knob 1306. A stepper motor 1312 may be rotary driven with the drive motion translated to a linear motion for shuttling the pepperoni over the blade 1308, while a servo motor 1310 with a gear head drives the slicer blade. The sliced pepperoni may then fall to a deflector which distributes the pepperoni onto the pizza below.

Figure 14:
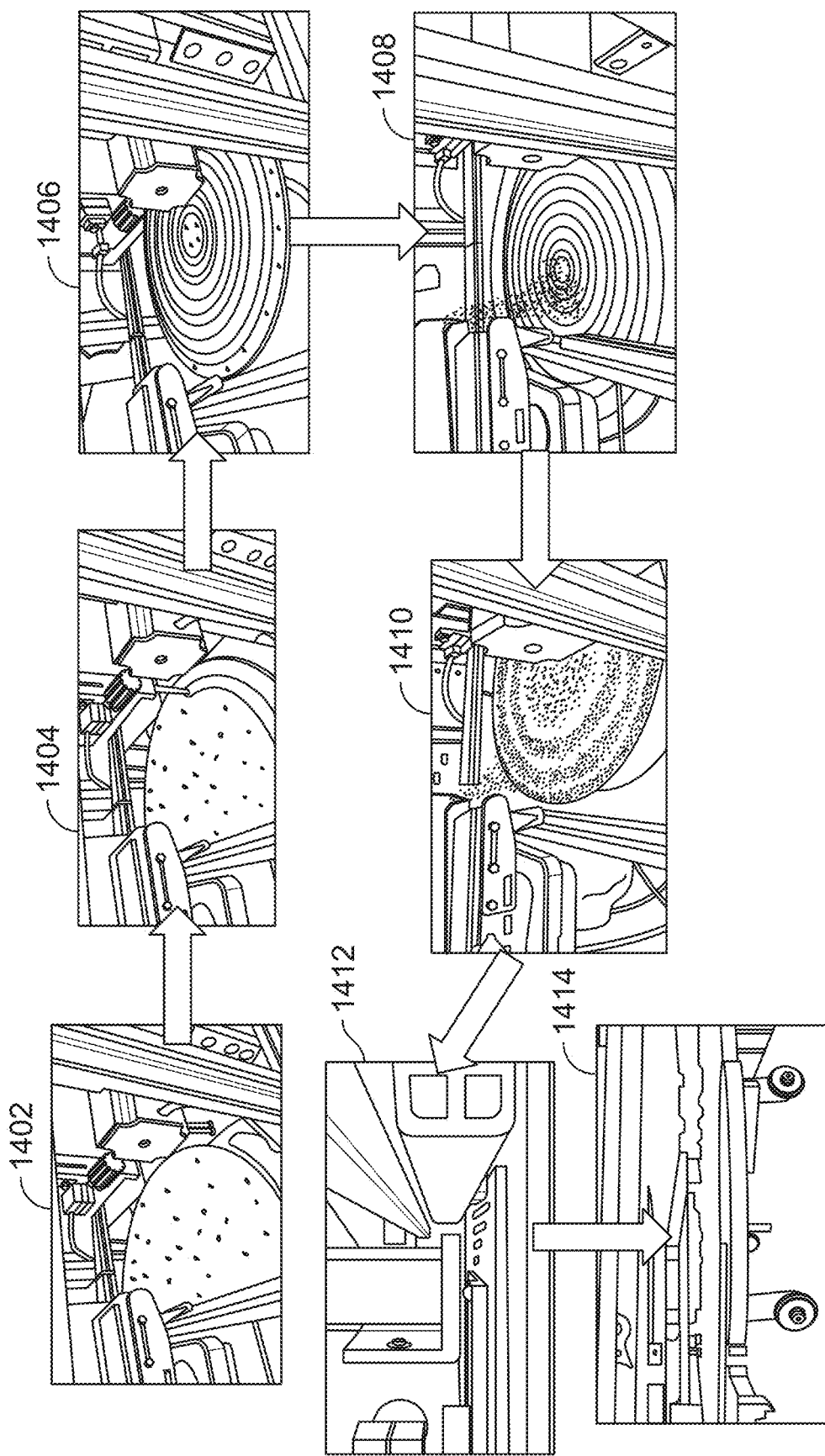
FIG. 14 depicts exemplary steps of operation of electromechanical components on consumable components within a food preparation module in accordance with some embodiments of the present disclosure.
Figures 15C, 15D:
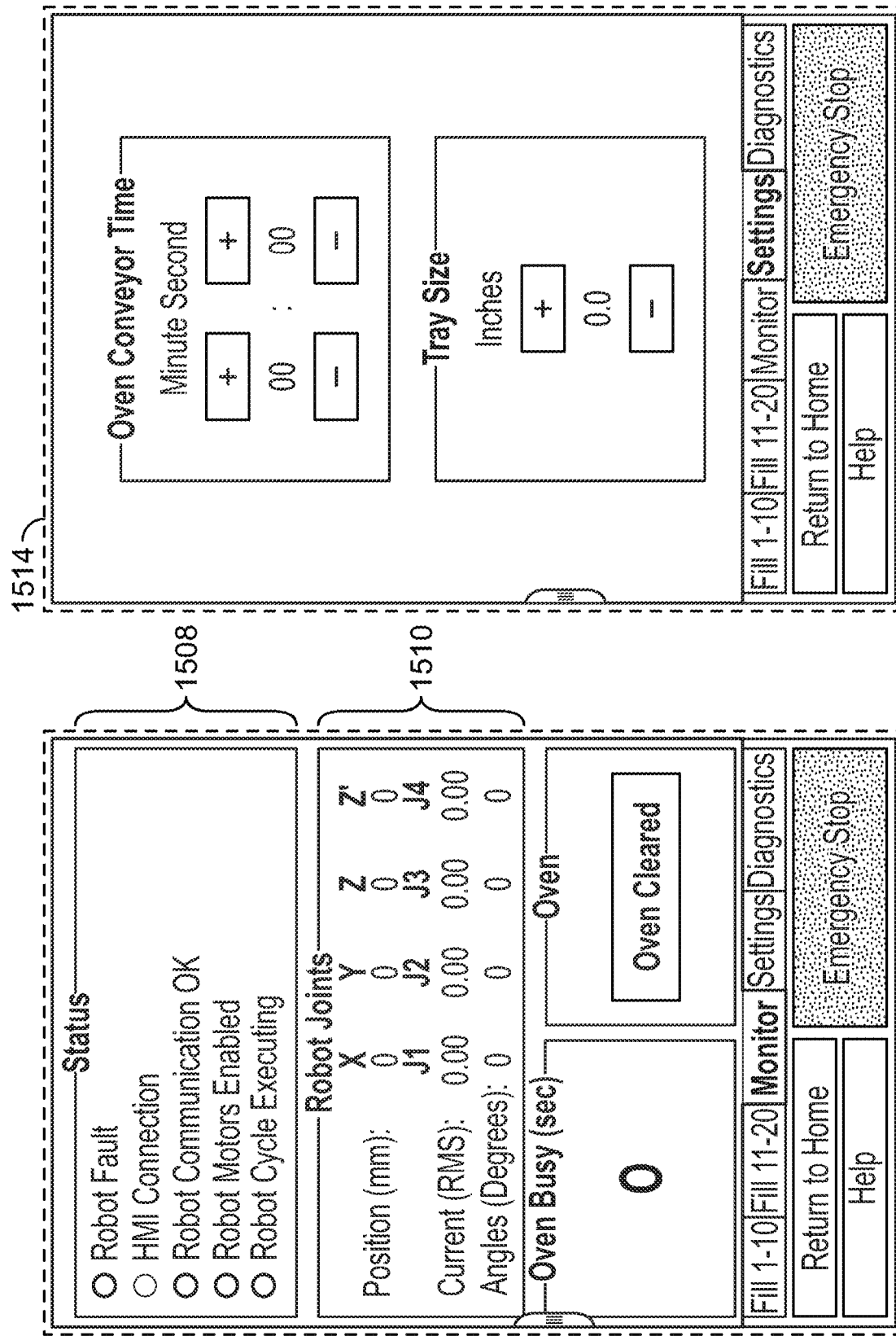

FIG. 14 depicts exemplary steps of operation of electromechanical components on consumable components within a food preparation module in accordance with some embodiments of the present disclosure. Although FIG. 14 will be described in the context of the particular pizza module described with respects to FIGS. 8-13 and particular consumable components for use therein, it will be understood that a variety of electromechanical operations may performed with a variety of consumable items. For example, additional dispensers, slicers, and other components may be included within the module, and consumable components may be selectively provided to different electromechanical components. For example, multiple sauce types may be distributed via multiple dispensing heads, additional slicers and/or dispensers may be provided for different types and sizes of toppings (e.g., vegetables vs. meats, small consumables vs. large consumables, pre-sliced items vs. items requiring slicing, etc.). Further, although the operations of FIG. 14 are described with respect to stationary dispensing and slicing operations and a movable linear stage and rotary table, it will be understood that one or more of the slicing or dispensing modules may also move while applying a consumable to the pizza.

With respect to the exemplary embodiment of FIG. 14, each step shown in FIG. 14 can be customized and personalized through the graphical user interface, an application (mobile, desktop or otherwise), a user-selectable and customizable recipe or other such methods that can take inputs directly into the system and associate them with appropriate data types (e.g., consumable component and electromechanical component data structures such as primitives) that may be used to control the processing of the consumable components by electromechanical operations as described herein (e.g., by providing machine instructions to the electromechanical components). Examples of such customization and personalization can be but are not necessarily limited to determining how much of the pizza dough gets sauce, how thick should the dispensation be of the sauce, should there be different types of sauce in different quadrants or different areas of the pizza dough, should the cheese be distributed uniformly across the entire surface of the dough, should there be a pattern to the cheese being distributed, and should there be pepperoni in a particular pattern, area, or quadrant of the pizza dough. In embodiments any or all of these changes can be accommodated with a quick change in the control system and requested via the graphical user interface, the mobile or desktop application, the user-selectable and customizable recipe, etc.

In an exemplary embodiment, a tray including pizza dough may be loaded into the pizza module (e.g., by a transfer system such as a robot) at step 1402. The linear transfer table may move the tray and dough along the x, y, and z axes to locate the dough in a particular location with respect to a particular sauce dispenser at step 1404. As the sauce dispenser begins dispensing the sauce, the rotary table may begin rotating and moving the dough linearly within the x-y plane to apply the sauce to the dough with a particular pattern at step 1406. Although a particular spiral pattern in depicted in the embodiment of FIG. 14, other patterns may be implemented by other motion profiles, the dispensation of a sauce may be selectively controlled, and multiple sauces may be provided in a manner that allows numerous options as to the type, quantity, and pattern of dispensed sauce or sauces.

Once the sauce is dispensed, the linear stage and rotary table may move the dough (with sauce) on the tray to a location below the cheese dispenser at step 1408. As the cheese dispenser begins dispensing the cheese, the rotary table may begin rotating and moving the dough and sauce linearly within the x-y plane to apply the cheese with a particular pattern at step 1410. Although a particular spiral pattern in depicted in the embodiment of FIG. 14, other patterns may be implemented by other motion profiles, the dispensation of cheese may be selectively controlled, and multiple cheeses may be provided in a manner that allows numerous options as to the type, quantity, and pattern of dispensed cheese or cheeses.

Once the cheese is dispensed, the linear stage and rotary table may move the dough (with sauce and cheese) on the tray to a location below the topping dispenser at step 1412. As the topping dispenser begins dispensing cutting and dispensing the topping (e.g., pepperoni), the rotary table may begin rotating and moving the dough (with sauce and cheese) linearly within the x-y plane to apply the topping with a particular pattern at step 1414. Although a particular spiral pattern in depicted in the embodiment of FIG. 14, other patterns may be implemented by other motion profiles, the dispensation of toppings may be selectively controlled, and multiple toppings may be provided in a manner that allows numerous options as to the type, quantity, and pattern of dispensed topping or toppings.

FIGS. 15A-15D depict exemplary top level user interfaces in accordance with some embodiments of the present disclosure. By integrating front-of-house and back-of-house information into coherent data structures, insights may be provided to different types of users 1502 based on permissions, roles, etc. For example, user interfaces may provide for a display in real-time to users a variety of information, such as the orders received from the front-of-house, to the food inventory in cold storage, the food tray location in the speed rack 1504, the status of the AGV in transporting the food, the status of the robot in loading the food from the speed rack to the oven/food processing equipment 1508, the status of the food being cooked in the oven/food processing equipment 1504, the status of the robot 1510 unloading the food from the oven/food processing equipment and loading into the speed rack, the food tray location in the speed rack, the status of the AGV in transporting the food to be served, and other status and related information a described herein 1514.

Figure 16:
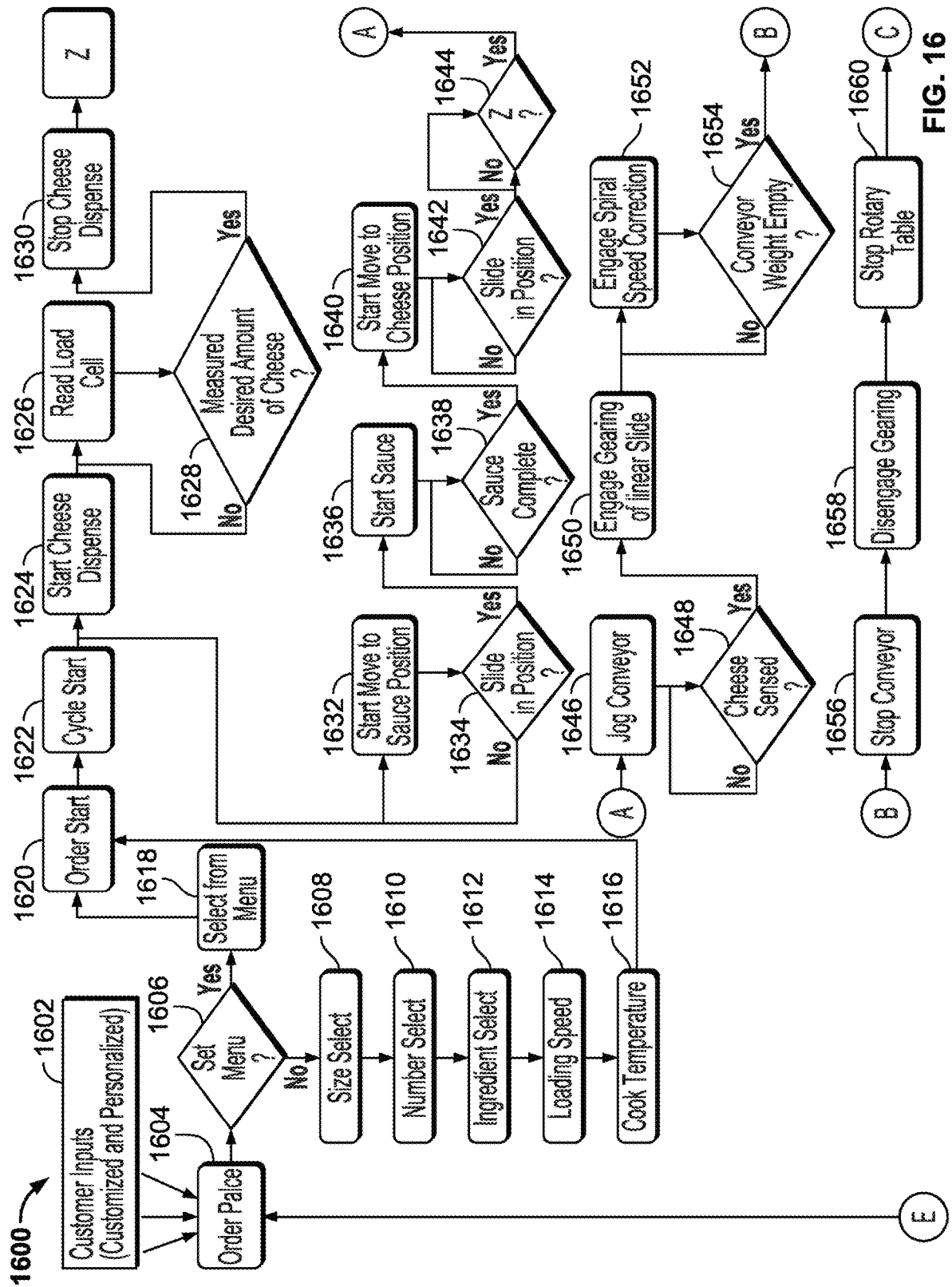
FIG. 16 depicts exemplary steps for performing electromechanical operations within an exemplary food preparation module in accordance with some embodiments of the present disclosure.
Figure 16:
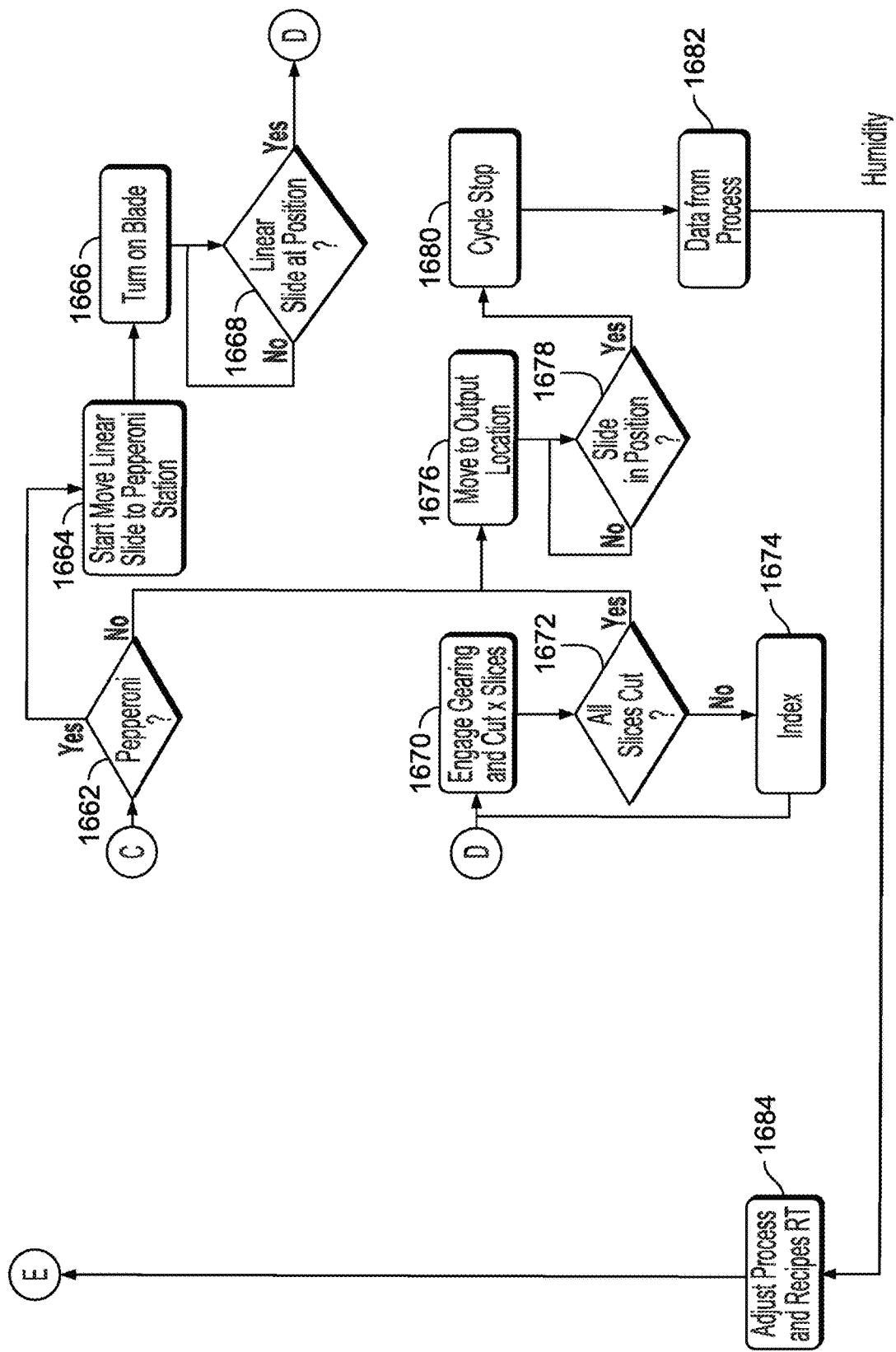

FIG. 16 depicts exemplary steps for performing electromechanical operations within an exemplary food preparation module in accordance with some embodiments of the present disclosure. At an initial step customer inputs are provided at step 1602 (e.g., via an application, kiosk, or attendant) and the order is received for processing at step 1604. Once the order is received, processing continues to determine whether the particular order aligns with a predetermined menu item or corresponds to a custom order at step 1606. If the order corresponds to a custom order, customizable parameters are determined for options such as the item size (at step 1608), number of items (at step 1610), quantity and type of ingredients (at step 1612), calculation of loading speed (at step 1614), and determination of cook temperature patterns (at step 1616). Such parameters are determined based on the custom order inputs (e.g., toppings, amount of toppings, custom patterns, type of crust, crispiness of crust, etc.). If the order corresponds to a preset menu item, processing continues from step 1606 to step 1618, where that present menu item and its appropriate characteristics are selected. Once the custom or menu selections are made, consumable components and electromechanical operations, and parameters for the same, may be selected and associated with an order in a data structure to start the order at step 1620.

In an exemplary embodiment of a food preparation module for preparing pizza, once the order starts at step 1620, the preparation cycle may begin at step 1622 by inserting the prepared dough into the module as described herein. In an embodiment, the appropriate amount cheese may begin to be prepared simultaneously (at steps 1624-1630) with the application of the sauce to the dough (at steps 1632-1644). At step 1624, an amount of cheese appropriate for the particular order begins to be dispensed and the amount of cheese is measured (e.g., by a load cell) at step 1626. If the amount of cheese for application to the pizza is not adequate at step 1628, processing returns to steps 1624 and 1626 for dispensation of additional cheese. If the amount of cheese is adequate, processing continues to step 1630 where the cheese dispense is stopped and a flag "Z" is set indicating that the cheese is ready for placement over the sauce.

At step 1632, the linear and rotary stage may begin the move of the dough to the sauce dispensing position, which may be continued until it is determined at step 1634 that the dough is in the proper starting position. The selected sauce may be applied at step 1636 while the linear and rotary stage moves the dough with respect to the sauce dispenser until the complete application of the sauce is confirmed at step 1638. Once the sauce application is complete and the cheese is prepared for dispensing, the movement of the dough and sauce to the position of the cheese dispenser by the linear and rotary phase is initiated at step 1640 until the dough and sauce is at a correct initial position for dispensing of cheese at step 1642. If the flag "Z" is set at step 1644, indicating that the proper amount of cheese is ready for dispensing, processing may continue to step 1646 at which dispensing of the cheese over the sauce is initiated.

At step 1646, the conveyor of the cheese dispenser is jogged until the presence of cheese is sensed proximate the linear and rotary stage at step 1648. Once the cheese is sensed, the gearing of the linear slide is engaged at step 1650, the spiral speed correction is initiated at 1652, and the cheese is dispensed until the conveyor weight is empty at step 1654 (or in some embodiments, until a sensor monitoring the distribution of the cheese indicates that the dispensing is complete). Processing then continues to step 1656 at which the conveyor is stopped, step 1658 at which the gearing of the linear slide is disengaged, and step 1660 at which the rotary table is stopped. Once all of these steps of the cheese dispense are complete, processing continues to step 1662 to begin the preparation and placement of pepperoni.

If the consumable components and electromechanical operations of the order confirm that additional toppings (e.g., pepperoni) are to be applied as determined at step 1662, the dough with sauce and cheese may be moved to the appropriate station for application of the topping 1664 and while the move is being performed the topping dispenser may initiate the blade for preparing (e.g., slicing) the topping at step 1666 in accordance with the order (e.g., amount, thickness, etc., as specified). Once the dough with sauce and cheese are properly located with respect to the station at step 1668, the gearing for the topping feed may be engaged at step 1670 until a sufficient number of slices are cut and applied to the pizza at step 1672, based on the indexed location of the linear stage and rotary table for application at step 1674.

Once all toppings are applied, the completed pizza may be moved towards an output position at step 1676 until the slide is determined to be in the output position at step 1678. The cycle is stopped at step 1680, and data relating to the order may be associated with the order at step 1682 as described herein. For example, data associated with each station and step in the process such as time to perform operations, status of electromechanical components, sensor readings, quality measurements, and the like may be associated with the order for further processing. This data may be analyzed with similar data to perform analytics as described herein at step 1684, such as by identifying quality of batches of consumable items, modifying processing steps (e.g., to speed up processing or improve quality), selecting alternative recipes, and setting and performing preventative maintenance routines. Processing may then continue to process additional orders.

Figure 17:
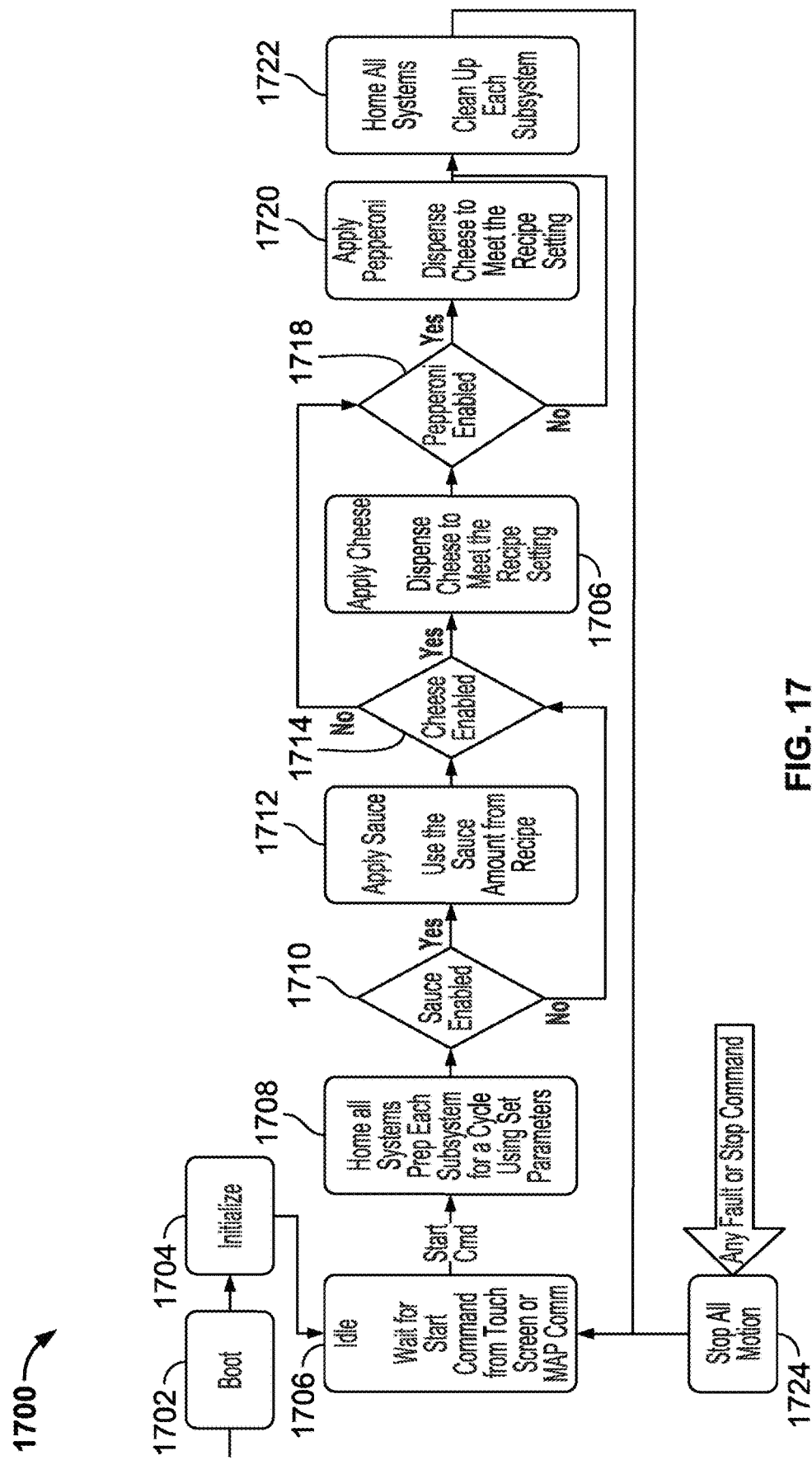
FIG. 17 depicts exemplary steps for performing electromechanical operations within an exemplary food preparation module in accordance with some embodiments of the present disclosure.

FIG. 17 depicts exemplary steps for performing electromechanical operations within an exemplary food preparation module in accordance with some embodiments of the present disclosure. A software routine for controlling a module of the system boots at step 1702 and initializes at step 1704, and waits until a start command (e.g., corresponding to an order having certain parameters such as consumable components and associated electromechanical operations) is received at step 1706. Operations of all systems are confirmed at step 1708, such as by confirming that all systems necessary for a particular order are in a home position and successfully self-test. Once the systems are confirmed to be operational and to have the necessary consumable components for the order, the steps of dispensing the consumable components via the electromechanical operations are executed for the order (e.g., to enable and apply sauce at steps 1710 and 1712, enable and apply cheese at steps 1714 and 1716, and enable and apply pepperoni at steps 1718 and 1720). Once the order is complete, the status of all systems is confirmed at step 1722 and the system returns to the idle state 1706 to wait for an additional order. If, at any time, a fault is initiated (e.g., by internal sensing or an external source) all motion is stopped temporarily at step 1722 until the fault is resolved.

Figure 18:
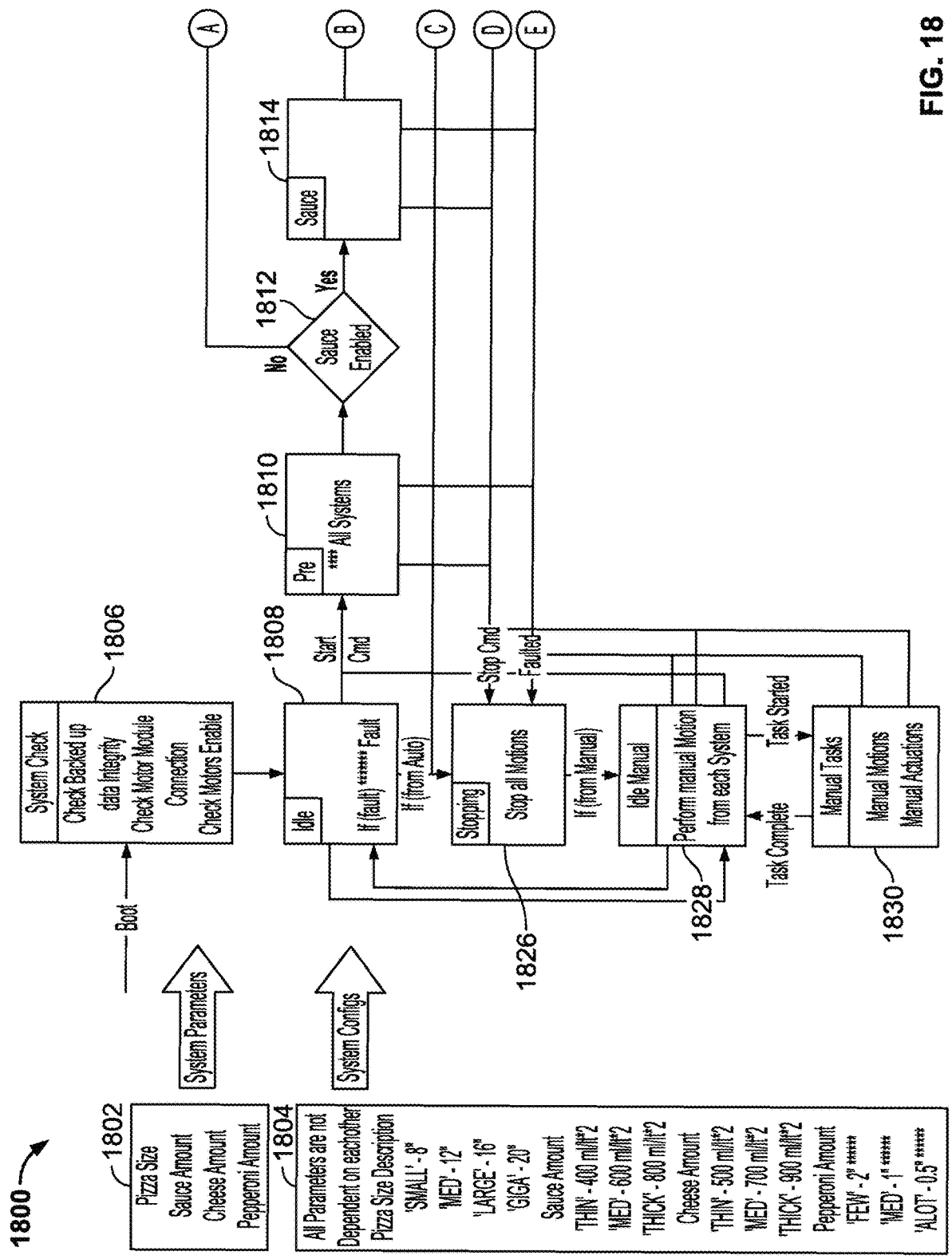
FIG. 18 depicts an exemplary state machine for electromechanical operations in accordance with some embodiments of the present disclosure.
Figure 18:
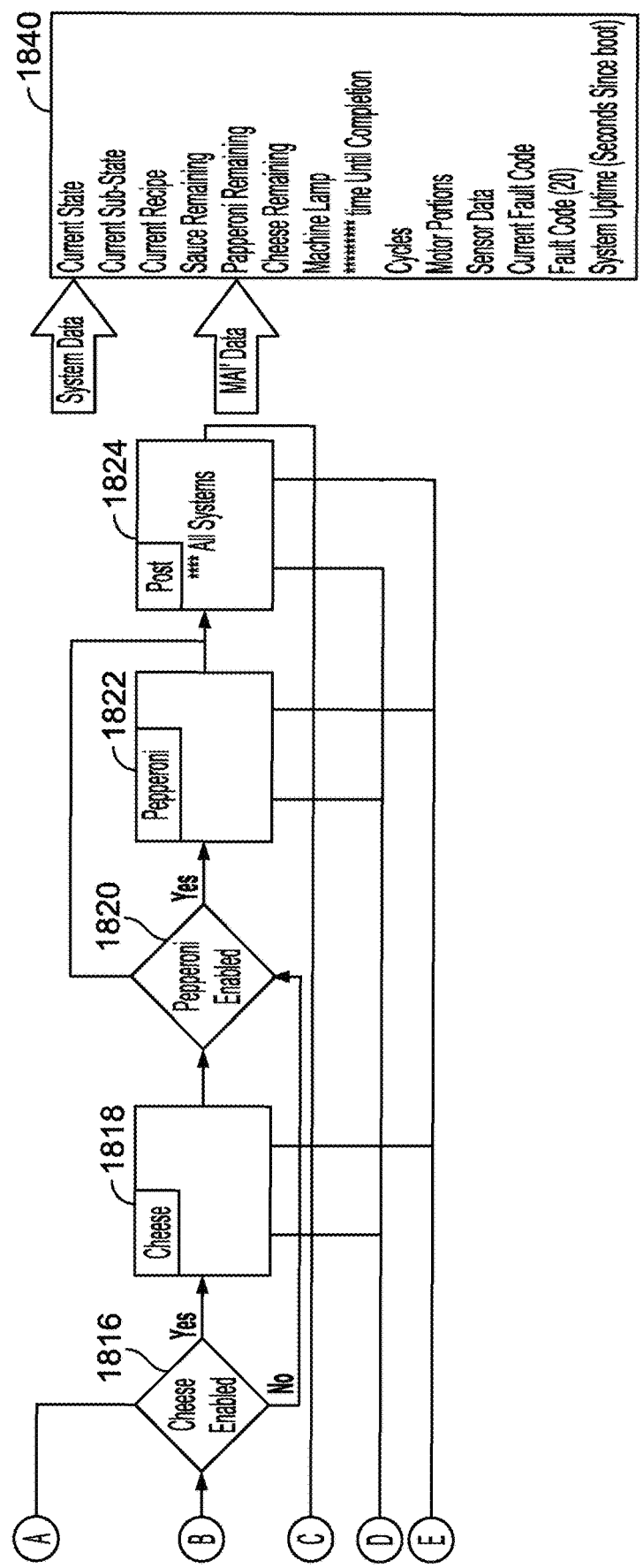

FIG. 18 depicts an exemplary state machine 1800 for electromechanical operations in accordance with some embodiments of the present disclosure. The exemplary state machine 1800 corresponds to the steps of FIGS. 16-17. In the exemplary embodiment of FIG. 18, available system parameters 1802 include "Pizza Size," "Sauce Amount," "Cheese Amount," and "Pepperoni Amount." Parameters 1804 for "Pizza Size" options include "SMALL," "MED," "LARGE," and "GIGA." Parameters 1804 for "Sauce Amount" options include "THIN," "MED," and "THICK." Parameters 1804 for "Cheese Amount" options include "THIN," "MED," and "THICK." Parameters 1804 for "Pepperoni Amount" options include "FEW," "MED," and "ALOT." Setting these parameters 1804 controls the input values that are utilized by the respective electromechanical components of the module to dispense the respective items in the proper pattern as requested by the customer, as well as the values that will be confirmed by sensing systems within the module and associated with the electromechanical operations. For example, exemplary data1 1840 that is collected includes a Current State, a Current Sub-State, a Current recipe, an amount of Sauce remaining, a number of Pepperonis remaining, Machine Temperatures, Estimated time until completion, number of Cycles, Motor positions, Sensor data, Current Fault Code, Fault Code, and System Uptime (seconds since boot).

After a boot of the system, a system check 1806 is performed, and once complete the system enters an idle state 1808. Upon a start command from the idle state, all systems are initialized at state pre-processing state 1810. Processing continues to determine whether sauce is enabled at state 1812, apply sauce at state 1814 if sauce is enabled, determine whether cheese is enabled at state 1816, apply cheese at state 1818 if cheese is enabled, determine whether pepperoni is enabled at state 1820, apply pepperoni at state 1822 if pepperoni is enabled, and perform post-processing at step 1824. If at any time a stop command or fault command is received, processing continues to state 1826 at which all motions are stopped. If manual operations are to be performed, processing continues to state 1828 to initiate and state 1830 to confirm completion of manual tasks. If a fault or stop command occurs at any time during manual operations, processing may again return to state 1826 to stop all motion.

Although particular examples of consumable components, electromechanical components, electromechanical operations, consumable items, modules, and module configurations have been discussed in detail herein, it will be understood that that the present disclosure corresponds to a variety of suitable food production environments and applications. A customizable and personalized food cooking system with high degree of customization for each individual step is provided, with the ability to take in direct customer inputs to deliver a highly automated yet personalized food experience. Customizable and personalized ingredients may be provided by performing precise control and measurement/confirmation of the electromechanical operations and consumable components. Systems and sensors such as vision systems, scales, temperature sensors, laser, time-of-flight, humidity, atmospheric pressure, airflow, probes for force/penetration, viscosity of materials, machine outputs (measured forces, voltage/current, any digital response), counters, infrared sensors, and RF sensors may confirm operations and be used to update operations to enable better customization. The operation of electromechanical components and use of consumable components may be updated in real time, and such information may also be used for front-of-house tasks such as setting custom menus and prices. The present system optimizes manual labor tasks to focus on tasks that are less repetitive and that do not require as much precision, enhancing the experience for employees, expanding customization options, and reducing the opportunity for errors. Enhanced data collection and order tracking enables predictive and prescriptive technology to drive forecasts, types and volumes, order fulfillment, purchasing etc. based on the type and volume of requests being received and the day/time/month of such requests. Predictive and prescriptive technology receive real-time inputs from the various functions and subsystems in the system in order to do real-time corrections and alerts to achieve optimal run-times for food prep. Consistency of preparation and product is improved as the repeated operations and those requiring difficult customization are automated with real-time feedback to maintain consistency and process control. Because electromechanical operations may be precisely controlled, the system provides additional flexibility in product type and preparation, while improving accuracy of the location on the food with desired placement for the ingredients on the food request. Each aspect of the system may be measurable, controllable, and modular, facilitating better process controls and easing the process of adding menu items or adjusting operations for equipment down-time or changes in inventory. The system may be modular and portable, reducing the required space in the back-end operations and enabling swap-outs for different menu items, time of day, etc.

FIGS. 19-27 herein are described in the context of a bar operations system that coordinates front-of-house and back-of-house operations for a bar, based on systems and sensors similar to those described herein, and in particular, based on measured pour data from beverage control devices placed on bottles and the like. Although FIGS. 19-27 are described in this context, it will be understood that a similar electronic and communications infrastructure may be applied to a restaurant environment, including for beverage related operations but also including other food-service related operations as described herein.

Figure 19:
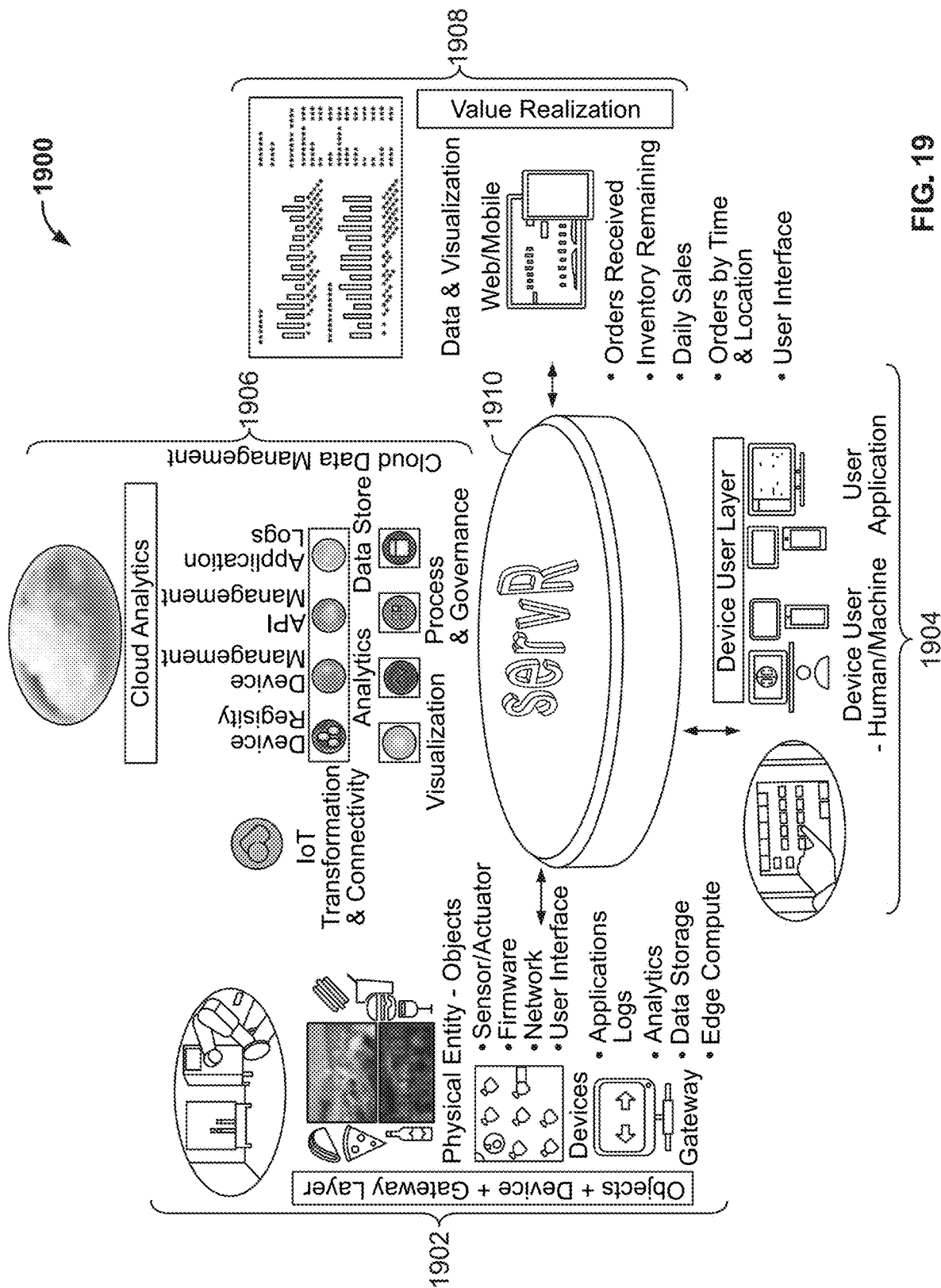
FIG. 19 depicts components of an exemplary comprehensive bar and food service operations system in accordance with some embodiments of the present disclosure.

FIG. 19 depicts components of an exemplary comprehensive bar and food service operations system in accordance with some embodiments of the present disclosure. Although a bar and food service operations system can include a variety of components in different configurations, in an exemplary embodiment the system may include a bar and food service operations layer 1902, a user interface layer 1904, an analytics layer 1906, and a visualization layer 1908. These respective layers interface via an integrated software and hardware control system 1910 such as the servR™ beverage and restaurant control system developed by the assignee of the present application, L2F Inc. The software and hardware control system may be implemented at a variety of devices include local devices of the establishment (e.g., via applications and/or websites at the gateway, PoS system, fog device, and/or company-owned mobile devices), devices of employees or customers (e.g., via applications executing on mobile devices or A/R devices), and internet-connected servers (e.g., via custom instances running on servers of an enterprise or establishment, cloud-implemented servers, and/or servers of a bar services provider).

An exemplary bar and food service operations layer 1902 includes the various devices, sensors, and equipment that interfaces with the physical aspects of the establishment— including inventory, employees, customers, PoS system, bottles, containers, glasses, stools, seats, tables—with the data collection and analytics system as described herein. An exemplary user interface layer 1904 provides the means for employees, customers, managers, and others (e.g., regulators) in the bar environment to interface with the bar and food service operations layer 1902, for example, through touch-screen applications and voice recognition as described herein. An exemplary cloud analytics layer 1908 receives data that is acquired via the bar and food service operations layer 1902 and user interface layer 1904 and aggregates the data as appropriate (e.g., at an establishment, enterprise, and/or industry level) to provide analytics and predictive analysis as described herein. The results of such analytics and predictive analysis are provided to the visualization layer, which may provide custom insights for various levels of stakeholders, such as establishment employees (e.g., maintenance recommendations, drink recommendations, inventory actions, etc.), middle management (e.g., store level comparisons and patterns), and upper management (e.g., macro-level trends relating to supply chain and profitability).

Figure 20:
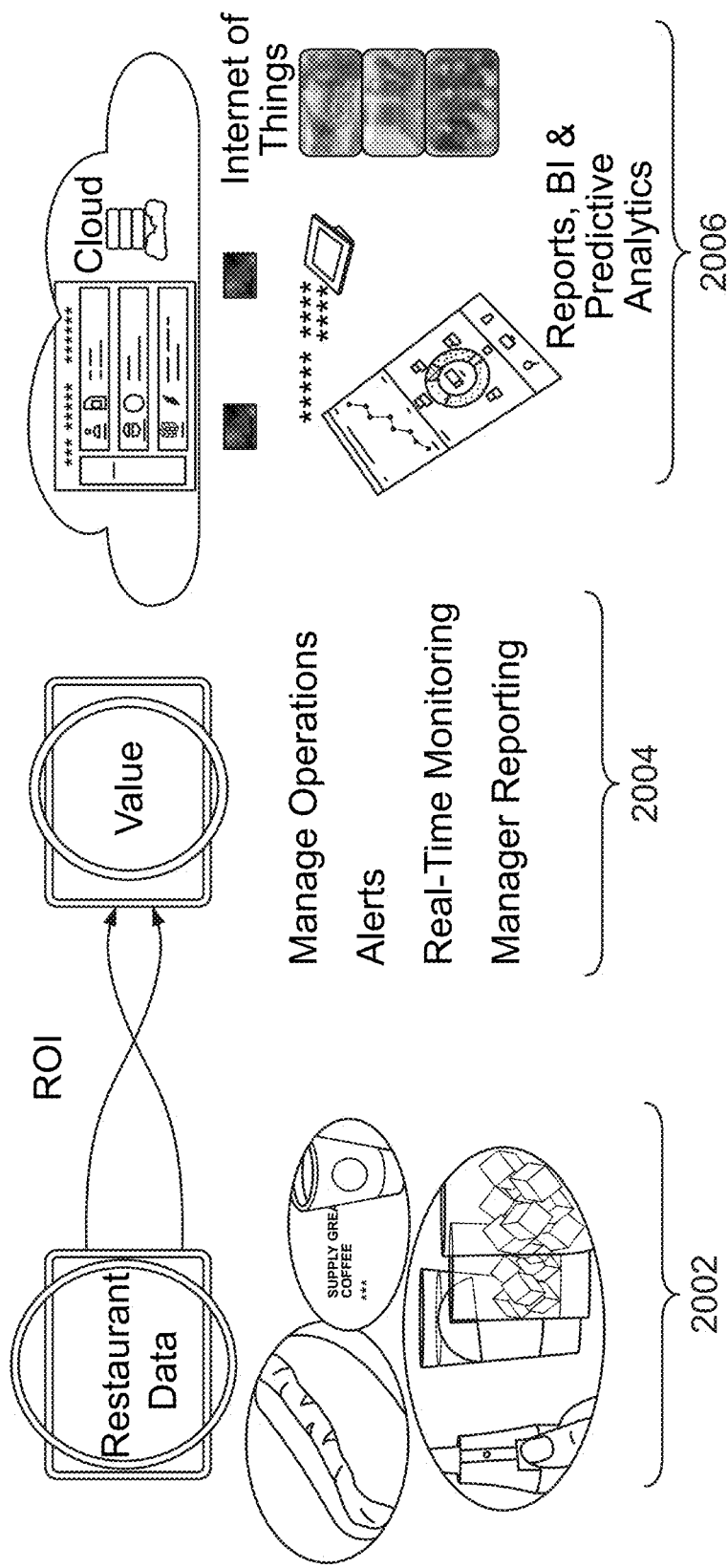
FIG. 20 depicts exemplary cloud reporting features of a bar and food service operations system in accordance with some embodiments of the present disclosure.

FIG. 20 depicts exemplary cloud reporting features of a bar and food service operations system in accordance with some embodiments of the present disclosure. Although a bar and food service operations system can include a variety of cloud reporting features in different configurations, in an exemplary embodiment the system may include data collection systems 2002, management systems 2004, and analysis and reporting systems 2006. As described herein, data is collected from a variety of sources of data collection systems, such as beverage control devices, sensors, public or proprietary data feeds, customer and employee devices and the like. In some embodiments, control information is also pushed back to these systems, such as to modify or control the operation of beverage control devices, automatically access inventory, perform preventative maintenance, and perform other suitable control operations as described herein. Management systems 2004 such as gateway devices, fog devices, servers, and/or cloud systems may control and manage establishment and/or enterprise operations as described herein, for example, by performing real time processing, alerting, monitoring, reporting, and other daily operational functions as described herein. Analysis and reporting systems 2006 may be at a variety of locations from the gateway to the cloud, including implementations as distributed systems. These systems store and analyze operational data for establishments and entities over an extended period time, and through analysis of historical collected data and forward-looking information are able to provide detailed historical reporting and predictive analytics, as described herein.

Figure 21:
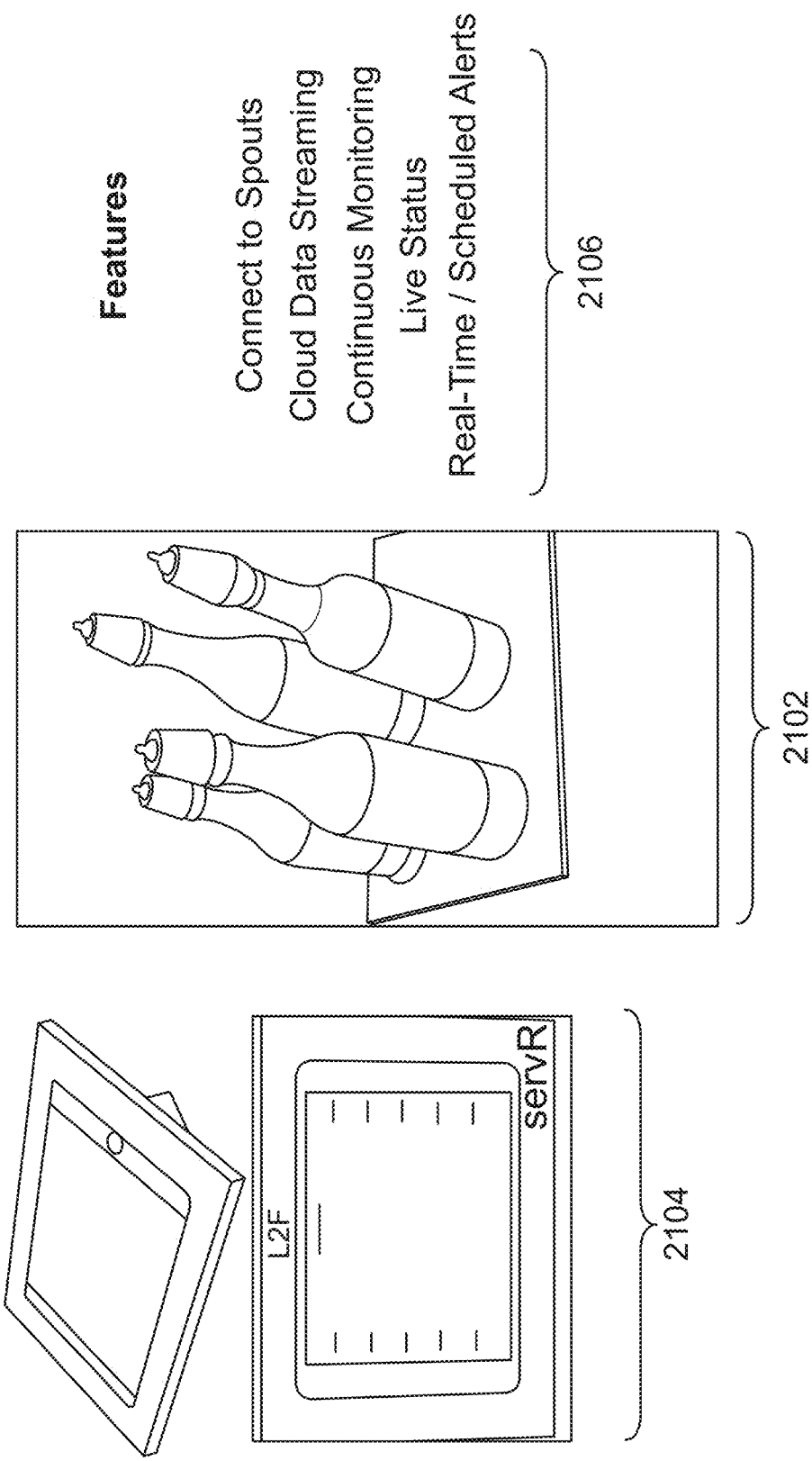
FIG. 21 depicts exemplary beverage control devices and user interfaces in accordance with some embodiments of the present disclosure.

FIG. 21 depicts exemplary beverage control devices and user interfaces in accordance with some embodiments of the present disclosure. Exemplary beverage control devices 2102 are attached to beverage containers such as liquor bottles, and perform monitoring, communication, and control functions as described herein. A local user interface such as gateway device 2104 provides for setup, control, and monitoring of the beverage control devices. For example, a gateway device 2104 can facilitate setup routines for beverage control devices, such as by cycling lights or other indicators on beverage control devices to confirm attachment to particular beverage bottles. The gateway device 2104 facilitates a variety of control and monitoring features 2106 as described herein, such as connecting to the beverage control devices, streaming collected data to fog and/or cloud systems, and providing real time monitoring, status, and alerts.

Figure 22:
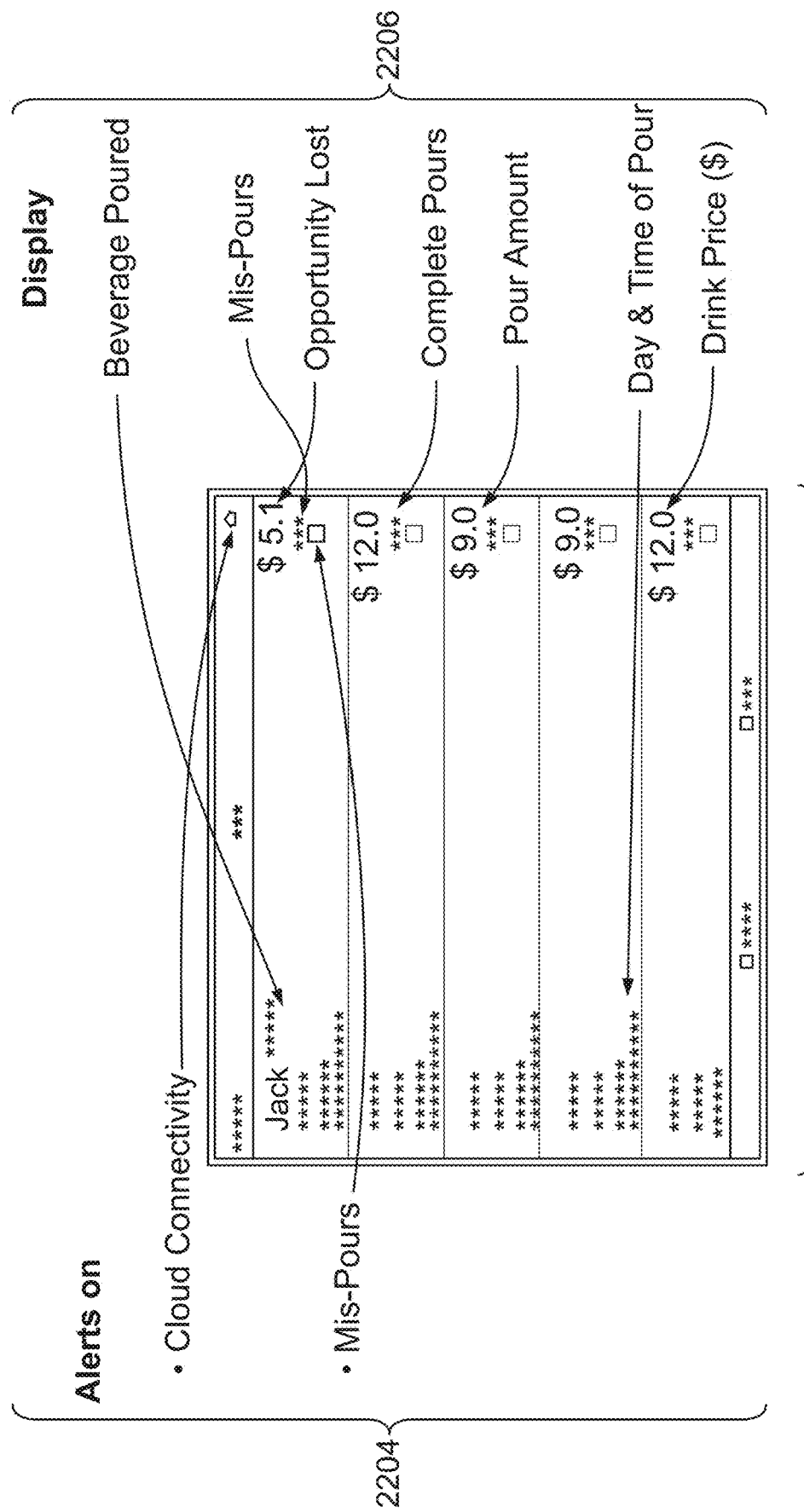
FIG. 22 depicts exemplary on-site real time data of a bar and food service operations system in accordance with some embodiments of the present disclosure.

FIG. 22 depicts exemplary on-site real time data of a bar and food service operations system in accordance with some embodiments of the present disclosure. In an exemplary embodiment, a gateway device display 2202 includes a variety of displayed information such as alerts 2204 (e.g., connection status, battery levels for beverage control devices, failure status, preventative maintenance warnings, overpours, underpours, leaks, etc.) and status display 2206 (e.g., amount paid, profit/loss, price, discounts, timestamp, pour amount, employee, customer, drink, etc.).

Figure 23:
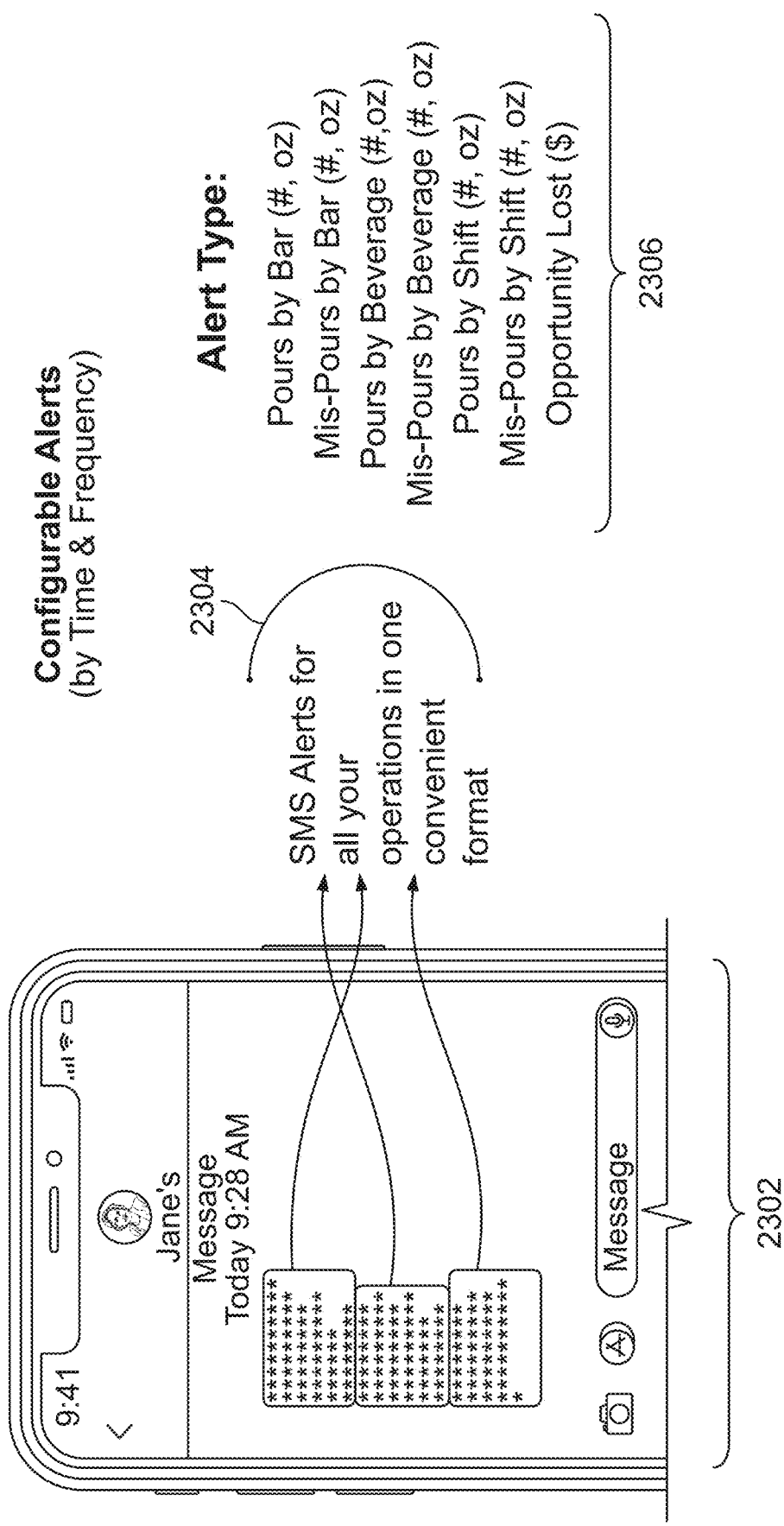
FIG. 23 depicts an exemplary messaging system of a bar and food service operations system in accordance with some embodiments of the present disclosure.

FIG. 23 depicts an exemplary messaging system of a bar and food service operations system in accordance with some embodiments of the present disclosure. Alerts 2304 of a variety of information or warning alert types 2306 (e.g., pours by bar in ounces or number of pours, mis-pours by bar in ounces or number of mispours, pours by beverage in ounces or number of pours, pours by shift in ounces or number of pours, mis-pours by shift in ounces or number of pours, losses due to mis-pours, and the like) may be provided to a suitable user interface (e.g., based on preconfigured and/or user-selectable parameters for providing different types of warnings).

Figure 24:
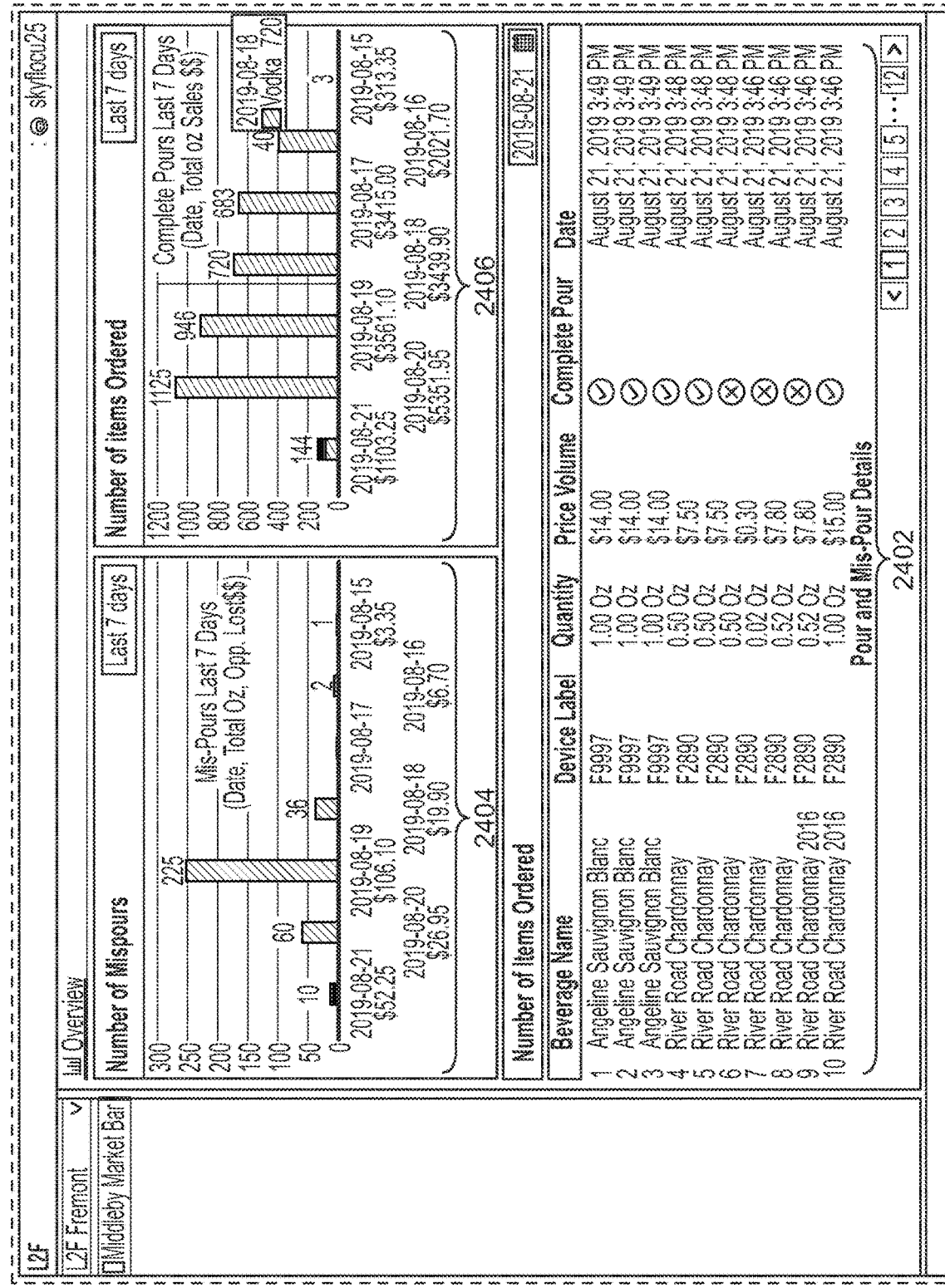
FIG. 24 depicts an exemplary management application of a bar and food service operations system in accordance with some embodiments of the present disclosure.

FIG. 24 depicts an exemplary management application of a bar and food service operations system in accordance with some embodiments of the present disclosure. In an exemplary embodiment, such an interface is made available to management employees via a gateway device or an application to provide pertinent information for identifying actionable data from measurements of bar and food service operations, such as mis-pours 2404, successful pours 2406, and details 2402 regarding the same.

Figure 25:
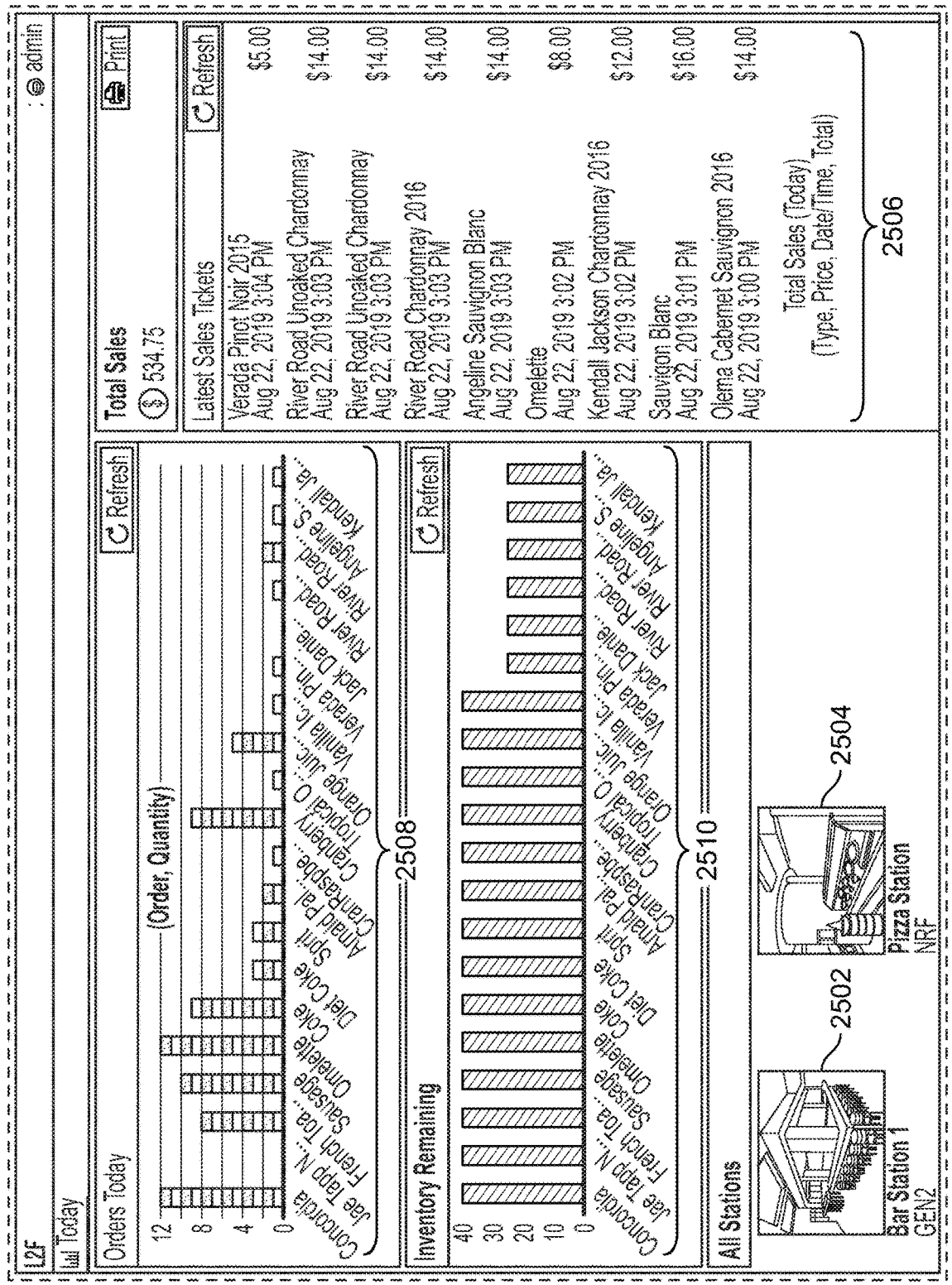
FIG. 25 depicts an exemplary management application for inventory of a bar and food service operations system in accordance with some embodiments of the present disclosure.

FIG. 25 depicts an exemplary management application for inventory of a bar and food service operations system in accordance with some embodiments of the present disclosure. In an exemplary embodiment, such an interface is made available to management employees via a gateway device or an application to provide pertinent information for identifying actionable data relating to orders and inventory in bar and food service operations. Exemplary displays may include information relating to order histories 2508, inventory 2510, and an ongoing timestamped ticker 2506 of order and inventory information for multiple stations 2502 and 2504 within an establishment.

Figure 26:
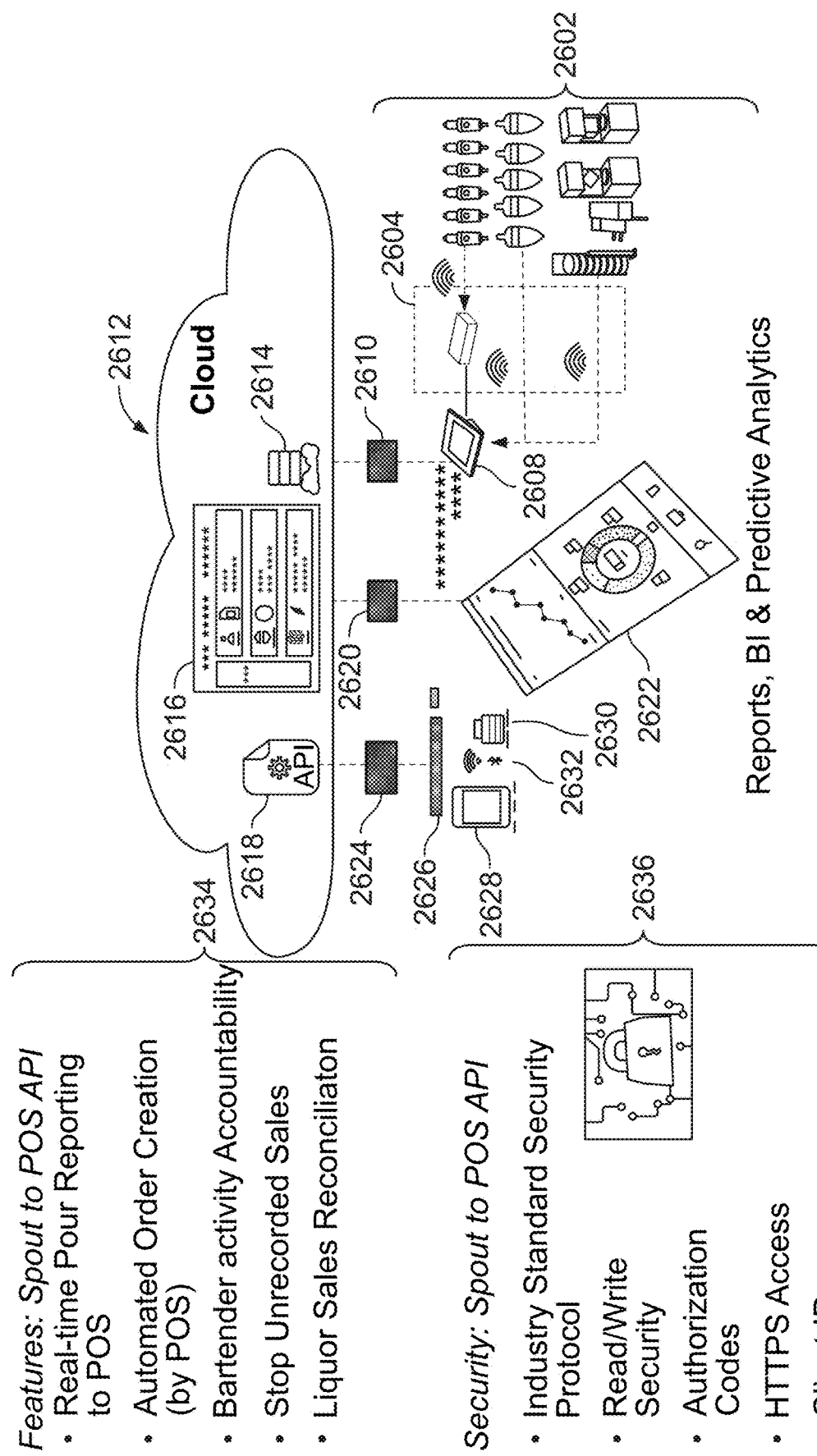
FIG. 26 depicts an exemplary system architecture for a bar and food service operations system in accordance with some embodiments of the present disclosure.

FIG. 26 depicts an exemplary system architecture for a bar and food service operations system in accordance with some embodiments of the present disclosure. Local monitoring and control devices 2602 such as spouts, dispensers, automated prep systems, inventory access systems, and sensors are connected to a gateway 2608 via encrypted wireless connections 2604, and may have an additional layer of encryption between the devices and the gateway (e.g., established via a registration or pairing process unique from overlying connection procedures for wireless protocols). The gateway may communicate with servers 2614 of a cloud management system 2612 via a secure connection 2610 (e.g., secured via a unique registration process, in addition to any standard security protocols). The cloud system 2612 in turn provides access to real-time data and analytics via APIs 2618 accessible via secure connection 2134 by applications operating on remote servers/devices 2626 and wireless devices 2628, 2630, and 2632. A secure web portal 2616 may provide similar information to browsers 2622 via a secure connection 2620. In this manner, the bar and food service operations system can provide secure and universal access to features 2634 such as real time pour reporting, automated order creation, employee activity reports, remote intervention into unrecorded sales/pours, sales and inventory reconciliation, and the like.

Figure 27:
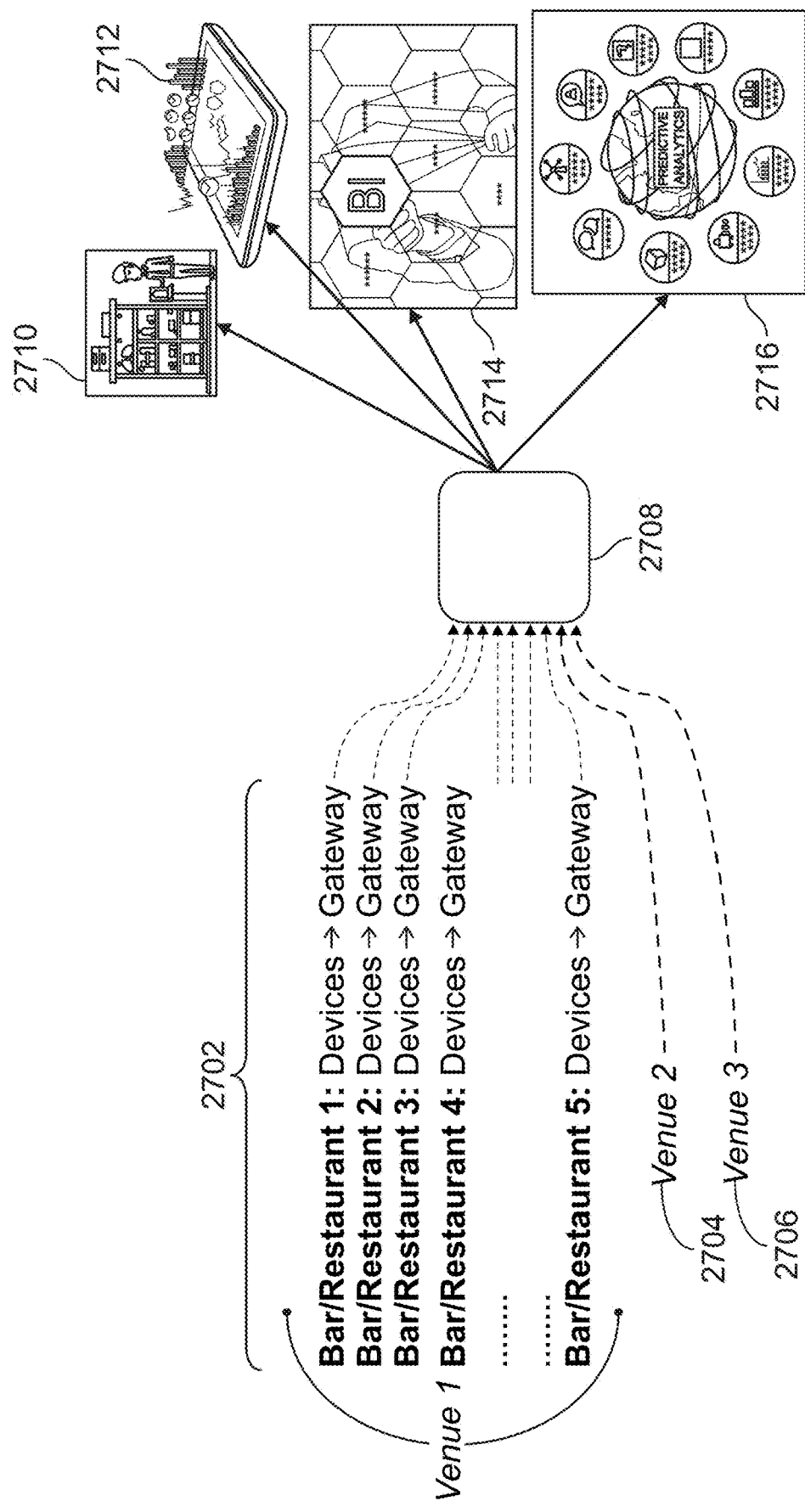
FIG. 27 depicts exemplary cloud analytics of a bar and food service operations system in accordance with some embodiments of the present disclosure.

FIG. 27 depicts exemplary cloud analytics of a bar and food service operations system in accordance with some embodiments of the present disclosure. In the exemplary embodiment of FIG. 27, multiple venues 2702, 2704, and 2706 provide data to a cloud-based management system 2708, which in turn provides remote services at an establishment, enterprise, and industry level such as inventory management 2710, reporting and analytics 2712, business intelligence 2714, and predictive analytics 2716, as described herein.

Figure 28:
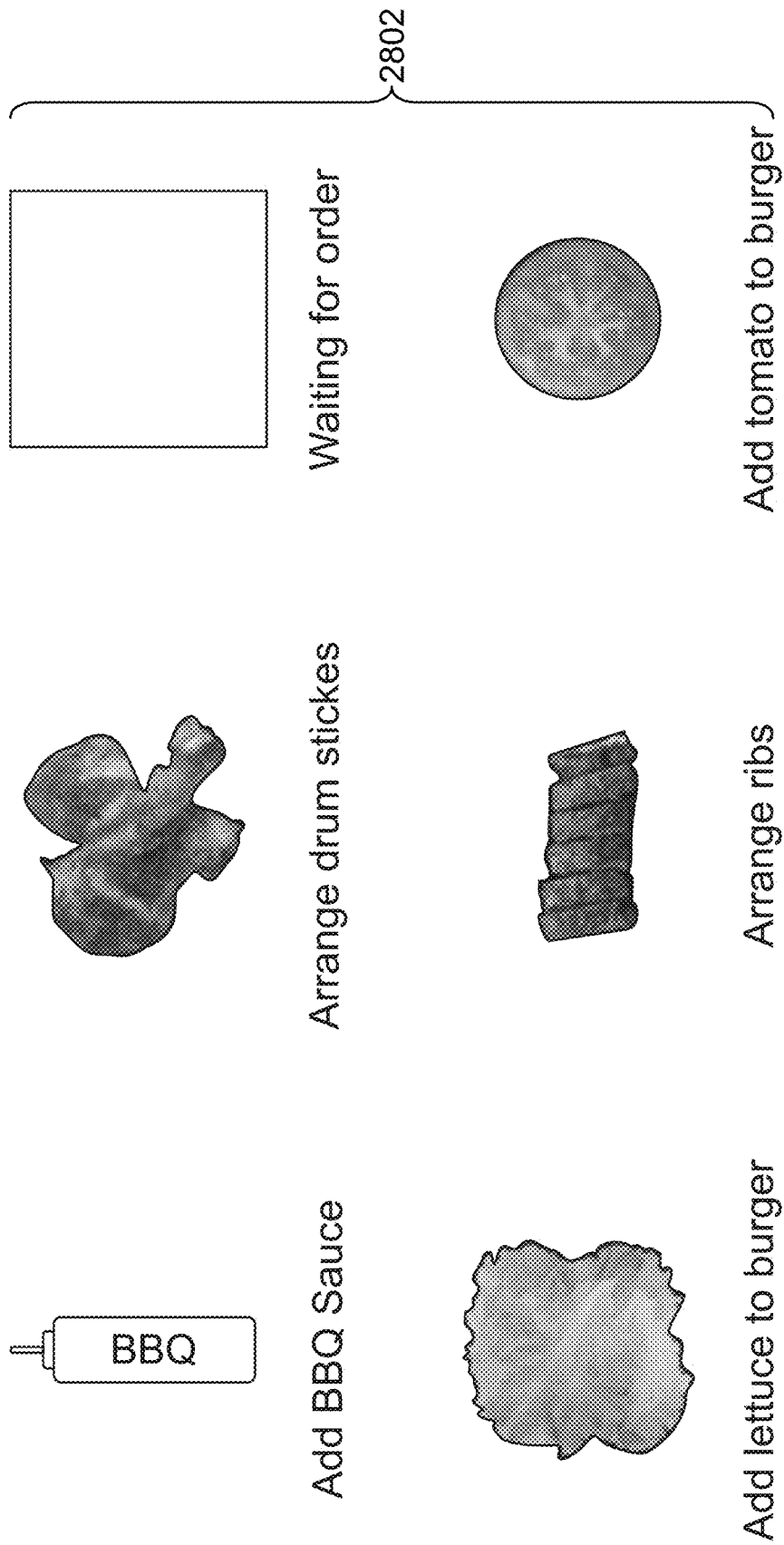
FIG. 28 depicts exemplary execution of steps for preparing consumable components into consumable items in accordance with some embodiments of the present disclosure.

FIG. 28 depicts exemplary execution of steps for preparing consumable components into consumable items in accordance with some embodiments of the present disclosure. In the exemplary embodiment of FIG. 28, an arrangement of electromechanical components (e.g., arranged in one or more modules as described herein) are simultaneously performing a number of operations. Although any suitable number of modules and/or electromechanical components may be performing respective operations depending upon the arrangement and configuration thereof, in the exemplary embodiment of FIG. 28 there are six stations that are capable of simultaneously performing operations as depicted by the GUI 2802 in the upper left hand corner. In the bottom right hand corner, exemplary machine instructions 2804, 2806, and 2808 are associated with the operation of particular stations.

Figure 29:
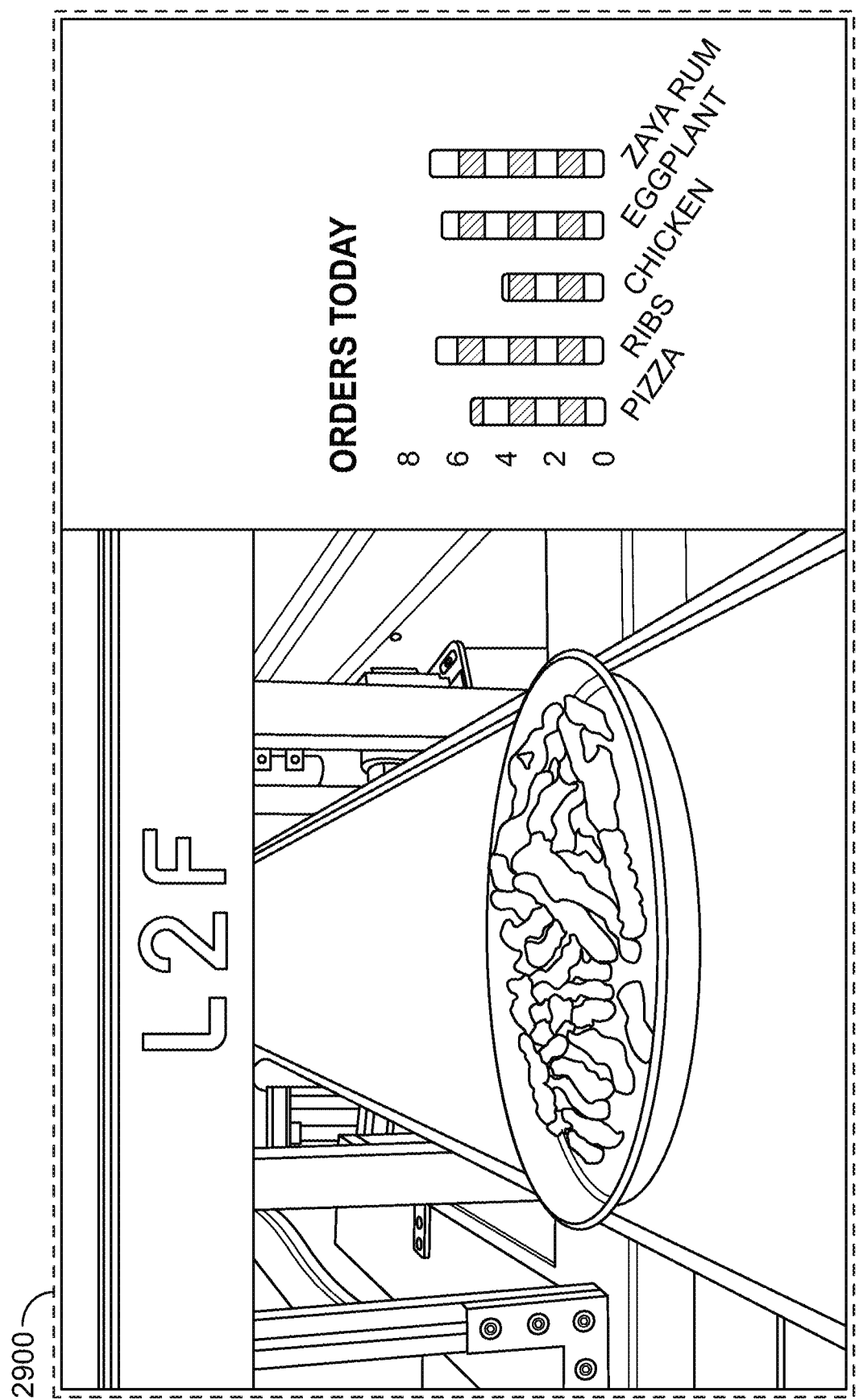
FIG. 29 depicts an exemplary top-level user interface for order aggregation information in accordance with some embodiments of the present disclosure.

FIG. 29 depicts an exemplary top-level user interface for order aggregation information 2902 in accordance with some embodiments of the present disclosure. In the exemplary embodiment of FIG. 29, food items are loaded onto a conveyor of a robotic cooking system, which identifies items, updates order information, performs food preparation operations, delivers the item to appropriate cooking equipment, and provides the completed menu item to another conveyor for distribution to customers.

Figure 30:
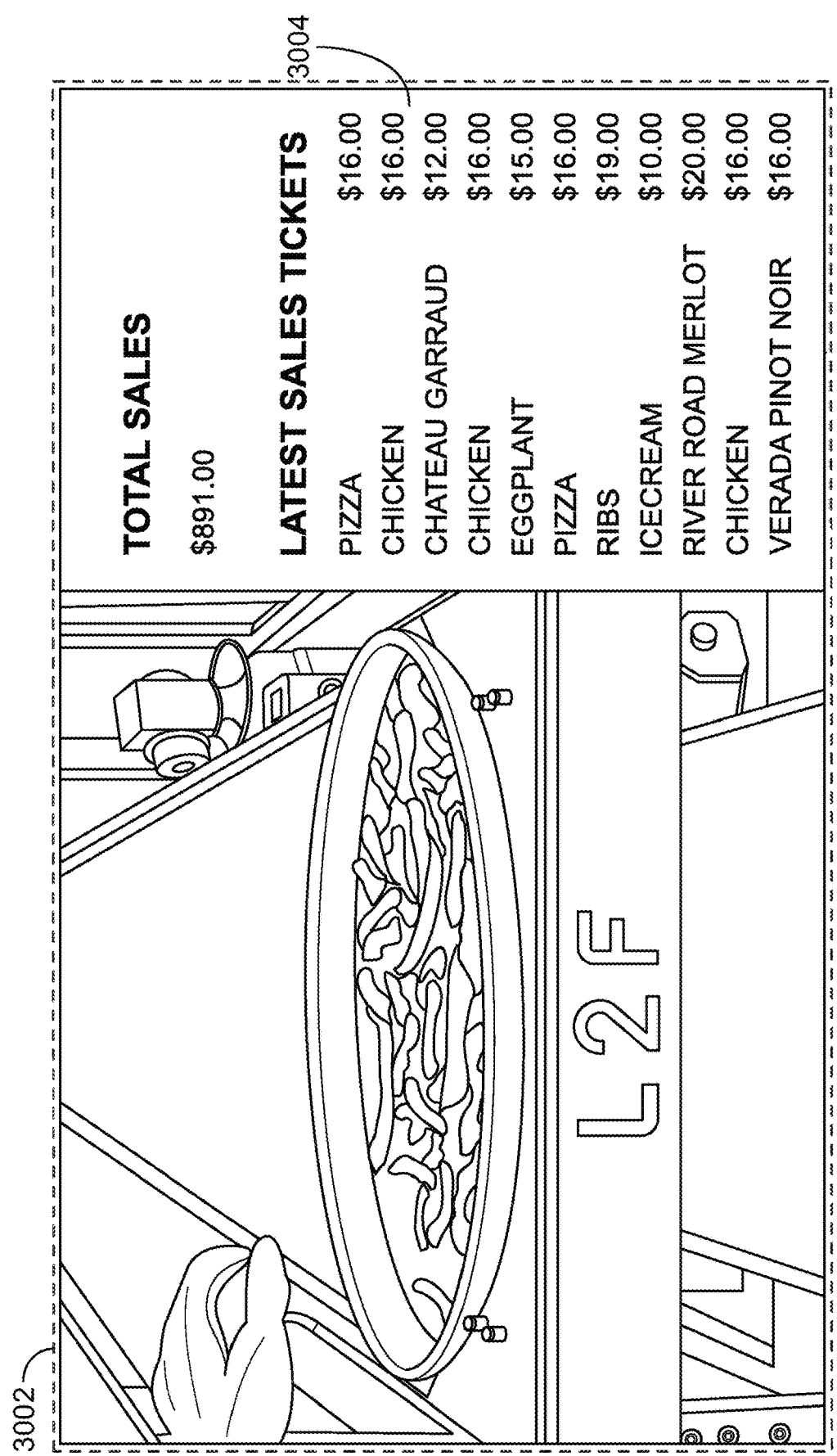
FIG. 30 depicts an exemplary top-level user interface for financial information aggregation in accordance with some embodiments of the present disclosure.

FIG. 30 depicts an exemplary top-level user interface for financial information aggregation 3002 in accordance with some embodiments of the present disclosure. This information may be continuously updated 3004 during operations based on measured changes, for example, based on point of sale information, sensed quantities of ingredients for food items, pour data, liquid volume, etc.

FIG. 31 shows an exemplary user interface for inventory control 3102 and 3104 in accordance with some embodiments of the present disclosure. As described herein, a control system may include sensors that monitor and/or control beverage control devices, food preparation equipment, food storage devices, food and beverage inventories, and a variety of other inputs and data sources as described herein. In the exemplary embodiment of FIG. 31, the user interface 3102 depicts a real time inventory of resources for a number of food and beverage items. The user interface 3104 provides a predictive inventory based on current consumption patterns, indicating, for example, that chicken and Diet Pepsi are likely to fall below required thresholds while Zaya Rum is likely to run out of stock absent corrective action.

Figure 32:
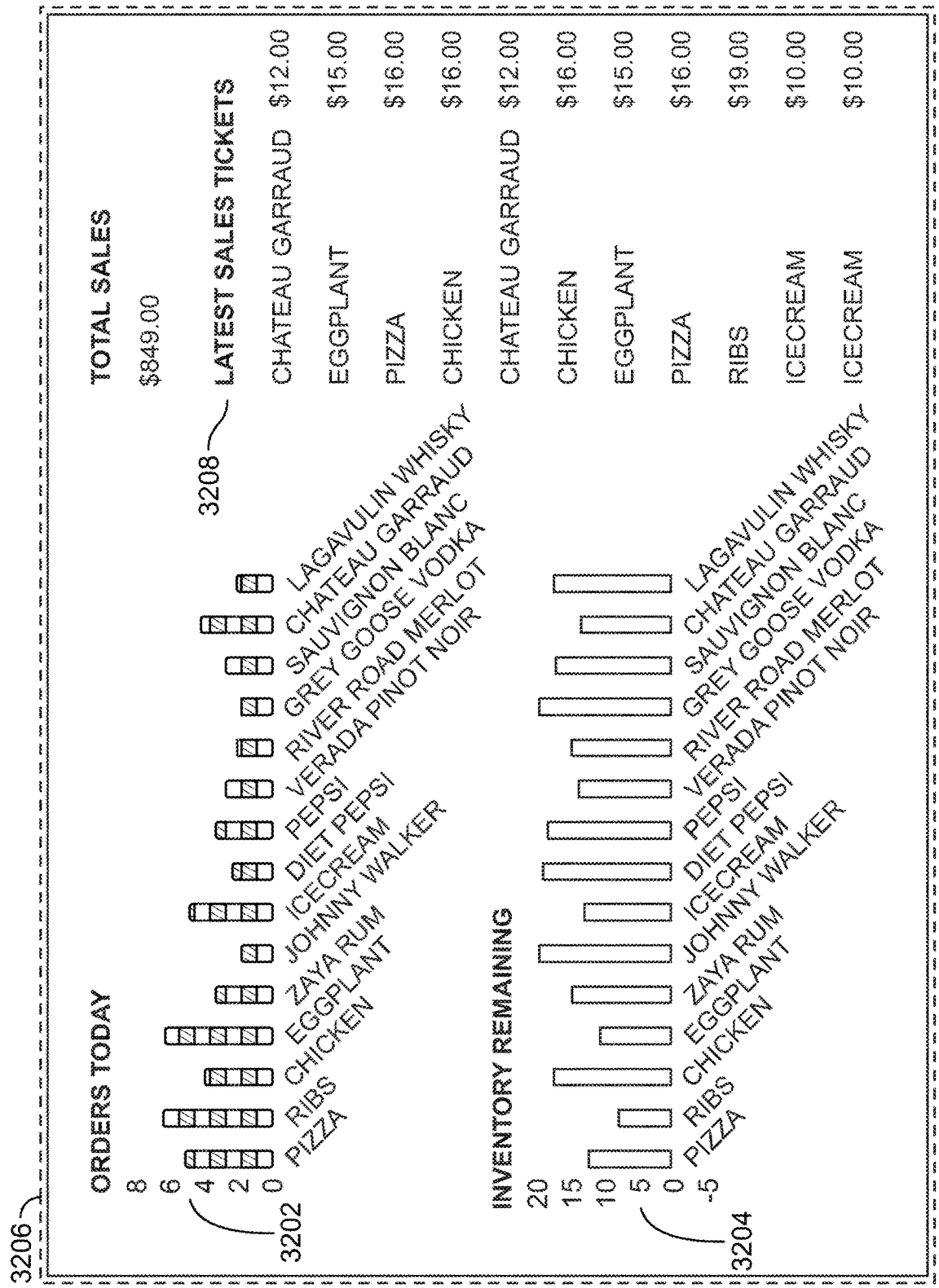
FIG. 32 depicts an exemplary top-level user interface for multi-input data in accordance with some embodiments of the present disclosure.

FIG. 32 depicts an exemplary top-level user interface 3206 for multi-input data in accordance with some embodiments of the present disclosure. For example, FIG. 32 shows an exemplary user interface for orders 3202, inventory 3204, sales, and sales details 3208 in accordance with some embodiments of the present disclosure. This information may be continuously updated during operations based on measured changes, for example, based on point of sale information, sensed quantities of inventory ingredients for food items, scrap data, etc.

FIG. 33 depicts an exemplary kitchen layout and associated data structures in accordance with some embodiments of the present disclosure. In the upper right hand corner a layout of multiple stations of a food court 3300 is depicted, in which each of the food stations is its own robotic cell providing respective foods such as heated meals 3302, coffee 3310, beverages 3312, a manual prep area 3306, and dessert 3308. Provided to the left are item level statistics 3314 and information for the respective cells.

FIG. 34 depicts exemplary top-level order data structures in accordance with some embodiments of the present disclosure. Clickable links 3402 and 3404 are provided in a user interface through which a suitable user (e.g., a manager) may access order-level data 3406 for individual orders. Each order has a unique identifier.

Figure 35:
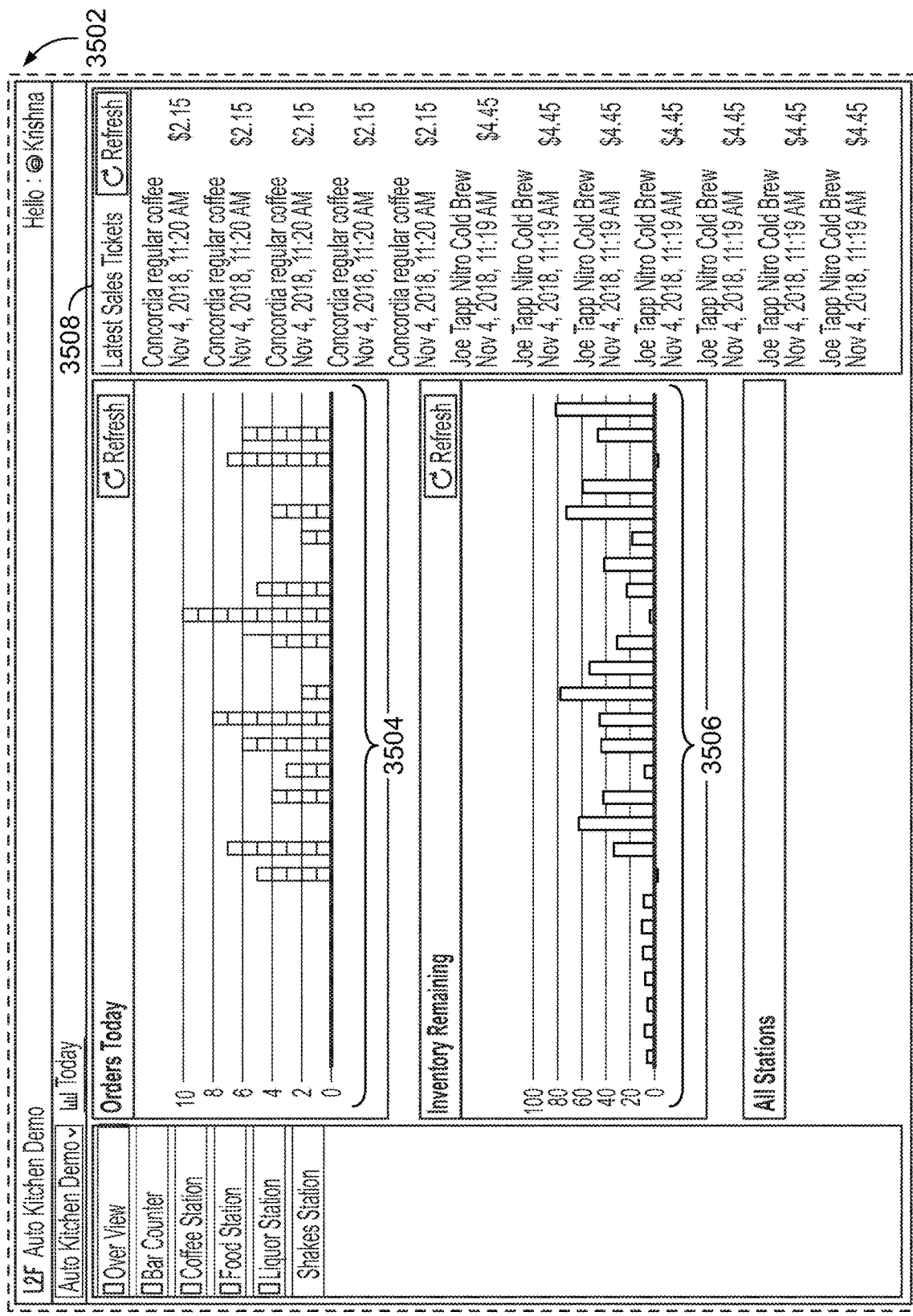
FIG. 35 depicts exemplary orders and associated inventory in accordance with some embodiments of the present disclosure.

FIG. 35 depicts exemplary orders 3504 and associated inventory 3506 in accordance with some embodiments of the present disclosure. The user interface of FIG. 35 provides aggregated details for multiple food items and inventory items, along with order detail information 3508 such that a viewer can get an overall snapshot view of operations status.

Figure 36:
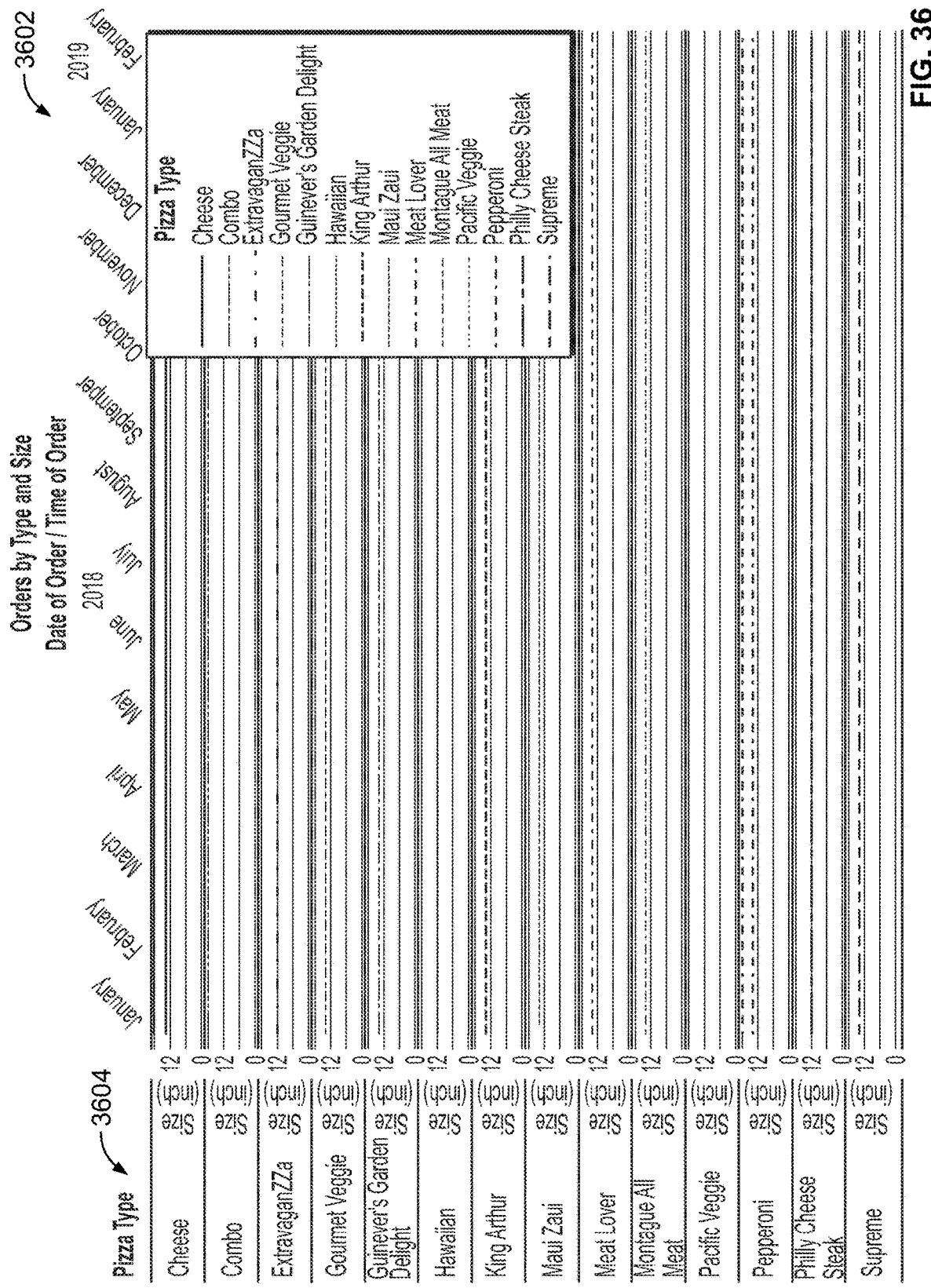
FIG. 36 depicts an exemplary plot of time-based order information in accordance with some embodiments of the present disclosure.

FIG. 36 depicts an exemplary plot of time-based order information in accordance with some embodiments of the present disclosure. Each small dot indicates an order on a time scale 3602 for particular pizza sizes and types 3604, each of which has associated order-level data structures including data primitives as described herein.

Figure 37:
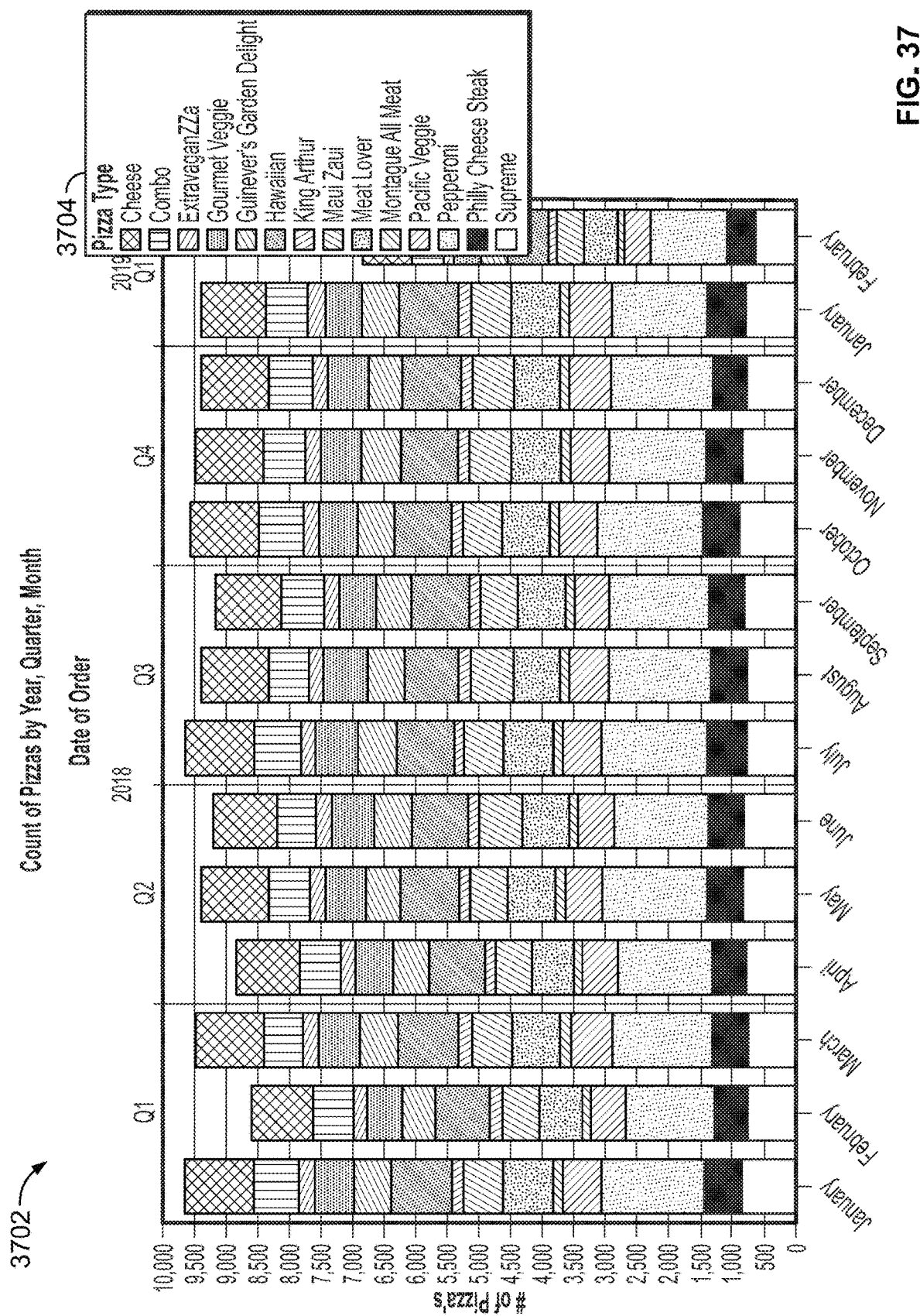
FIG. 37 depicts exemplary aggregate order data by order type in accordance with some embodiments of the present disclosure.

FIG. 37 depicts exemplary aggregate order data by order type in accordance with some embodiments of the present disclosure. The user interface of FIG. 37 facilitates the user's understanding of trends for multiple items over time, aggregated from order level information. As depicted in FIG. 37, orders of different types 3704 are depicted as aggregated over a time scale 3702 by month and quarter.

Figure 38:
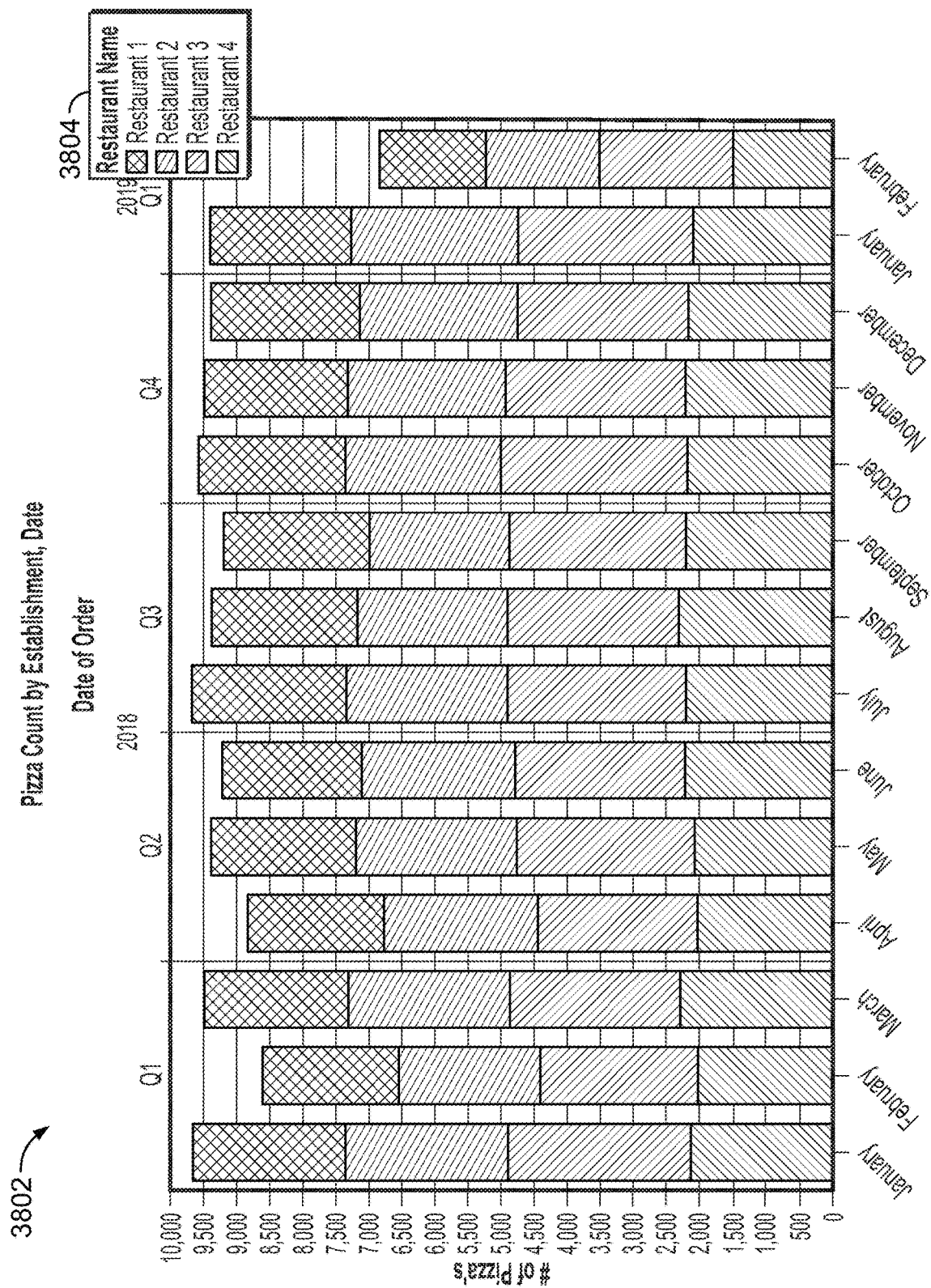
FIG. 38 depicts exemplary aggregate location order data by establishment in accordance with some embodiments of the present disclosure.

FIG. 38 depicts exemplary aggregate location order data by establishment in accordance with some embodiments of the present disclosure. The user interface of FIG. 38 facilitates the user's understanding of trends for multiple locations 3804 over time, aggregated from order level information and depicted over a time scale 3802 by month and quarter.

Figure 39:
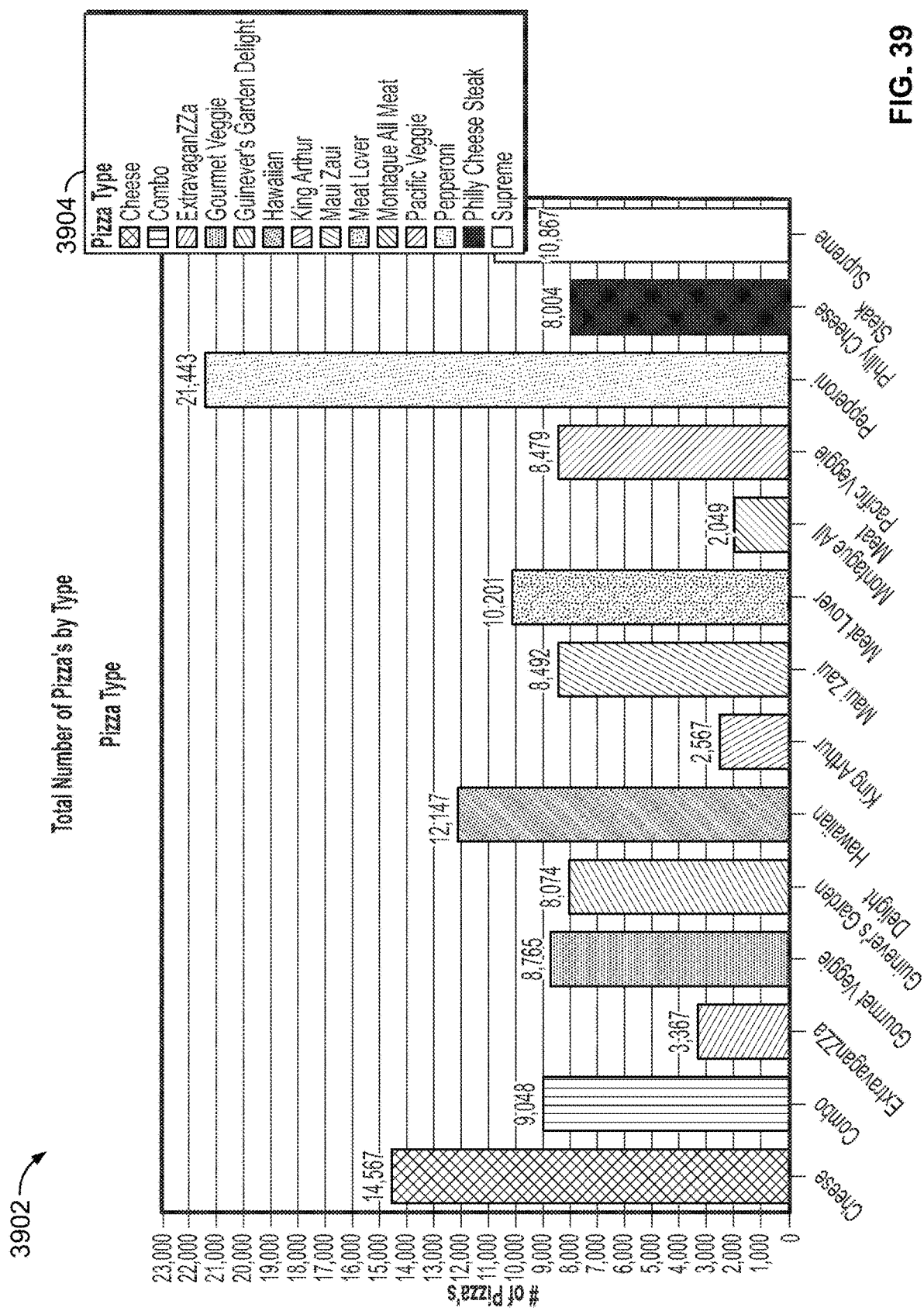
FIG. 39 depicts exemplary aggregate order type data in accordance with some embodiments of the present disclosure.

FIG. 39 depicts exemplary aggregate order type data in accordance with some embodiments of the present disclosure. The user interface of FIG. 39 facilitates the user's understanding of trends for multiple items 3904 over time, aggregated in chart 3902 from order level information for a particular time period.

Figure 40:
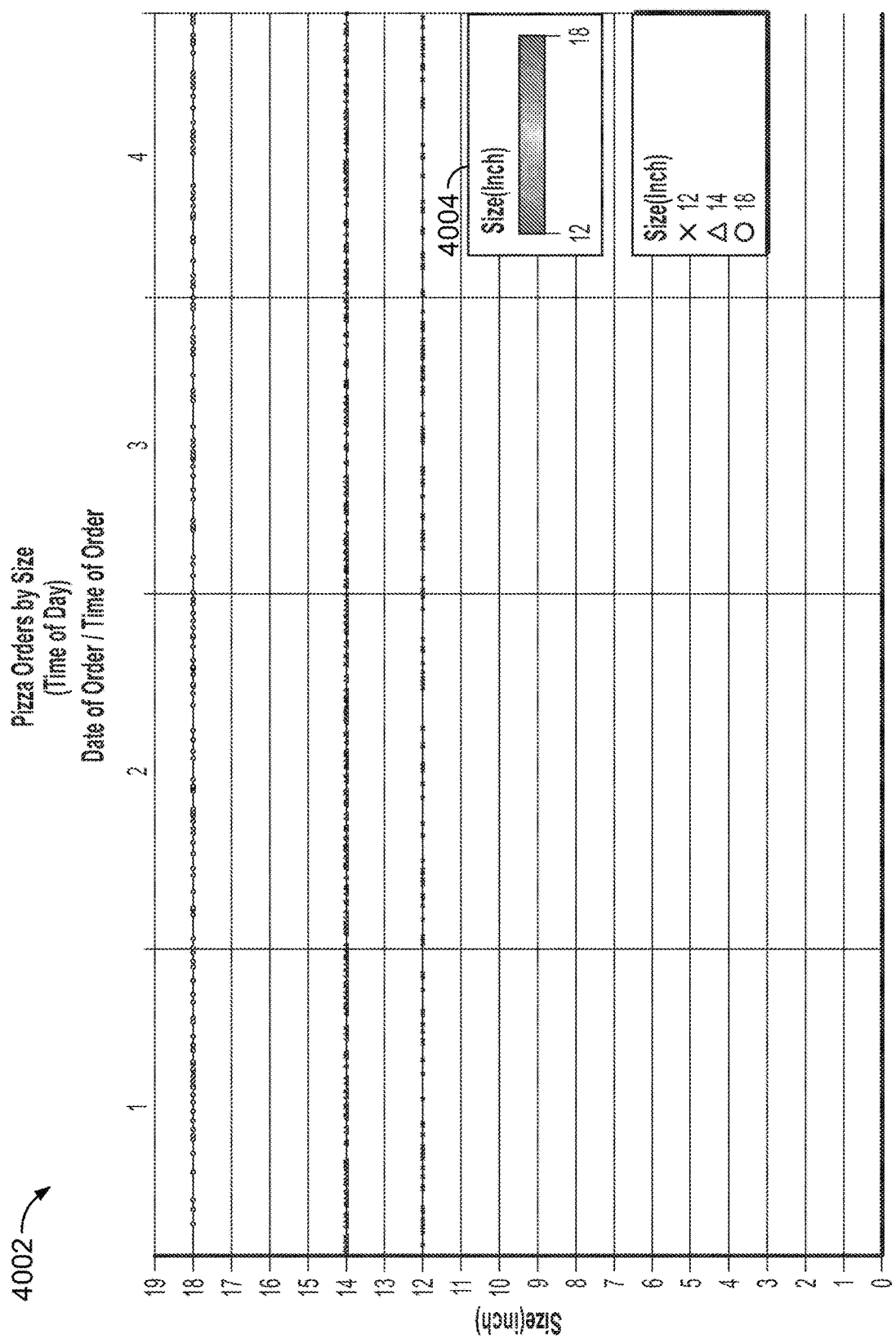
FIG. 40 depicts exemplary order size information on a time scale in accordance with some embodiments of the present disclosure.

FIG. 40 depicts exemplary order size information on a time scale in accordance with some embodiments of the present disclosure. Each small dot indicates an order on a time scale 4002 with a particular indicator by order size 4004, each of which has associated order-level data structures including data primitives as described herein.

Figure 41:
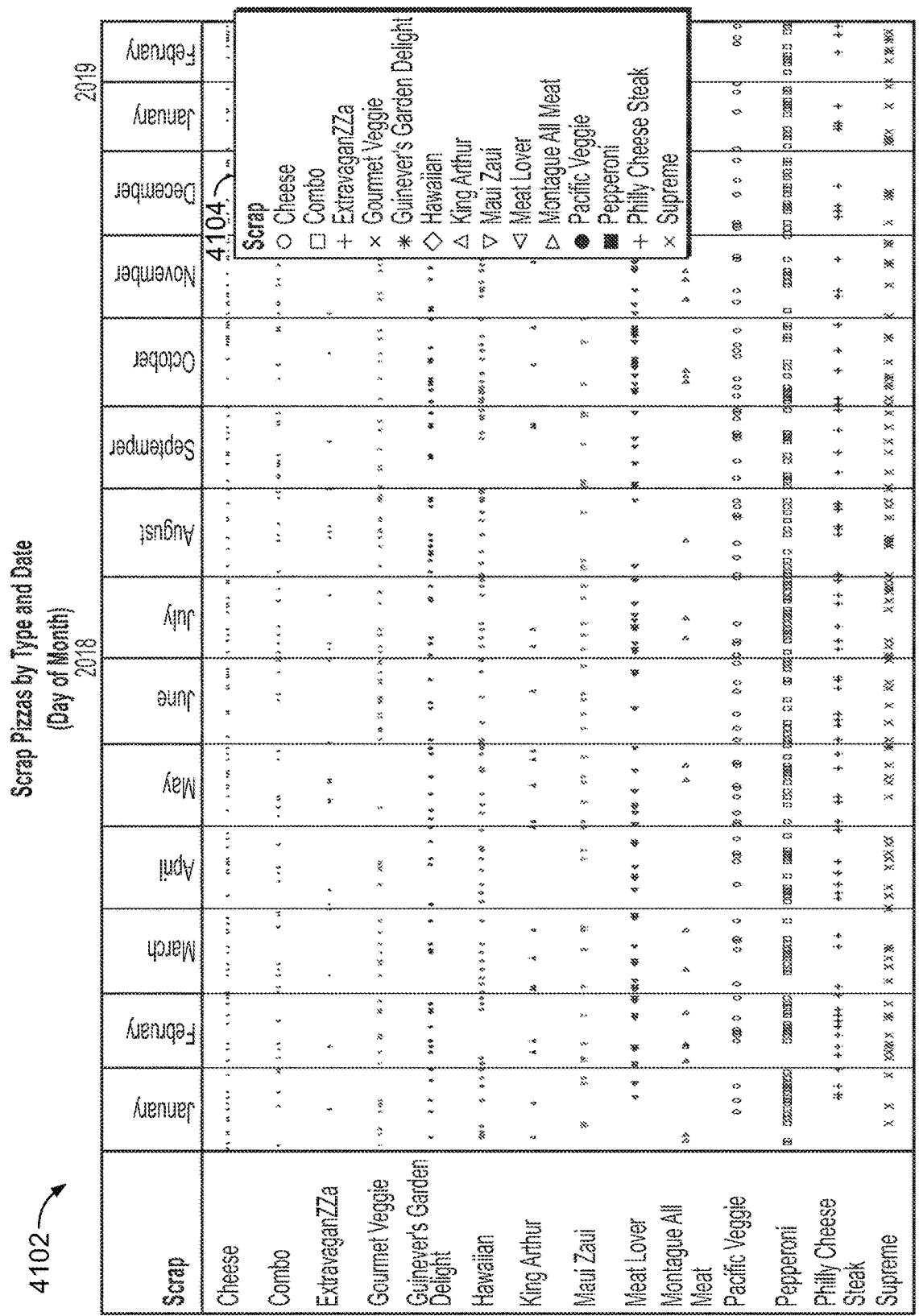
FIG. 41 depicts exemplary aggregated scrap data in accordance with some embodiments of the present disclosure.

FIG. 41 depicts exemplary aggregated scrap data in accordance with some embodiments of the present disclosure. Each small dot indicates a scrap event 4104 on a time scale 4104, each of which is associated with order-level data structures including data primitives as described herein.

Figure 42:
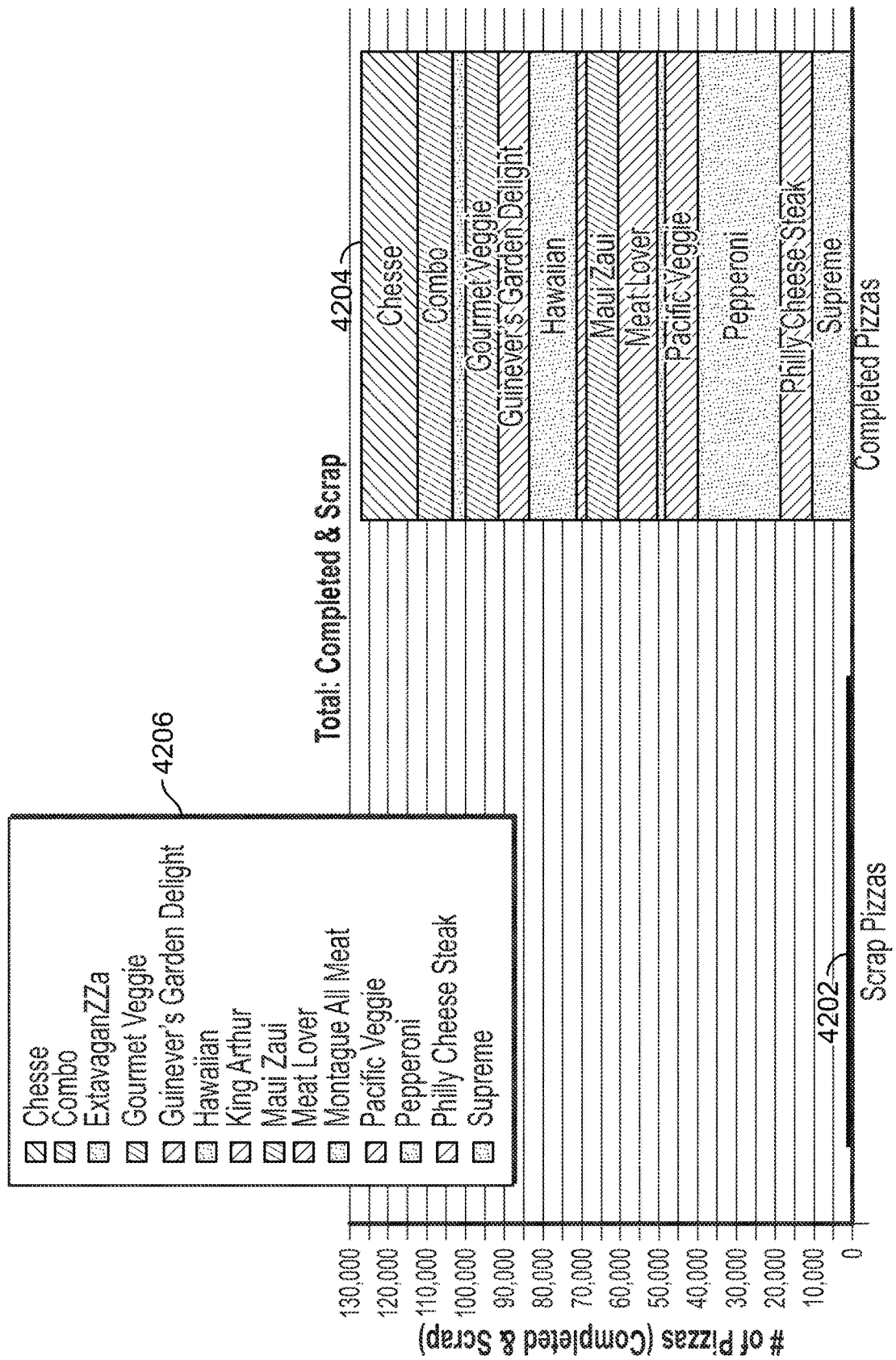
FIG. 42 depicts exemplary aggregated order and scrap data in accordance with some embodiments of the present disclosure.

FIG. 42 depicts exemplary aggregated order and scrap data in accordance with some embodiments of the present disclosure. This user interface facilitates a user's understanding of scrap frequency for different items and is associated with order-level information, and depicts successful order 4204 and scrap 4202 for different order (e.g., pizza) types 4206.

Figure 43:
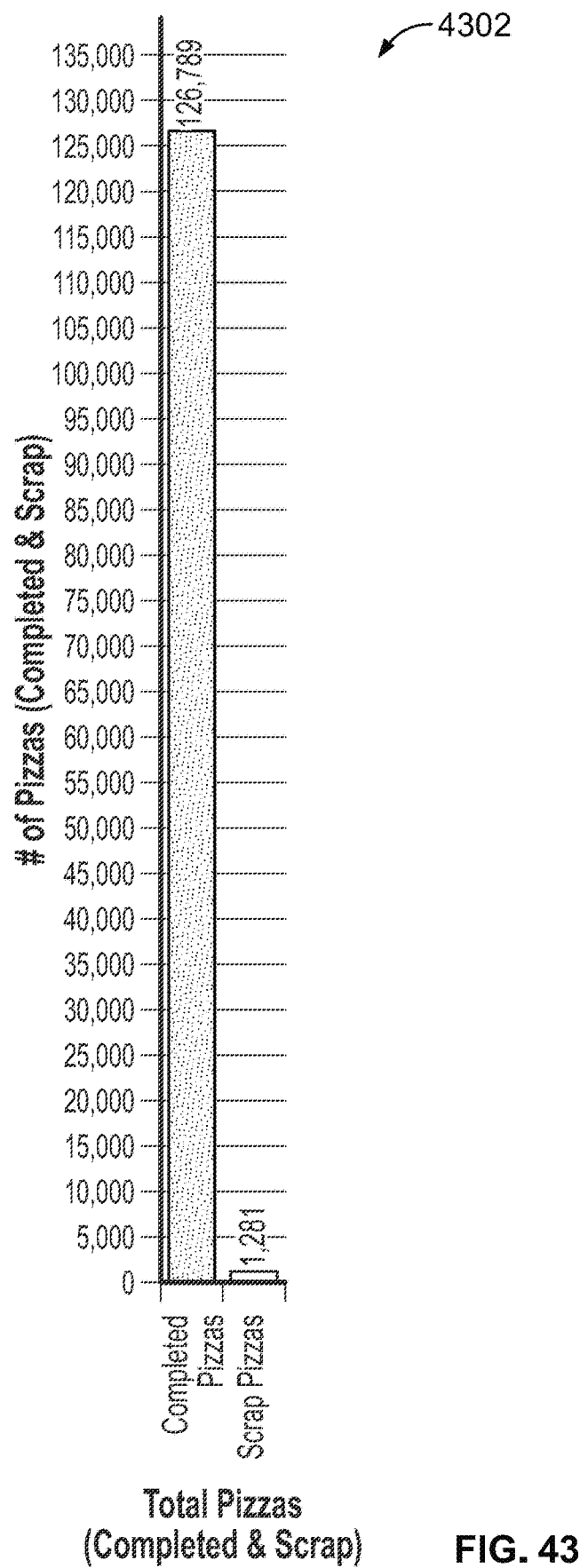
FIG. 43 depicts exemplary aggregated order and scrap data in accordance with some embodiments of the present disclosure.

FIG. 43 depicts exemplary aggregated order and scrap data 4302 in accordance with some embodiments of the present disclosure. This user interface facilitates a user's understanding of scrap costs and is associated with order-level information.

FIG. 44 depicts exemplary aggregated order information by location 4406 in accordance with some embodiments of the present disclosure. FIG. 44 includes location, count, order type 4402, and time-scale 4404 information and facilitates a user's understanding of particular trends based on aggregation of order-level data.

Figure 45:
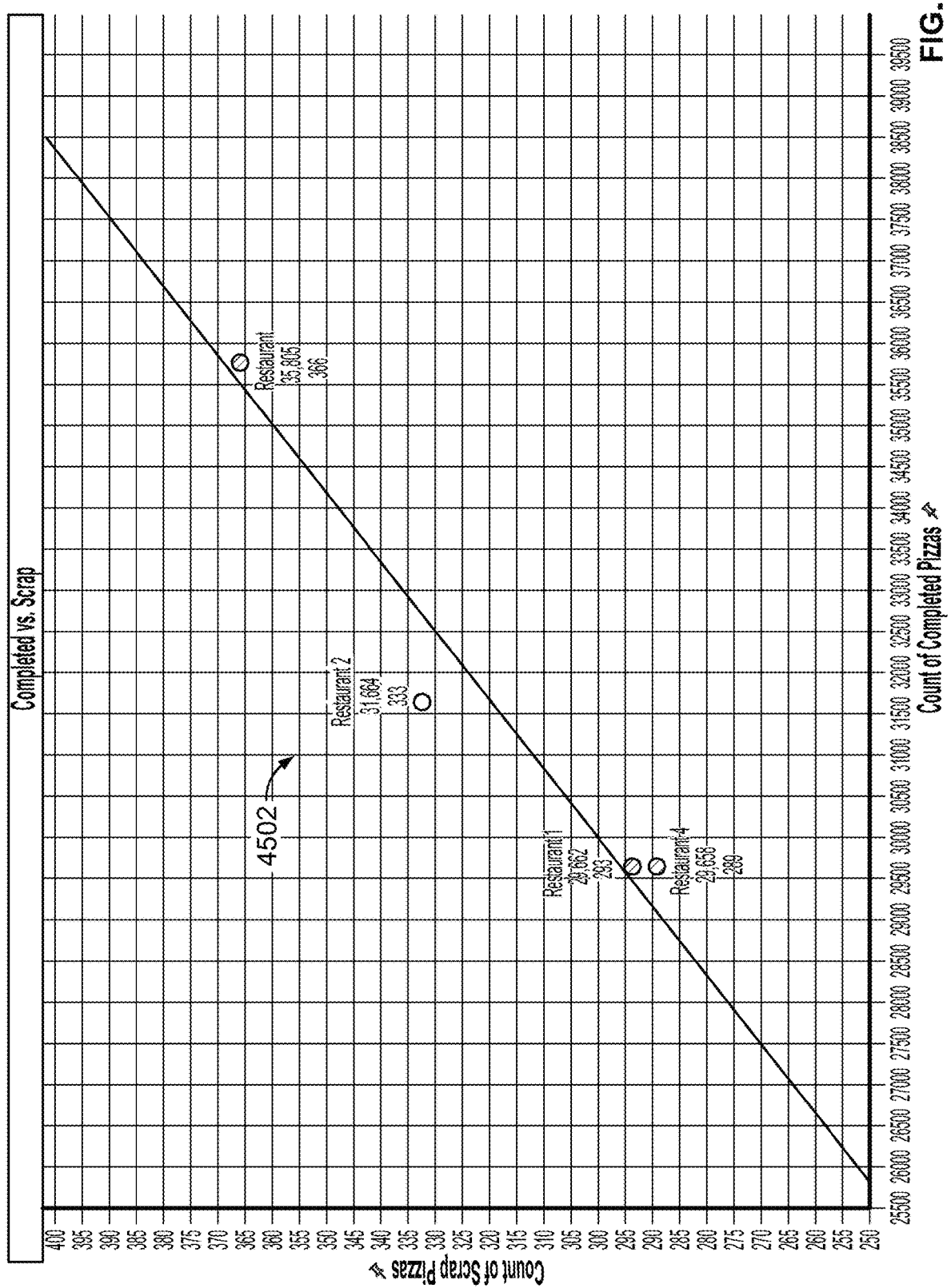
FIG. 45 depicts exemplary completed versus scrap ratios for multiple locations in accordance with some embodiments of the present disclosure.

FIG. 45 depicts exemplary completed versus scrap ratios 4502 for multiple locations in accordance with some embodiments of the present disclosure. In this figure a trend line indicates average scrap rates while each location's respective scrap rates are depicted with respect to the average and other locations.

Figure 46:
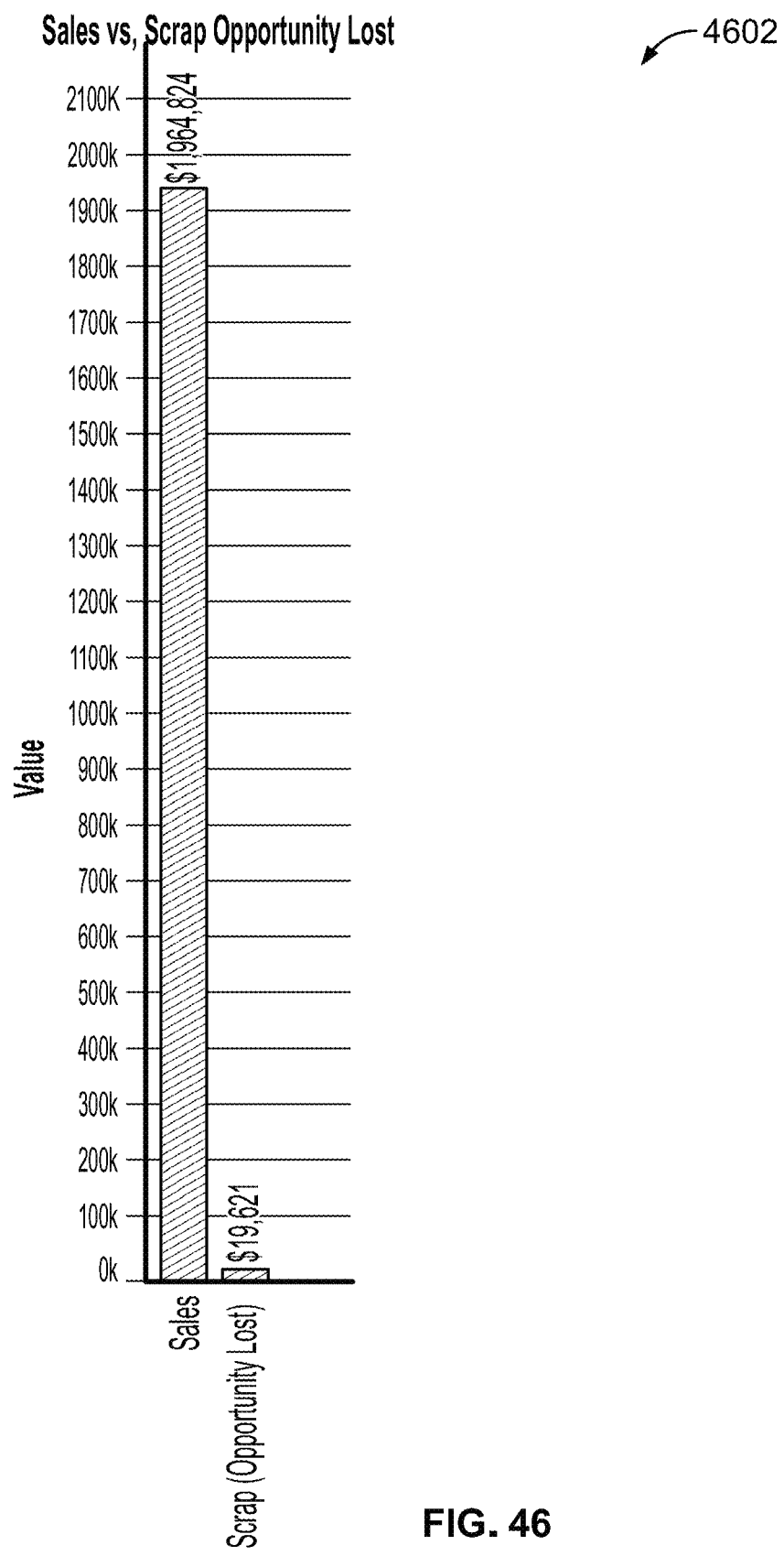
FIG. 46 depicts costs attributable to scrap in accordance with some embodiments of the present disclosure.

FIG. 46 depicts costs attributable to scrap 4602 in accordance with some embodiments of the present disclosure. This user interface facilitates a user's understanding of scrap costs and is associated with order-level information.

Figure 47:
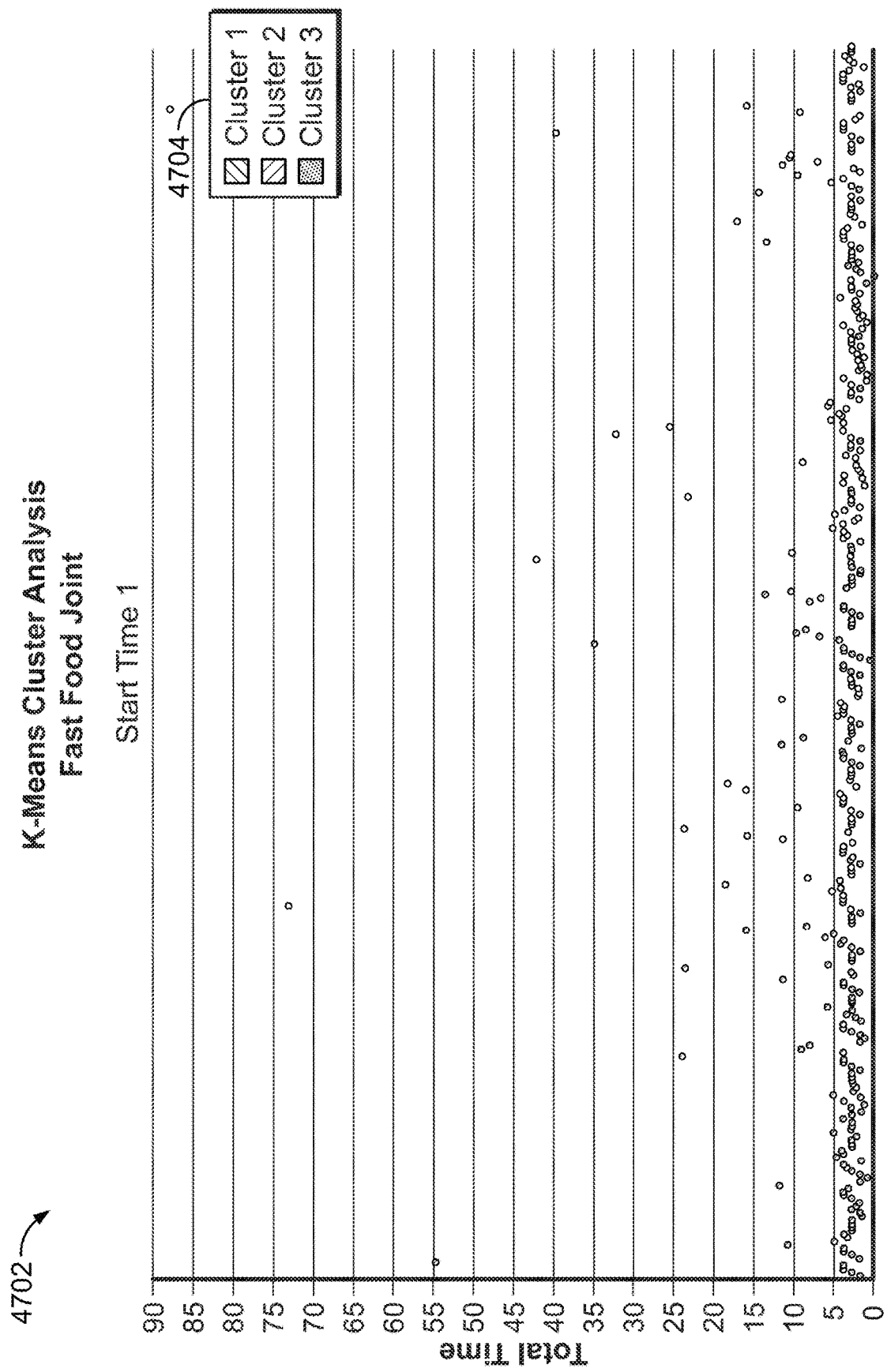
FIG. 47 depicts an exemplary K-means cluster analysis chart applied to a fast food restaurant in accordance with some embodiments of the present disclosure.

FIG. 47 depicts an exemplary K-means cluster analysis chart 4702 applied to a fast food restaurant in accordance with some embodiments of the present disclosure. In the exemplary embodiment depicted in FIG. 47, there are three clusters of data depicted. The depicted data clustering depicts start times and total cooking times sorted by program name and step number (e.g., 1=preheat on grill, 2=Toast both halves of bun, etc.). The data clustering shows visually and quantitatively the statistics (average, confidence levels, etc.) for total cooking times as well as the deviations for specific orders.

Figure 48:
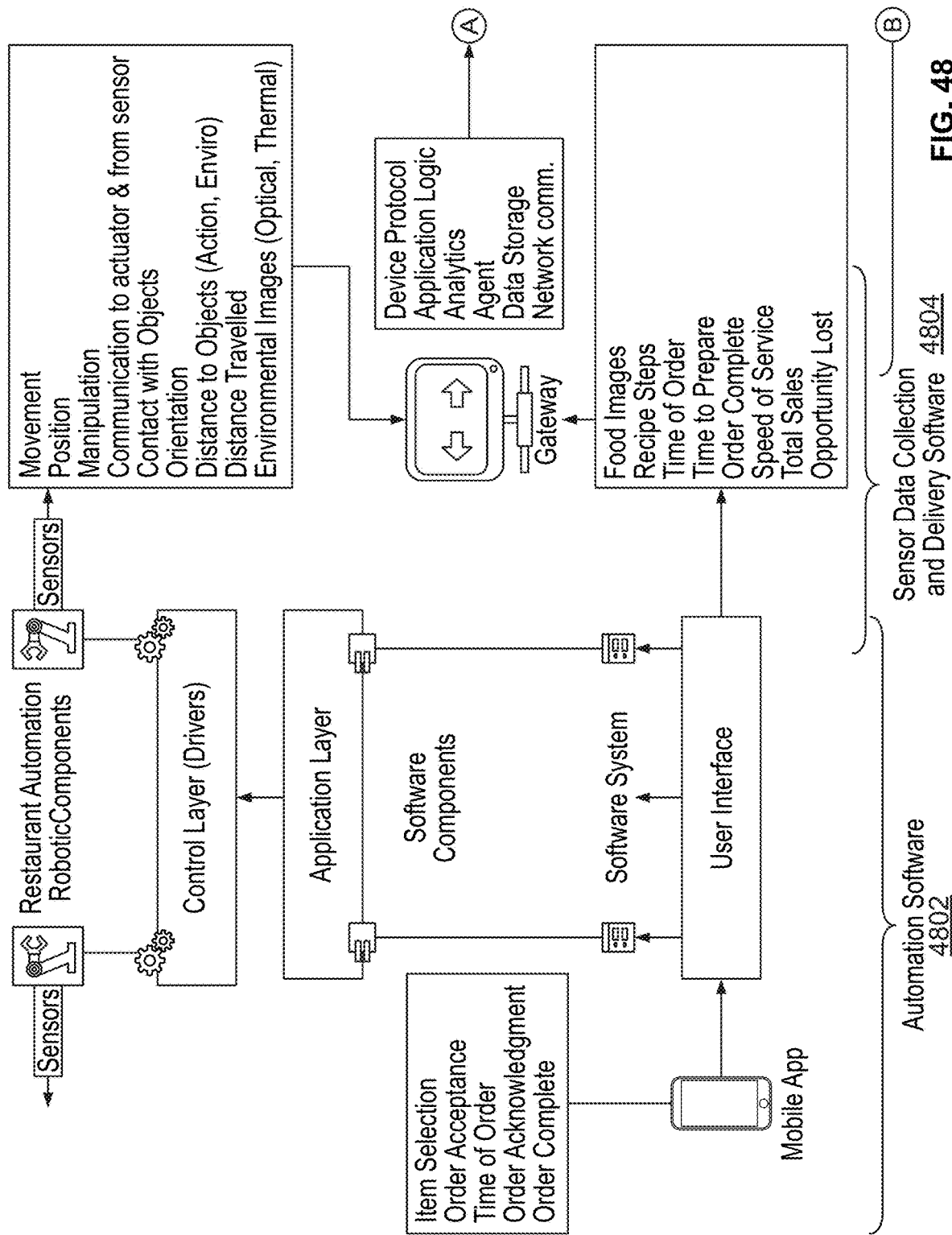
FIG. 48 depicts an exemplary software architecture for a restaurant operations system in accordance with some embodiments of the present disclosure.
Figure 48:
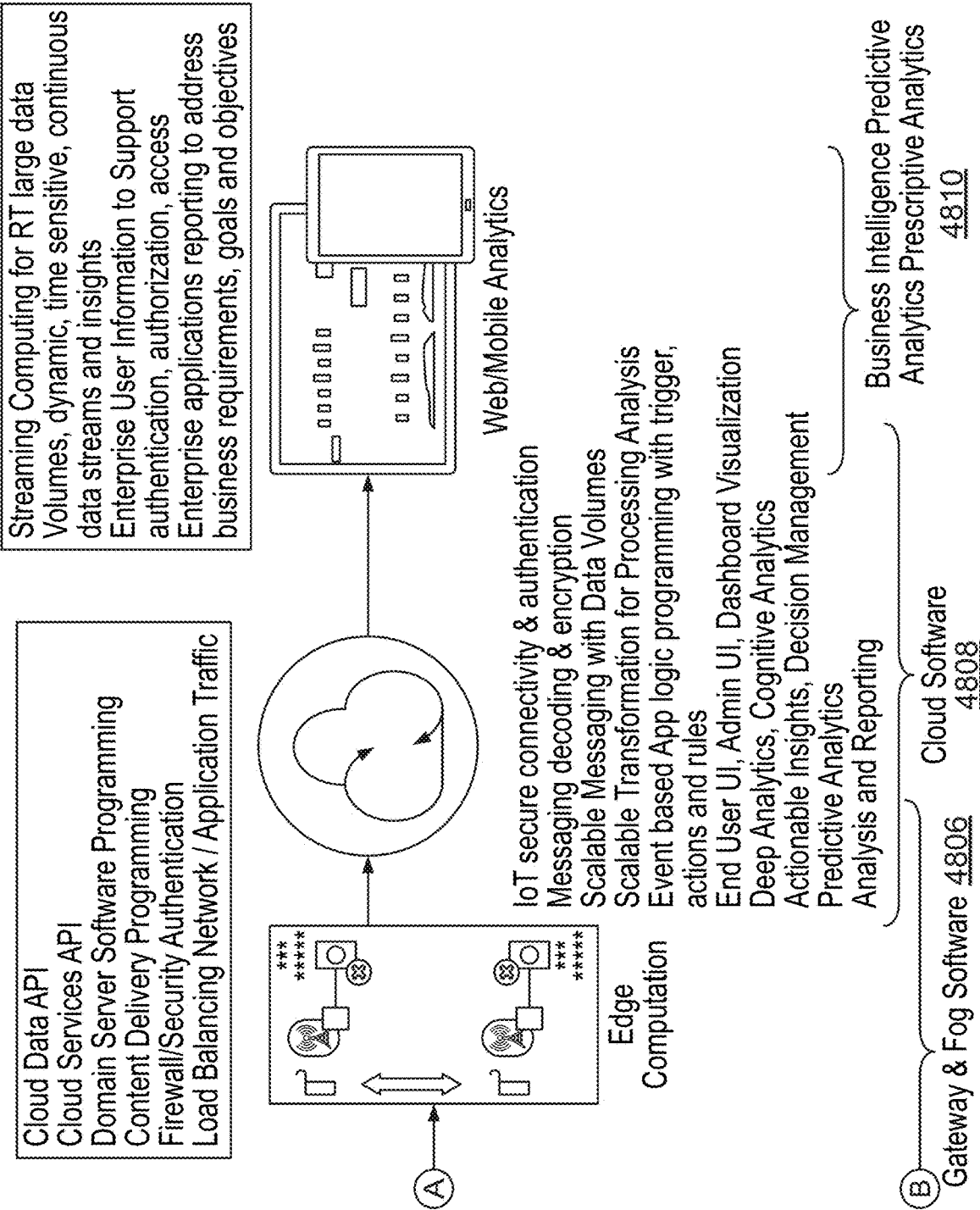

FIG. 48 depicts an exemplary software architecture for a restaurant operations system in accordance with some embodiments of the present disclosure. Although a software architecture can include a variety of layers in different implementations, in an exemplary embodiment the architecture may include automation software 4802, sensor data collection and delivery software 4804, gateway and fog software 4805, cloud software 4808, and analytics software 4810. Within the automation software layer 4802, a variety of layers and systems may directly interact with customers, employees, food preparation, inventory, and other restaurant operations as described herein, gathering data and sensor information and providing controls for the restaurant environment. Some decision making and processing may occur at the automation software layer, but much of it may be pushed up to other layers for further processing. A sensor data collection and delivery software layer 4804 may aggregate data from sensors and other data sources, such that an ongoing comprehensive collection of establishment-level data exists at the establishment. A gateway and fog layer 4806 may process the aggregated data from the sensor data collection and delivery software, as well analytics and data from other sources such as cloud software 4808 and analytics software 4810. In this manner, the gateway and fog layer 4806 may perform local controls for the establishment in a timely manner based on a complete data picture. Cloud software layer 4808 may provide enterprise-level data management and process, and provide secure services for use by establishments executing individual gateway and fog layer 4806 functions. Some or all of analytics layer 4808 may be resident within an enterprise cloud layer 4808, or may be provided as a service (e.g., by an industry vendor), and may provide a variety of establishment, enterprise, and industry-level analysis as described herein.

Figure 49:
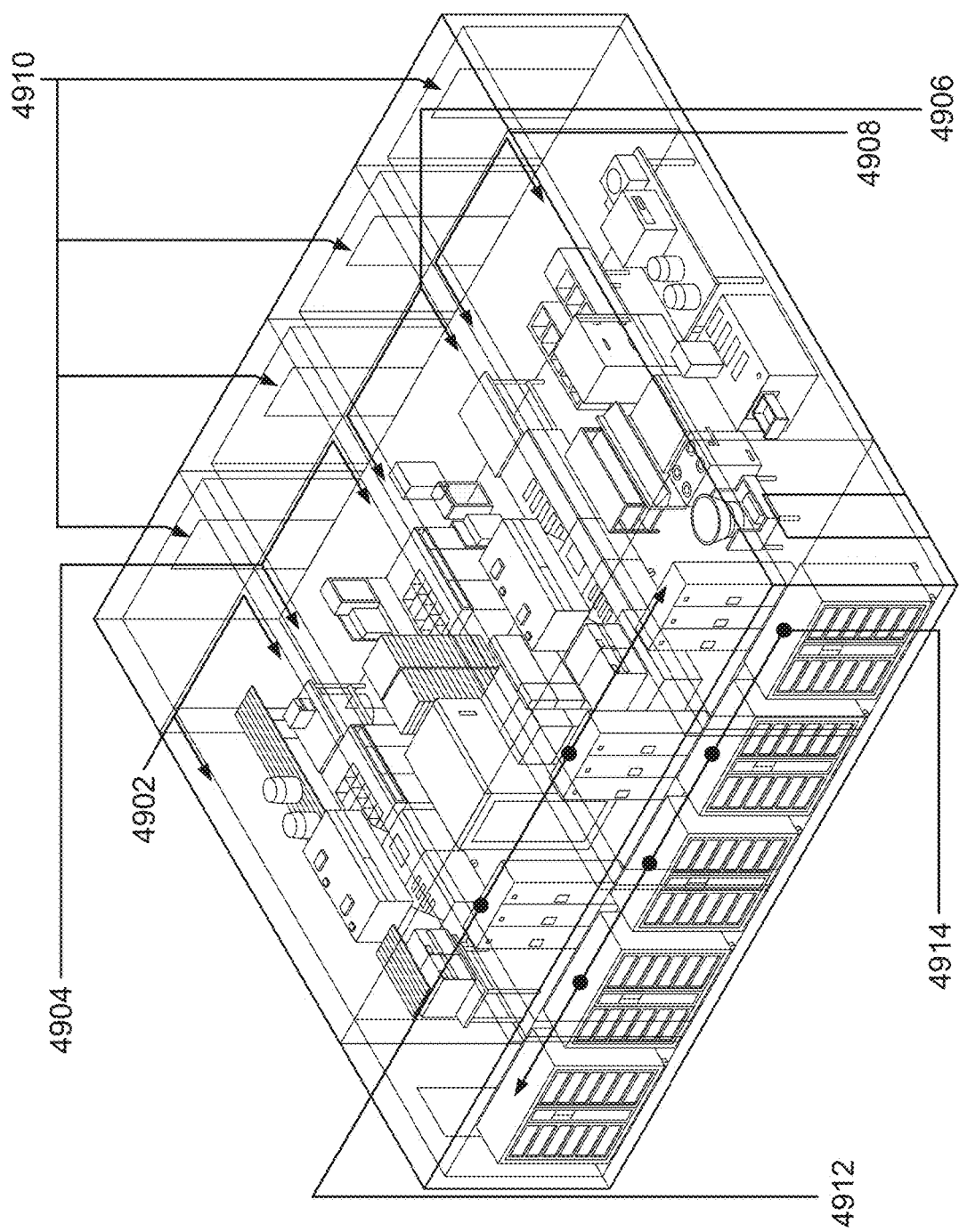
FIG. 49 depicts an exemplary layout for automated production cells in accordance with some embodiments of the present disclosure.

FIG. 49 depicts an exemplary layout for automated production cells in accordance with some embodiments of the present disclosure. In the exemplary embodiment depicted in FIG. 49, multiple types of automated equipment may be located in respective production cells. Transfer between stations may be performed automatically (e.g., by robots such as multi-axis robots movable via wheels or tracks) or in combination with limited employee operations. The cells are depicted as being relatively thin rectangular rooms, although other shapes may be utilized in other embodiments. As compared to typical back-of-house environments, the production cells may have a relatively small footprint while performing the same or similar food preparation operations. By operating a food preparation space in cells, unique concepts, food types, and preparation methods can be performed in close proximity but without interfering with the operations of other cells. For example, a vegan production cell 4902 may include ingredients and equipment that are entirely segregated from an environment that services meat or dairy, while other dining concepts (e.g., a pizza production cell 4904, a grill production cell 4906, and an Asian production cell 4908). The production cells can have shared utilities and resources, such as walk in cold storage 4910, locker storage 4912, and pick-up cabinets 4914.

Figure 50:
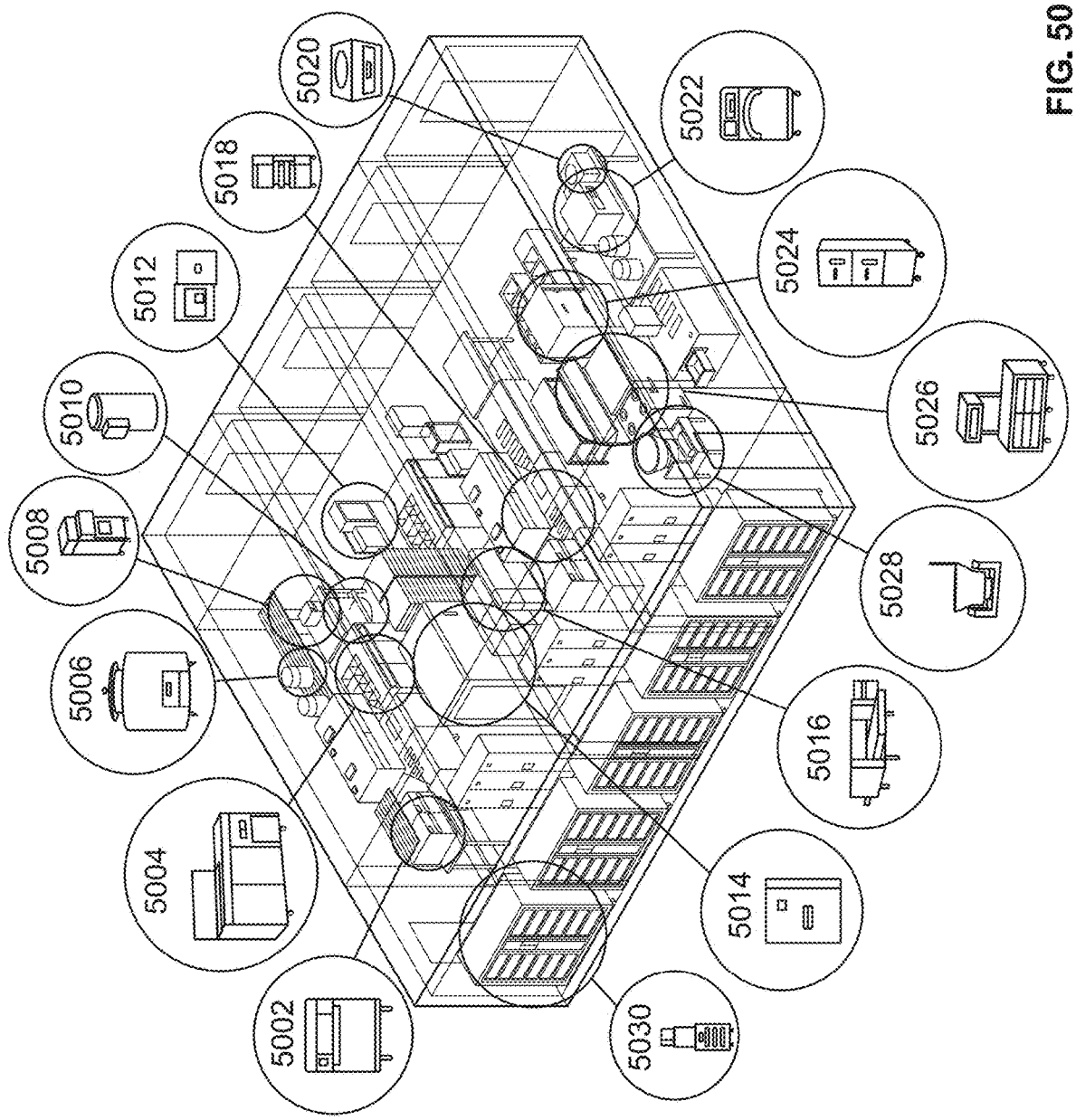
FIG. 50 depicts an exemplary equipment layout for automated production cells in accordance with some embodiments of the present disclosure.

FIG. 50 depicts an exemplary equipment layout for automated production cells in accordance with some embodiments of the present disclosure. Although numerous types of equipment can be arranged in a variety of ways, an exemplary vegan production cell 4902 may include exemplary equipment such as rapid cook ovens, electric waterless steamers, fryers, ventless griddles and refrigeration 5002, vegetable storage and prep station 5004, prep table with remote refrigerated base 5006, waterless holding 5008, and vegetable peeler 5010. An exemplary pizza production cell 4904 may include a dough sheeter, ventless conveyor oven, spiral dough mixer, prep table with remote refrigerated base 5012, a pizza preparation module 5014, and a pizza oven/broiler 5018. An exemplary grill production cell 4906 may include electric ventless fryer and griddle 5018 and a ventless rapid cook oven, ventless grill, meat chopper, patty press and prep table with refrigerated base. An exemplary Asian production cell 4908 may include induction wok 5020, accelerated cooking countertop oven 5022, two-compartment convection steamer 5024, custom ranges/griddles 5026, and tilting skillet 5028. An exemplary pick up cabinet 4914 such as pick-up cabinet 5030 may have heated and ambient cabinets, equipped with mobile ordering technology and pick up for automated food ordering and pick up in accordance with some embodiments of the present disclosure.

Figure 51:
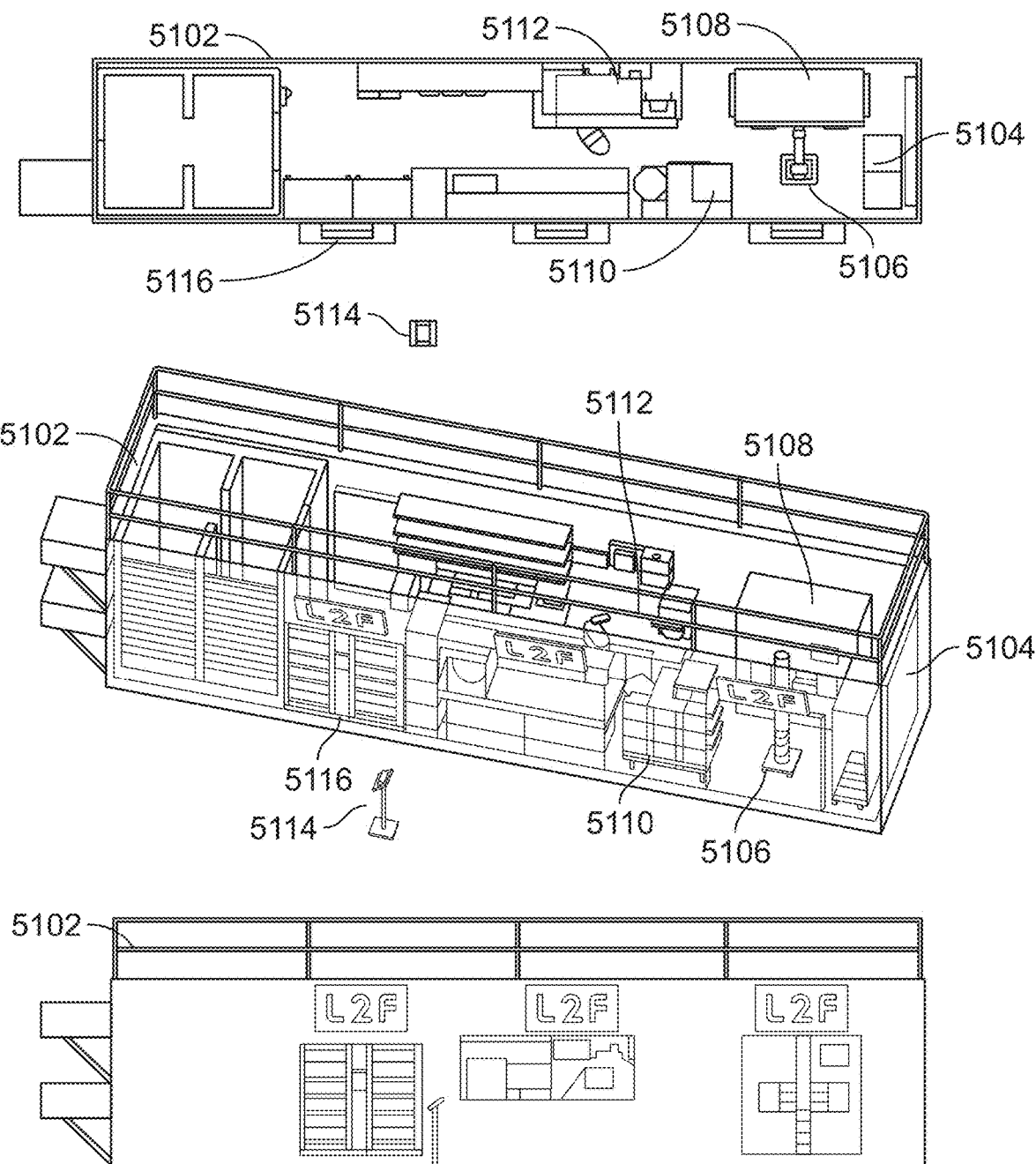
FIG. 51 depicts an exemplary automated ghost kitchen in accordance with some embodiments of the present disclosure.

FIG. 51 depicts an exemplary automated ghost kitchen 5102 in accordance with some embodiments of the present disclosure. The components of a production cell may be implemented and arranged within a single freestanding structure such as a rectangular structure. The rectangular structure can be a structure such as a shipping crate, truck bed, or a specialized structure for housing automated food production equipment. In the exemplary embodiment of FIG. 51, prepared pizza dough may be initially stored at a speed rack 5104. Automated equipment such as a robotic arm 5106 may feed the dough to pizza production module 5108 such as the module described herein. The partially completed pizzas may be fed by the robotic arm 5106 either directly into the oven 5110, or for orders that cannot be entirely completed by the pizza production module 5108, to the smart prep station 5112. Instructions may be provided to the employee as to the additional items to add to the order, based on the known association between the particular pizza delivered by the robotic arm 5106. The robotic arm can further manage the storage of partially prepared and completed pizzas with hot and cold storage and staging areas. Order can be performed via a kiosk 5114 and delivered to customers at output bays 5116 when prepared. In this manner, an entire ghost kitchen 5102 can be easily manned by a limited number of employees (or in some embodiments, no employees performing direct food preparation work).

A number of data collection, aggregation, analysis, machine learning, and artificial intelligence techniques may be utilized in the integrated systems described herein. For example, the system may remotely stop food orders made in error (e.g., food scrap items) based on real-time analysis of scrap and QC trends with respect to particular orders or inventory items, or based on other criteria as described herein.

The system may provide feedback and feed-forward correction of food preparation errors (e.g., scrap items). The system may also provide process control for food preparation processes. For example, food preparation patterns may be analyzed by the system and changes to processes (e.g., temperature, time cooking, etc.) may be automatically recommended.

The system may perform predictive maintenance of the food preparation equipment. Examples of maintenance triggers include divergence between set and actual temperatures, excessive utility usage, high percentages of scrap, movements within QC tolerance, etc. For example, the food preparation equipment may be equipped with sensors, processors, and communication chips that allow it to send an alert to a gateway device when critical components exceed a percentage of recommended usage hours. Predictive maintenance may be based on aggregated data at the enterprise level or industry level to optimize predictive maintenance routines.

The system may identify and push recipes and promotions to restaurants. In some embodiments, the desired recipes may be custom recipes or standard recipes that have been modified. For example, social media or other trend data may identify "hot" recipes or items, and in response, the system may automatically recommend compatible recipes based on in-restaurant inventory or readily available items provided by suppliers (e.g., by combining available inventory and operations primitives).

The system may automatically generate coupons, combo meals, recommendations, etc. based on aggregated order information. For example, a customer may opt in to receive customized coupons and specials, which the restaurant may use to dispose of inventory at relatively low prices for the customer, but at a time when they otherwise would not likely be spending any money at the establishment. In an exemplary embodiment, the system may coordinate with services such as meal delivery services to offer discounted items for distribution to customers. In another exemplary embodiment, customers may set strike points at which they are willing to buy bulk amounts of particular food times, which the restaurant may utilize with inventory and demand-related information to properly manage inventory and utilization of employee and equipment time.

The system may analyze the order data to predict evolving tastes. For example, the order data collected may show that there was a drop in ordering of a particular food item. The system may combine the order data with inventory data to show that the level of related inventory items has not decreased for a certain period. The system can then identify alternate possibilities for utilizing the inventory, including alternate menu items or third parties willing to purchase the inventory. The system may additionally analyze food item inventory or customer orders across restaurants to predict changing tastes. For example, the data collected may show an increased trend in ordering food items low in sugar (e.g., food items following a particular trending diet). The system may further recommend food items to conform to the evolving tastes (e.g., based on available inventory and operations primitives, as described herein). The system may identify that a customer, using a customer ID associated with his orders, has been ordering food items with reduced sugar and in response, provide recommendations for various appropriate food items.

The system may use the order data from locations to forecast emerging food item trends according to location, demographic, region, etc. A service employee in a locality may be more likely to stock local food items because of perceived preferences for that product. If the food completed items in that region begin to trend away from the local item, the unlikely trend is captured by the aggregated order-level information food completed items and allows for the restaurant owner to take corrective action.

The system may use social media in the predictive analytics used to manage store inventory, recommend food items, create events to host at a venue, etc. For example, social media may reflect diet trends, which in turn may be used by restaurant owners to shape their inventory and menu. In another example, social media may show high attendance for weekly Friday night comedy shows in a neighborhood. A restaurant owner can use this data to determine that a restaurant near the comedy club needs to have more items, employees, kitchen supplies, etc.

In some embodiments, a component of the system may be offline (e.g., disconnected from the communication network). For example, if an ingredient station is located outside of the wireless reception range of the gateway device, it may store the data its collected in local memory. Once it has reconnected to the communication network, it may transmit its locally stored data to the gateway device. The sensor may be instructed to attempt a certain number of times to contact the gateway device before storing the data locally.

In some embodiments, food containers may comprise sensors that are also communicatively interfaced with the gateway device. For example, a mass sensor embedded within a plate may detect that the food is nearly or fully consumed. Upon this exemplary detection, the sensor may communicate with an embedded processor and communications device to send an alert to the gateway device or a wearable device. In some embodiments, a customer ID may be associated with a food container. The service employee may have a wearable device that is enabled to wireless communicate to the food container system. The food container system may then transmit information to the wearable device indicating to the service employee that the food belonging to customer ID is fully or nearly consumed.

Due to the connection over the cloud, the analysis and recommendation of foods may take into account a global taste palette. For example, the system may connect restaurants in the US with a restaurant in Japan. A customer in San Francisco may be recommended a trending recipe from Tokyo due to his preferences for certain foods.

The predictive analysis referenced herein may be accomplished through linear regression, logistic regression, K-means, k-nearest neighbors (KNN) algorithm, time-series forecasting, any suitable supervised or unsupervised learning technique, or any combination thereof.

Although the present disclosure describes a number of restaurant management functions, the functions described herein are merely exemplary. One exemplary restaurant management challenge that is improved by the present disclosure is the common problems that restaurant owners face in preparing a menu. A good menu is a balancing act of customer demand, supply chains, difficulty of preparation, and employee training. The integrated front-of-house and back-of-house systems provide for data-driven prediction and feedback regarding difficult issues such as number of menu items, pricing of dishes, promotions and specials, coherency of menu-wide themes, utilization and reduction of inventory, early adoption of trends and avoiding wasteful or unprofitable trends, etc.

The integrated front-of-house and back-of-house may also facilitate customized ordering, e.g., by providing secondary menus or custom ordering options that are available in addition to the primary menus that generally drive traffic and profitability. If enabled by customers, the order-level system may facilitate specialty ordering options such as managing food allergies. For example, if a customer has a peanut allergy they can only be provided with options that will not trigger an allergic reaction. The food preparation for that order may then be routed through appropriate stations and operations to avoid contamination.

Because the inventory information and food preparation capabilities/parameters are known, accurate pricing and preparation times may be determined for custom or rarely ordered items, along with specialized pricing and customer updates on timing (e.g., such that a customer waiting for a specialized item understands that it may take longer to prepare if ingredients must be accessed from inventory or non-standard food preparation options must be performed). By integrating order-level information with other data sources as described herein, and analyzing this information based on identifiable and updateable data primitives, predictive analysis can be provided to recommend pricing, themes, specials, variable pricing (e.g., based on time of day, event, inventory status, etc.), grouping of menu items (e.g., based on correlated items, ease of parallel preparation, etc.). The detailed order-level data analysis and automated system of the present disclosure may also facilitate a reduction in inventory requirements and facilitate integration with third party systems to enable a variation of just-in-time delivery, e.g., by autonomous delivery vehicles circulating within a region.

The inventions described in the present disclosure facilitate the proper training of employees and provide appropriate guidance (e.g., through AR or other visual cues), enabling employees to focus their learning and self-improvement efforts on more creative and rewarding tasks, such as meaningful interactions with customers, recipe creation, and attention to detail in preparation. Rote tasks may be automated, extraneous information may be filtered, and visual or other cues prevent the employee from having to memorize ingredient locations, no-go zones, recipes, preparation methods, and the like. In some embodiments employee devices may also measure information such as heart rate or stress level, recommending breaks or changes in assignment at appropriate times. If a customer has indicated positive experiences or negative experiences with particular employees, those employees may be directed to take orders, deliver food, or otherwise service that customer. Other features such as cultural and language information may also be taken into account. Some customers may desire a more human touch while other customers may be happy interacting with robots or automated systems. The integrated system can customize interactions based on these indicated or observed preferences.

Another common problem is the need for the restaurant to determine its unique selling point (e.g., coffee shop, restaurant, bar, dine, romantic, etc.). A unique selling point therefore gives the customer a feeling and enables them to remember the restaurant after they have left, in essence building an emotional connection. In some embodiments, the experience may be customized for each customer or party, for example, based on preferences or menu choices. A customer ordering a salad and sparkling water while reading a book may desire to eat in a different ambiance than a customer eating wings and drinking beer. Lighting, music, temperature, air flow, etc. may be controlled at the table-by-table or section-by-section level, enabling different experiences within a single restaurant. Specialized items may also be created for particular customer or trends—with the preparation routine assigned according to known primitives for inventory and available food preparation steps and equipment—e.g., to satisfy Keto, Gluten Free, Atkins, and other related diet trends.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A modular food preparation system, comprising:
a plurality of food preparation modules, wherein each of the food preparation modules comprises a respective conveyor, and wherein each of the plurality of food preparation modules is physically attached to an adjacent food preparation module of the plurality of food preparation modules;
a camera located within a first food preparation module of the plurality of food preparation modules, wherein the first food preparation module is configured to receive a tray on a first conveyor of the first food preparation module, wherein the tray is associated with a first ingredient, and wherein the camera captures one or more images of the tray;
one or more dispensers located within a second food preparation module of the plurality of food preparation modules relative to a second conveyor of the second food preparation module, wherein each of the one or more dispensers is configured to dispense at least one additional ingredient; and
one or more controllers configured to determine an initial location of the tray based on the one or more images of the tray, cause the tray to transfer between the first conveyor and the second conveyor to a second location on the second conveyor based on the initial location of the tray and a known relative position associated with the physical attachment of the plurality of food preparation modules, cause the second conveyor to move the tray relative to the one or more dispensers, and cause the one or more dispensers to dispense the at least one additional ingredient with respect to the first ingredient based on the second location and the movement of the tray on the second conveyor.

2. The modular food preparation system of claim 1, wherein the plurality of food preparation modules further comprise a third food preparation module, wherein the one or more dispensers comprise at least one first dispenser, wherein the at least one additional ingredient comprise at least one second ingredient, and wherein the physical attachment of the plurality of food preparation modules comprises a first physical attachment of the first food preparation module to the second food preparation module, further comprising:
- at least one second dispenser located within a third food preparation module of the plurality of food preparation modules relative to a third conveyor of the third food preparation module, wherein the at least one second dispenser is configured to dispense at least one third ingredient; and
- wherein the one or more controllers is further configured to cause the tray to transfer between the second conveyor and the third conveyor to a third location on the third conveyor based on the second location a second known relative position associated with a second physical attachment of the second food preparation module to the third food preparation module, cause the third conveyor to move the tray relative to the at least one second dispenser, and cause the at least one second dispenser to dispense the at least one third ingredient with respect to the first ingredient and the at least one second ingredient based on the third location and the movement of the tray on the third conveyor.

3. The modular food preparation system of claim 2, wherein the first physical attachment comprises attachment of one or more first attachment points of the first food preparation module to one or more second attachment points of the second food preparation module.

4. The modular food preparation system of claim 3, wherein the second physical attachment comprises attaching one or more additional attachment points of the second food preparation module to one or more third attachment points of the third food preparation module.

5. The modular food preparation system of claim 4, further comprising a loading robot, wherein one or more controllers is configured to cause the loading robot is load the tray on the first conveyor.

6. The modular food preparation system of claim 5, further comprising an unloading robot, wherein the one or more controllers is configured to cause the unloading robot is remove the tray from the third conveyor.

7. The modular food preparation system of claim 6, wherein the unloading robot is configured to move the tray to an oven.

8. The modular food preparation system of claim 6, wherein the unloading robot is configured to move the tray to a storage rack.

9. The modular food preparation system of claim 2, wherein the one or more controllers is further configured to receive an order and to control the dispensing of the at least one second ingredient and the at least one third ingredient based on the order.

10. The modular food preparation system of claim 9, wherein, based on the order, the one or more controllers is configured to determine an amount of time at each of the second food preparation module and the third food preparation module.

11. The modular food preparation system of claim 9, wherein, based on the order, the one or more controllers is configured to cause the at least one first dispenser not to dispense the at least one second ingredient or to cause the at least one second dispenser not to dispense the at least one third ingredient.

12. The modular food preparation system of claim 9, further comprising a point-of-sale system, wherein the order is received from the point-of-sale system.

13. The modular food preparation system of claim 12, wherein the point-of-sale system comprises a user interface, and wherein the user interface is configured to display order status information.

14. The modular food preparation system of claim 2, further comprising:
- at least one third dispenser located within a fourth food preparation module of the plurality of food preparation modules relative to a fourth conveyor of the fourth food preparation module, wherein the at least one third dispenser is configured to dispense at least one fourth ingredient; and
- wherein the one or more controllers is further configured to cause the tray to transfer between the third conveyor and the fourth conveyor to a fourth location on the fourth conveyor based on the third location a third known relative position associated with a third physical attachment of the third food preparation module to the fourth food preparation module, cause the fourth conveyor to move the tray relative to the at least one third dispenser, and cause the at least one third dispenser to dispense the at least one fourth ingredient with respect to the first ingredient, the at least one second ingredient, and the at least one third ingredient based on the fourth location and the movement of the tray on the fourth conveyor.

15. The modular food preparation system of claim 1, wherein the at least one additional ingredient is provided by at least one first movable ingredient store, wherein at least one second movable ingredient store provides a second ingredient, and wherein a replacement of the at least one first movable ingredient store with the at least one second movable ingredient store causes the dispenser to dispense the second ingredient.

16. The modular food preparation system of claim 1, further comprising one or more sensors configured to measure scrap ingredients of the at least one additional ingredient.

17. A method for operating a modular food preparation system, comprising:
- attaching a first food preparation module to a second food preparation module;
- receiving, by the first food preparation module, a tray associated with a first ingredient;
- determining, by a camera of the first food preparation module, an initial location of the received tray on a first conveyor of the first food preparation module;
- moving, by the first conveyor, the tray towards the second food preparation module;
- transferring the tray from the first conveyor to a second conveyor of the second food preparation module;
- determining a second location of the tray on the second conveyor based on the initial location of the tray and a known relative position associated with the attachment of the first food preparation module to the second food preparation module; and
- dispensing, by one or more dispensers of the second food preparation module, at least one additional ingredient with respect to the first ingredient based on the second location and a movement of the tray on the second conveyor relative to the one or more dispensers.

18. The method of claim 17, wherein the one or more dispensers comprise one or more first dispensers and the at least one additional ingredient comprises at least one first additional ingredient, further comprising:
- attaching a third food preparation module to the second food preparation module;
- moving, by the second conveyor, the tray towards the third food preparation module;
- transferring the tray from the second conveyor to a third conveyor of the third food preparation module;
- determining a third location of the tray on the third conveyor based on the initial location of the tray and a second known relative position associated with the attachment of the second food preparation module to the third food preparation module; and
- dispensing, by one or more second dispensers of the third food preparation module, at least one second additional ingredient with respect to the first ingredient and the at least one first additional ingredient based on the third location and a movement of the tray on the third conveyor relative to the one or more second dispensers.

19. The method of claim 18, further comprising:
- attaching a fourth food preparation module to the third food preparation module;
- moving, by the third conveyor, the tray towards the fourth food preparation module;
- transferring the tray from the third conveyor to a fourth conveyor of the fourth food preparation module;
- determining a fourth location of the tray on the fourth conveyor based on the initial location of the tray and a third known relative position associated with the attachment of the third food preparation module to the fourth food preparation module; and
- dispensing, by one or more third dispensers of the fourth food preparation module, at least one third additional ingredient with respect to the first ingredient, the at least one first additional ingredient, and the at least one second additional ingredient, based on the fourth location and a movement of the tray on the fourth conveyor relative to the one or more third dispensers.

20. The method of claim 18, further comprising:
- detaching the third food preparation module from the second food preparation module;
- attaching a fourth food preparation module to the second food preparation module;
- moving, by the second conveyor, the tray towards the fourth food preparation module;
- transferring the tray from the second conveyor to a fourth conveyor of the fourth food preparation module;
- determining a fourth location of the tray on the fourth conveyor based on the initial location of the tray and a third known relative position associated with the attachment of the second food preparation module to the fourth food preparation module; and
- dispensing, by one or more third dispensers of the fourth food preparation module, at least one third additional ingredient with respect to the first ingredient and the at least one first additional ingredient based on the fourth location and a movement of the tray on the fourth conveyor relative to the one or more third dispensers.

21. The method of claim 17, further comprising:
- receiving an order from a point-of-sale system; and
- controlling the dispensing of the at least one first additional ingredient and the at least one second additional ingredient based on the received order.

22. The method of claim 21, wherein the controlling the dispensing comprising causing the at least one first dispenser not to dispense the at least one second ingredient or causing the at least one second dispenser not to dispense the at least one third ingredient.

23. The method of claim 17, further comprising:
- detaching the second food preparation module from the first food preparation module;
- attaching a third food preparation module to the first food preparation module;
- moving, by the first conveyor, the tray towards the third food preparation module;

transferring the tray from the first conveyor to a third conveyor of the third food preparation module;
- determining a third location of the tray on the third conveyor based on the initial location of the tray and a third known relative position associated with the attachment of the first food preparation module to the third food preparation module; and
- dispensing, by one or more second dispensers of the third food preparation module, at least one third additional ingredient with respect to the first ingredient based on the third location and a movement of the tray on the third conveyor relative to the one or more second dispensers.

24. The method of claim 17, wherein the receiving the tray comprises receiving the tray from a loading robot.

* * * * *